United States Patent
Telleria et al.

(10) Patent No.: US 10,577,810 B2
(45) Date of Patent: Mar. 3, 2020

(54) AUTOMATED WALL FINISHING SYSTEM AND METHOD

(71) Applicant: Canvas Construction, Inc., San Francisco, CA (US)

(72) Inventors: Maria J. Telleria, Redwood City, CA (US); Henrik Bennetsen, San Francisco, CA (US); Gabriel F. Hein, El Cerrito, CA (US); Jonathan B. Pompa, Long Beach, CA (US); Kevin B. Albert, San Francisco, CA (US); David Warner, San Rafael, CA (US)

(73) Assignee: Canvas Construction, Inc., San Francisco, CA (US)

( * ) Notice: Subject to any disclaimer, the term of this patent is extended or adjusted under 35 U.S.C. 154(b) by 0 days.

(21) Appl. No.: 16/141,791

(22) Filed: Sep. 25, 2018

(65) Prior Publication Data
US 2019/0093373 A1 Mar. 28, 2019

Related U.S. Application Data

(60) Provisional application No. 62/562,981, filed on Sep. 25, 2017.

(51) Int. Cl.
*E04F 21/165* (2006.01)
*E04F 21/08* (2006.01)
(Continued)

(52) U.S. Cl.
CPC ............ *E04F 21/165* (2013.01); *B05B 12/00* (2013.01); *B05B 12/32* (2018.02); *B05B 15/20* (2018.02);
(Continued)

(58) Field of Classification Search
None
See application file for complete search history.

(56) References Cited

U.S. PATENT DOCUMENTS

| 2,088,542 A | 7/1937 | Westin |
| 2,514,748 A | 7/1950 | Di Stefano |
| (Continued) | | |

FOREIGN PATENT DOCUMENTS

| CN | 2883554 Y | 3/2007 |
| CN | 202023345 U | 11/2011 |
| (Continued) | | |

OTHER PUBLICATIONS

Fanuc, "Robotic Sanding, Washing & Drying An Aircraft Fuselage with FANUC's New P-350iA/45 Robot", 2016, Fanuc America Corp, pp. 1-4 (Year: 2016).*

(Continued)

*Primary Examiner* — Mohammad Ali
*Assistant Examiner* — David Earl Ogg
(74) *Attorney, Agent, or Firm* — Davis Wright Tremaine LLP

(57) ABSTRACT

A coating system for applying a coating to a substrate that can be part of a wall assembly. The system includes a positioning stage and an end effector coupled at a distal end of the positioning stage, the end effector configured to apply coating to a target surface. The system can further include a computing device executing a computational planner that: generates instructions for driving the end effector and positioning stage to perform at least one coating task that includes applying coating, via the coating the end effector, to one or more substrate pieces, the generating based at least in part on obtained target surface data; and drives the end effector and positioning stage to perform the at least one coating task.

17 Claims, 24 Drawing Sheets

(51) Int. Cl.
  *B25J 9/16*  (2006.01)
  *B25J 15/00*  (2006.01)
  *B05B 12/00*  (2018.01)
  *B05B 15/20*  (2018.01)
  *B05B 12/32*  (2018.01)

(52) U.S. Cl.
  CPC ......... *B25J 9/1697* (2013.01); *B25J 15/0019* (2013.01); *E04F 21/08* (2013.01); *B25J 9/1661* (2013.01); *B25J 9/1679* (2013.01)

(56) References Cited

U.S. PATENT DOCUMENTS

| | | | |
|---|---|---|---|
| 3,116,882 A | 1/1964 | Vork | |
| 4,941,182 A | 7/1990 | Patel | |
| 5,175,018 A | 12/1992 | Lee et al. | |
| 5,279,700 A | 1/1994 | Retti | |
| 5,670,202 A | 9/1997 | Guzowski et al. | |
| 5,979,520 A | 11/1999 | Behrendt | |
| 6,112,490 A | 9/2000 | Meyer | |
| 6,149,506 A | 11/2000 | Duescher | |
| 6,712,238 B1 | 3/2004 | Mills | |
| 7,551,058 B1 * | 6/2009 | Johnson | G01N 27/226 340/10.41 |
| 9,518,870 B2 | 12/2016 | Verdino | |
| 9,527,211 B2 | 12/2016 | Posselius et al. | |
| 9,694,381 B2 | 7/2017 | Mohr | |
| 9,702,830 B1 | 7/2017 | Akselrod et al. | |
| 9,849,594 B2 | 12/2017 | Keese | |
| 9,995,047 B2 * | 6/2018 | Raman | E04F 21/1872 |
| 2004/0159724 A1 | 8/2004 | van der Steur | |
| 2005/0120840 A1 | 6/2005 | Koskovich | |
| 2006/0108450 A1 | 5/2006 | Klinkenberg et al. | |
| 2007/0000947 A1 | 1/2007 | Lewis et al. | |
| 2007/0107632 A1 | 5/2007 | Ball | |
| 2007/0151201 A1 | 7/2007 | Fellinger | |
| 2009/0199690 A1 | 8/2009 | Sun et al. | |
| 2010/0010660 A1 | 1/2010 | Salour et al. | |
| 2011/0011222 A1 | 1/2011 | Bales | |
| 2011/0211938 A1 | 9/2011 | Eakins et al. | |
| 2011/0253291 A1 | 10/2011 | Allen et al. | |
| 2012/0219699 A1 | 8/2012 | Pettersson et al. | |
| 2013/0167471 A1 | 7/2013 | Denaro | |
| 2014/0022281 A1 | 1/2014 | Georgeson et al. | |
| 2014/0230726 A1 * | 8/2014 | Gale | B05B 1/28 118/300 |
| 2015/0112482 A1 | 4/2015 | Kuwahara | |
| 2015/0147460 A1 | 5/2015 | Manzi et al. | |
| 2015/0336267 A1 | 11/2015 | Sun et al. | |
| 2015/0350618 A1 | 12/2015 | Meier et al. | |
| 2016/0052012 A1 | 2/2016 | Mohr | |
| 2016/0121486 A1 * | 5/2016 | Lipinski | B05B 13/005 427/427.3 |
| 2016/0313294 A1 | 10/2016 | Dattilo et al. | |
| 2017/0052507 A1 | 2/2017 | Poulos et al. | |
| 2018/0009000 A1 | 1/2018 | Shang et al. | |
| 2018/0021799 A1 | 1/2018 | Raman et al. | |
| 2019/0118209 A1 | 4/2019 | Rennuit | |

FOREIGN PATENT DOCUMENTS

| | | |
|---|---|---|
| CN | 105971253 A | 9/2016 |
| CN | 106088544 A | 11/2016 |
| DE | 102006056179 A1 | 6/2008 |
| JP | H03100265 A | 4/1991 |
| JP | H04169659 | 6/1992 |
| JP | H10180178 A | 7/1998 |
| RU | 1789711 C | 1/1993 |
| RU | 2100686 C1 | 12/1997 |
| SU | 00160667 | 11/1963 |
| WO | 2013000524 A1 | 1/2013 |
| WO | 2016200439 A1 | 12/2016 |

OTHER PUBLICATIONS

International Search Report and Written Opinion dated Feb. 28, 2019, International Patent Application No. PCT/US2018/052751, filed Sep. 25, 2018, 7 pages.

Krieg, "HygroSkin—Meteorosensitive Pavilion," Fabricate 2014: Negotiating Design and Making, Feb. 2014, https://www.researchgate.net/publication/273060832_HygroSkin_-_Meteorosensitive_Pavilion, 9 pages.

Bao et al., "Flexible Pneumatic End-effector for Agricultural Robot: Design & Experiment," Proceedings of the 2015 IEEE Conference on Robotics and Biomimetics, Dec. 6, 2015, 6 pages.

FANUC America Corporation, "Robotic Sanding, Washing & Drying An Aircraft Fuselage with FANUC's New P-350iA/45 Robot," Oct. 27, 2016, retrieved from https://www.youtube.com/watch?v=abA9v8EOokl, 4 pages.

Forsberg et al., "A Construction Robot for Autonomous Plastering of Walls and Ceilings," Jun. 11, 1997, retrieved Aug. 8, 2019, from http://www.iaarc.org/publications/fulltext/A_construction_robot_for_autonomous_plastering_of_walls_and_ceilings.PDF, 9 pages.

Nagata et al., "Robotic sanding system for new designed furniture with free-formed surface," Robotics and Computer-Integrated Manufacturing 23(4):371-379, Aug. 2007.

Tuberville Enterprizes, "Walls & Ceilings Joint Compund Additive," Jun. 5, 2012, retrieved Aug. 8, 2019, from https://www.wconline.com/articles/88003-joint-compound-additive, 1 page.

International Search Report and Written Opinion dated Aug. 2, 2018, International Patent Application No. PCT/US2018/025570, filed Mar. 30, 2018, 7 pages.

International Search Report and Written Opinion dated Jul. 5, 2018, International Patent Application No. PCT/US2018/025529, filed Mar. 30, 2018, 7 pages.

International Search Report and Written Opinion dated Jul. 5, 2018, International Patent Application No. PCT/US2018/025536, filed Mar. 30, 2018, 7 pages.

International Search Report and Written Opinion dated Jul. 5, 2018, International Patent Application No. PCT/US2018/025553, filed Mar. 30, 2018, 7 pages.

International Search Report and Written Opinion dated Jul. 5, 2018, International Patent Application No. PCT/US2018/025556, filed Mar. 30, 2018, 7 pages.

International Search Report and Written Opinion dated Jul. 5, 2018, International Patent Application No. PCT/US2018/025566, filed Mar. 30, 2018, 7 pages.

* cited by examiner

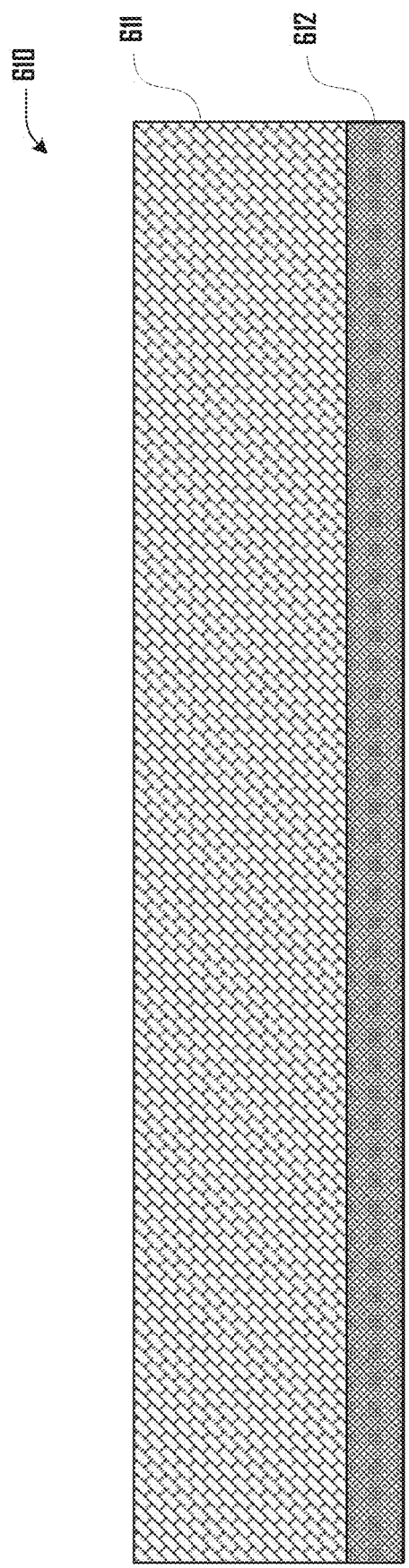
Fig. 6a
Fig. 6b

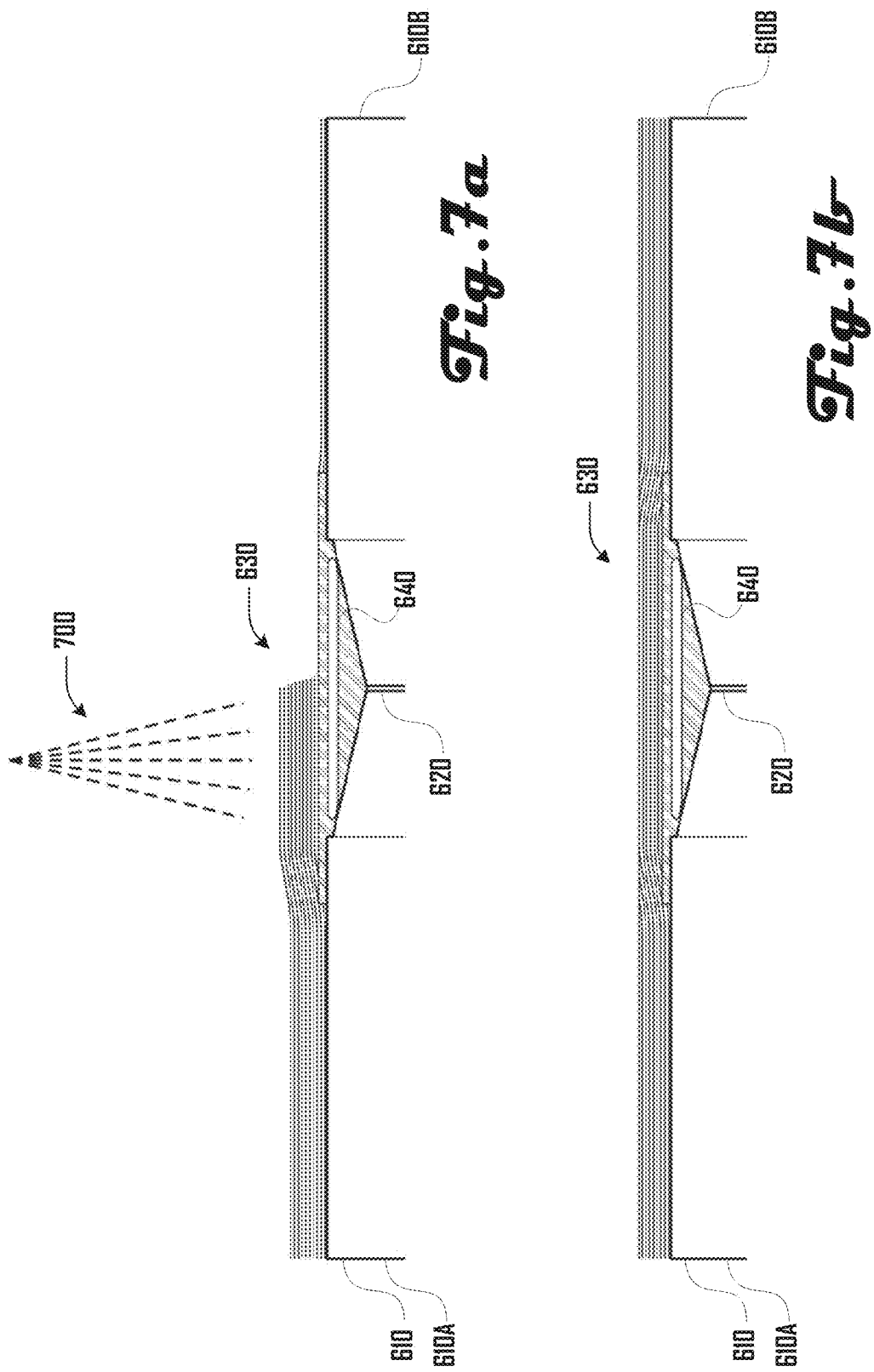

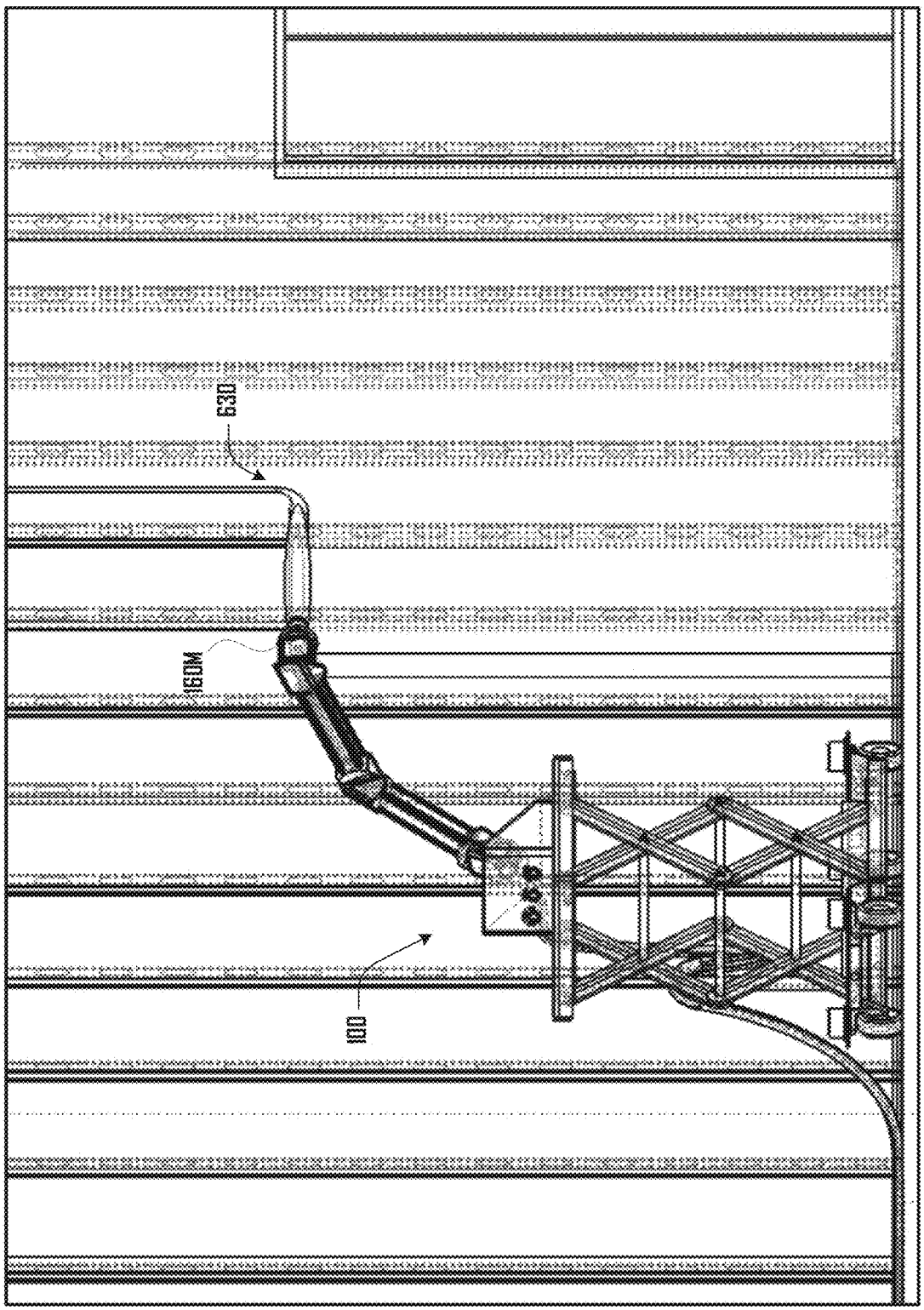

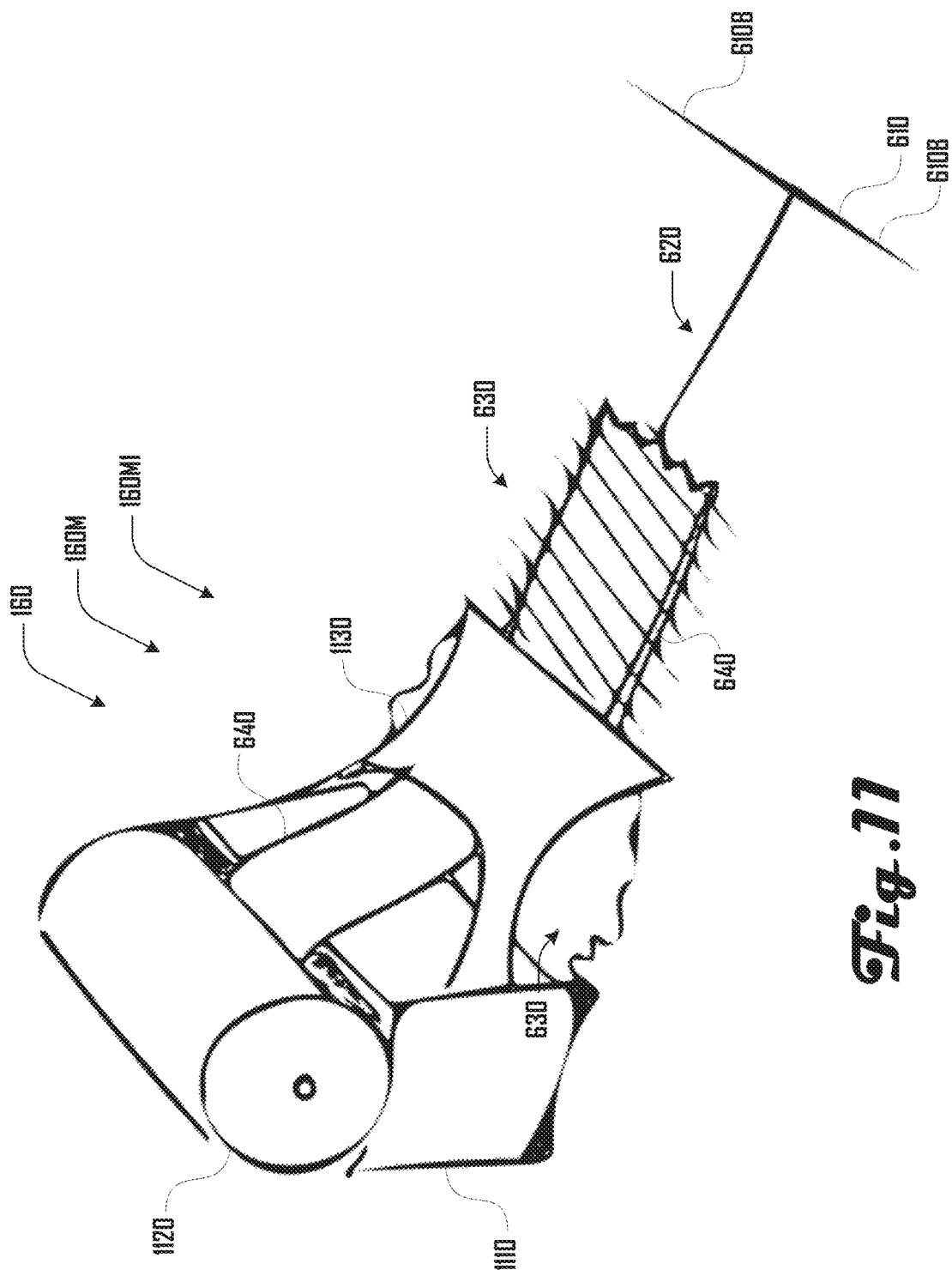

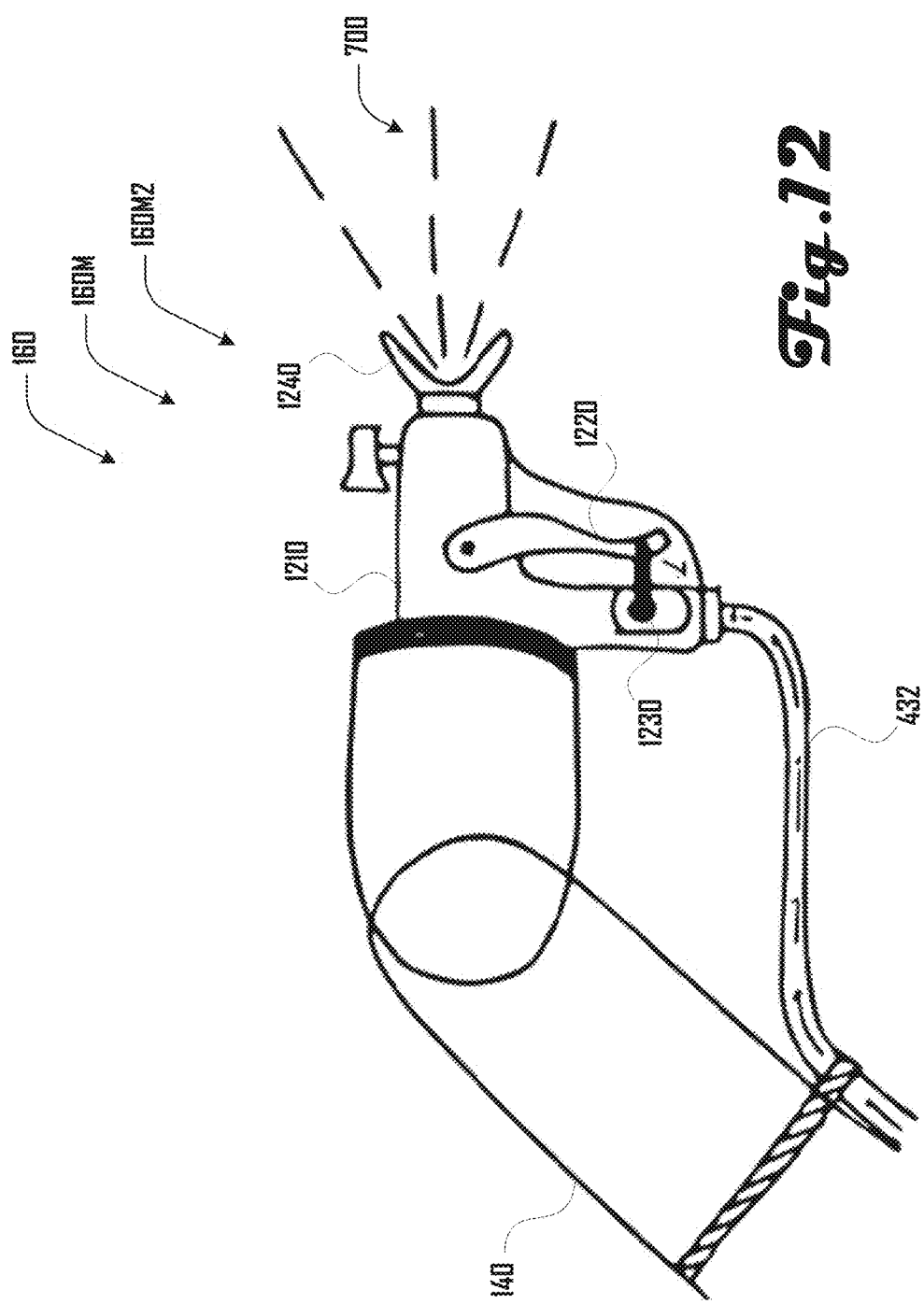

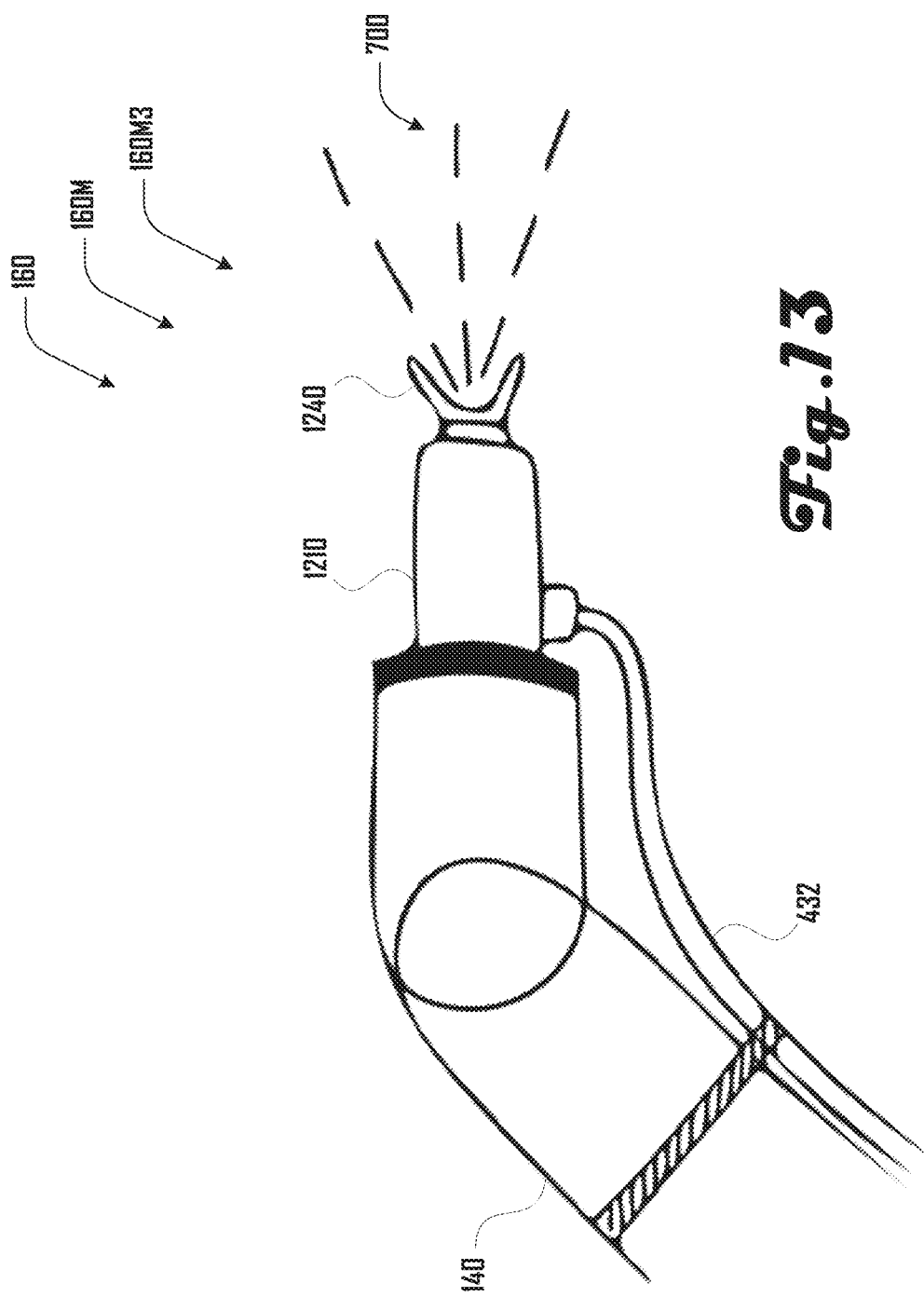

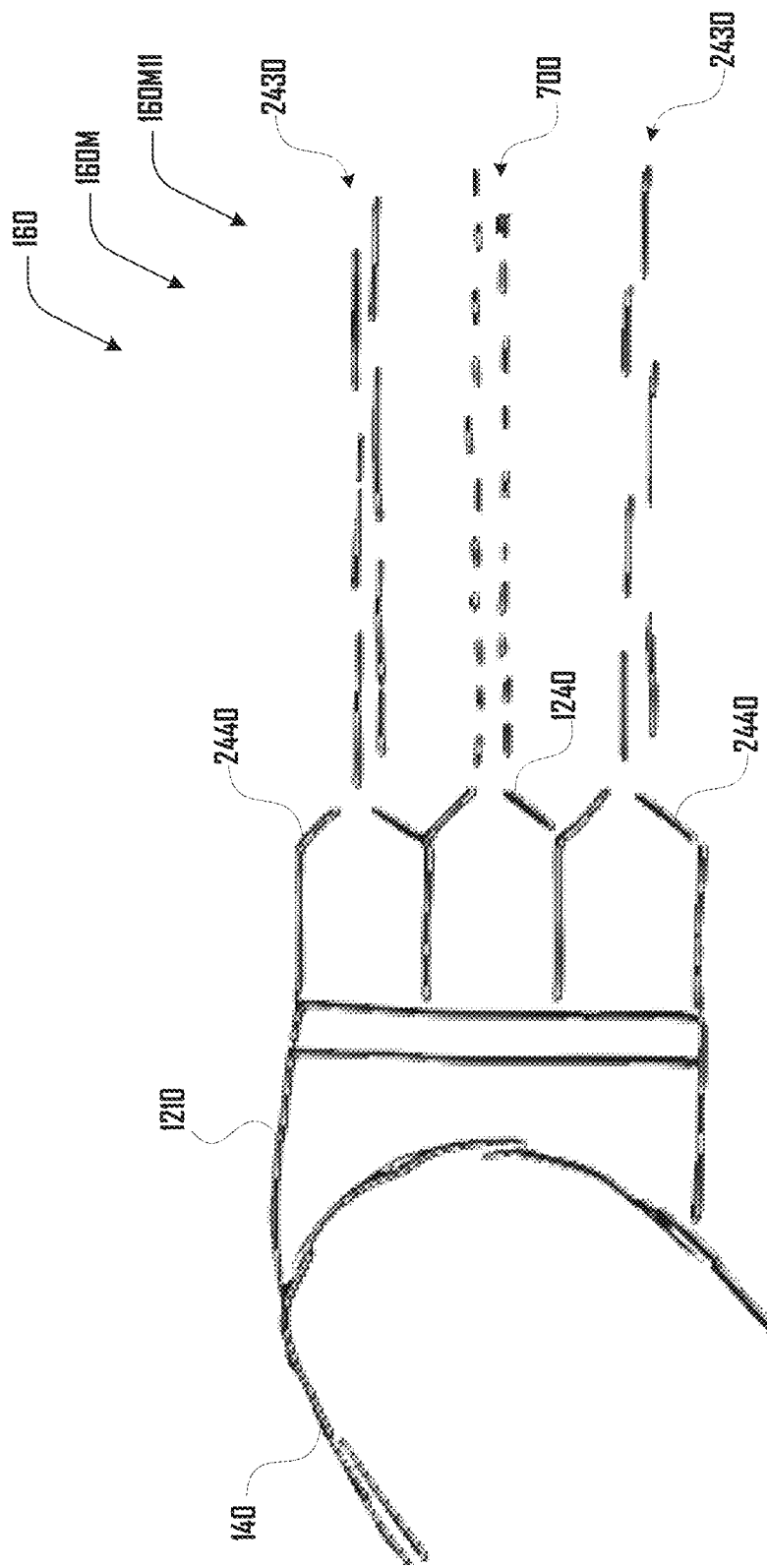

ONLY

AUTOMATED WALL FINISHING SYSTEM AND METHOD

CROSS-REFERENCE TO RELATED APPLICATIONS

This application is a non-provisional of, and claims the benefit of U.S. Provisional Application No. 62/562,981, filed Sep. 25, 2017, which application is hereby incorporated herein by reference in its entirety and for all purposes.

This application is also related to U.S. Non-provisional applications filed contemporaneously herewith having respective application Ser. Nos. 15/942,158, 15/942,193, 15/941,886, 15/942,318, 15/942,087, 15/942,286 and 15/941,974 and respectively entitled "AUTOMATED DRYWALL PLANNING SYSTEM AND METHOD," "AUTOMATED DRYWALL CUTTING AND HANGING SYSTEM AND METHOD," "AUTOMATED DRYWALL MUDDING SYSTEM AND METHOD," "AUTOMATED DRYWALL SANDING SYSTEM AND METHOD," "AUTOMATED DRYWALL PAINTING SYSTEM AND METHOD," "AUTOMATED DRYWALLING SYSTEM AND METHOD," and "AUTOMATED INSULATION APPLICATION SYSTEM AND METHOD." These applications are hereby incorporated herein by reference in their entirety and for all purposes.

BRIEF DESCRIPTION OF THE DRAWINGS

FIGS. 6a and 6b illustrate example embodiments of a substrate in accordance with various embodiments.

FIGS. 7a and 7b illustrate an embodiment of an automated compound application process where the joint compound is applied in a thick layer using a sprayer.

FIG. 10 illustrates an embodiment of a wall finishing system applying a coating to a substrate in accordance with one embodiment.

FIG. 11 illustrates an embodiment of a coating end effector configured to automatically dispense and apply joint tape at seams between substrate edges.

FIG. 12 illustrates one embodiment of a coating end effector that includes a spray gun that is coupled onto the robotic arm.

FIG. 13 illustrates another embodiment of a coating end effector that includes a spray gun that is coupled onto the robotic arm.

FIG. 15 illustrates an example embodiment of a coating end effector that includes a spray pattern detection mechanism, in which a vision system can be used to monitor the pattern of coating spray coming out of the nozzle to detect clogs, nozzle wear, low pressure, or other problems with the spray gun or related system such as coating lines, coating source or the like.

FIG. 24 illustrates another example embodiment of a coating end effector that comprises a fluid stream nozzle and coating nozzle that can be part of a spray gun.

Figure 1:
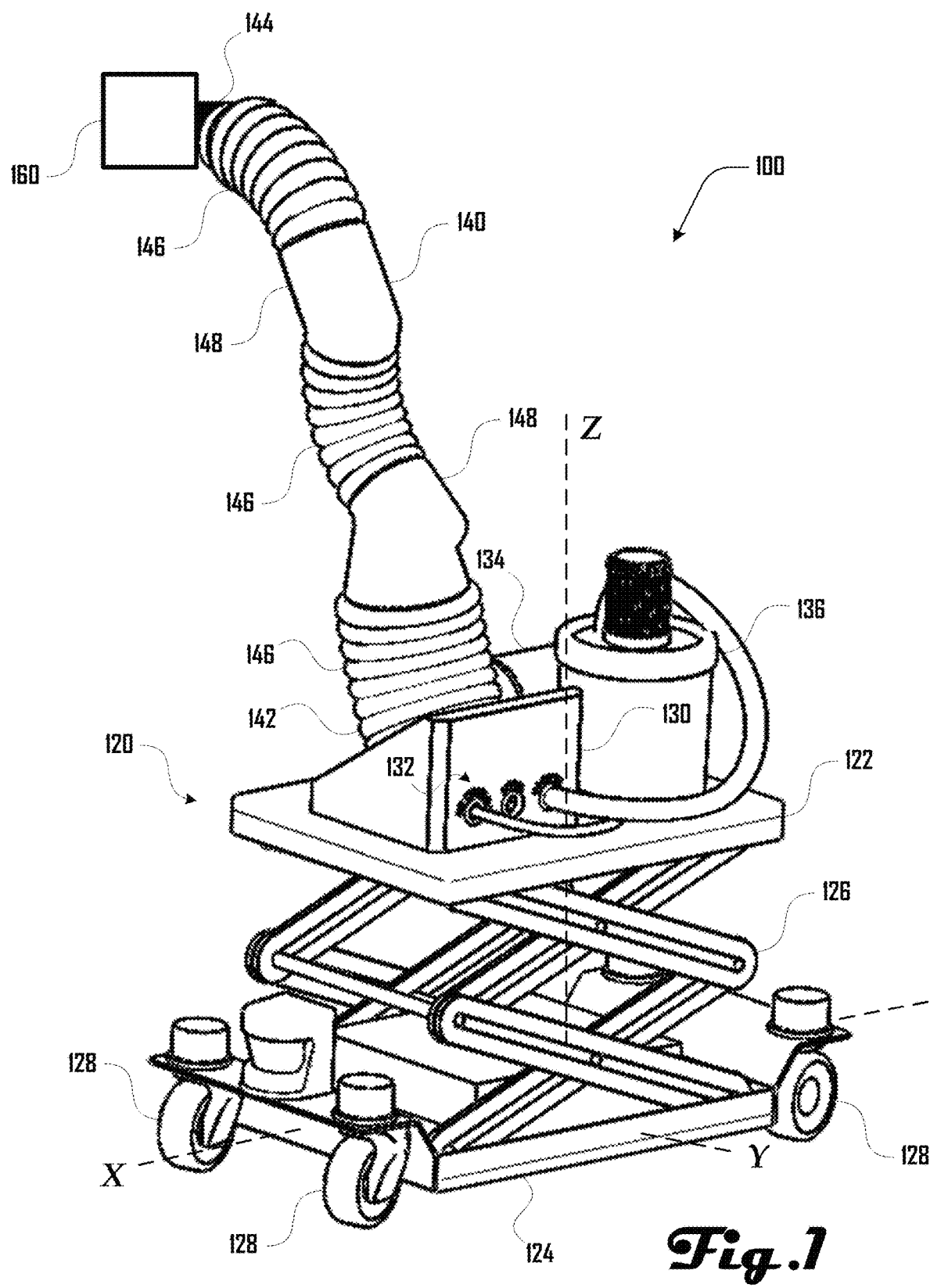
FIG. 1 is an exemplary perspective drawing illustrating an embodiment of an automated surface installation and finishing system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure pertains to an automated drywalling finishing system, which in some embodiments can be used for generating a wall, finishing a wall, or the like. Further examples can be used for drywalling, including one or more of planning a configuration and location of drywall pieces on a wall assembly, cutting drywall pieces, hanging drywall pieces, performing mud work on hung drywall pieces, performing sanding on mudded drywall pieces and painting sanded drywall pieces.

Various aspects of the present disclosure pertain to a surface finishing system and method for spraying plaster, stucco, parex, gypsum, or the like, over a porous substrate material to create a wall. In some examples, the substrate material can comprise mesh, paper, cloth surface, lath, buttonboard, rock lath, rainscreen, drywall board, a porous surface, or the like. The substrate material can be flexible to follow curved or complex contours in various examples. The material may be transported in rolls or sheets and fastened to load bearing structures to generate a portion of a wall. The substrate can also comprise a woven structural cabler, woven electrical cables, or the like. The substrate can be instrumented with sensors that measure humidity, temperature, conductivity, sound, and the like, which can be used to provide feedback during the spraying process; to serve as in wall-sensors for detection of leaks in the walls, temperature and humidity of the room, environmental problems; or for other suitable purposes.

In accordance with a finishing method of one embodiment, a substrate is attached to wood, metal, concrete or any structural material and a coating is sprayed onto the substrate. The coating material can comprise plaster, gypsum, concrete, stucco or other suitable mineral formulation. The coating may also comprise polymers such as latex and acrylics, as well as adhesion additives including glue and other bonding agents. The coating can comprise a synthetic material such as Parex, an acrylic synthetic stucco, or the like.

One aspect pertains to systems and methods for automated mixing, delivering, applying, curing, and/or drying coatings onto a substrate. In one embodiment, an automated surface finishing system can be used to mix, deliver, apply, and dry coatings onto porous substrates. The automated surface finishing system can be used to apply tape on seams between substrate edges, apply coating or plaster onto the tape and substrate, expedite the drying process, or any combination of these processes. The automated surface finishing system can also be used to apply the coating and achieve any level of drywall finish including between level 0 and level 5. The automated surface finishing system can utilize joint compound known as mud or setting type compound also known as hot mud. It can also utilize plaster, gypsum, polymer coatings, or the like in some example. Joint compound as discussed herein can encompass premixed, topping, taping, multi-use, all-purpose, and setting type compounds. The automated surface finishing system can also be used with other coatings including plaster, cement, stucco, and paint applied onto drywall, lath, mesh or another suitable substrate. The automated surface finishing system can cover how the coating is prepared, how it is delivered onto the substrate and how it is set, cured or dried.

The methods described in this disclosure can be conducted manually or automatically using an automated system. The automated system can comprise a robotic manipulator, vision system, tool for cutting a substrate, tool for attaching the substrate to the structural material, measurement system, mobile cart, coating material pump, powered finishing tools, power sprayer and any combination of these components. The robotic arm and mobile base can be driven using pressurized fluids, electric motors, cable drives, belt drives, solenoids, voice coils, or any suitable combination of power source. The automated surface finishing system can be electrically or gas powered; it may also utilize pressurized fluid from an external source. The automated system can also take the form of a gantry, where a tool is positioned using an x-y-z stage. The tool-holder can have additional degrees of freedom to orient a tool or end effector or change the position of the tool.

The automated systems and methods disclosed can encompasses all or any of the steps of preparing for, generating and finishing a wall assembly or other portions of a structure, from planning the layout of the substrate material, to attaching the substrate to structural members, to spraying a coating, and finishing the coating. Finishing steps can include but are not limited to troweling, sanding, polishing, knocking-down, applying a texture finish, smoothing, compacting, leveling, floating, edging, cutting grooves or expansion gaps, painting, stenciling, and the like. The automated system can be used to control the finishing tools allowing for controlled material application, removal, and finishing.

A vision system, measurement sensors, and/or model of a room or structure can be used to determine how a substrate material should be cut to cover the surface. The vision system (which can comprise one or more camera, LIDAR, radar, sonar, or the like), can be used to create a model of the structural material including studs and determine how the system should be used to cover the structures with the substrate and the coating. The automated system can utilize a computational planner that utilizes one or both of the models captured by the vision system and the building plan to determine how the automated system will perform all or any of the steps in a sprayed-on walls process. The automated system can be used to cut, trim, and/or finish the edges of the substrate material. The layout of the substrate can be optimized to minimize the number of breaks or seams in the substrate or to control the location of seams. The substrate material can be hung or attached to the structure manually or using the automated system. The substrate can be attached by nails, screws, staples, glue, anchors or any other suitable fixing component. The substrate material may be overlapped at breaks or can generate seams.

Figure 2:
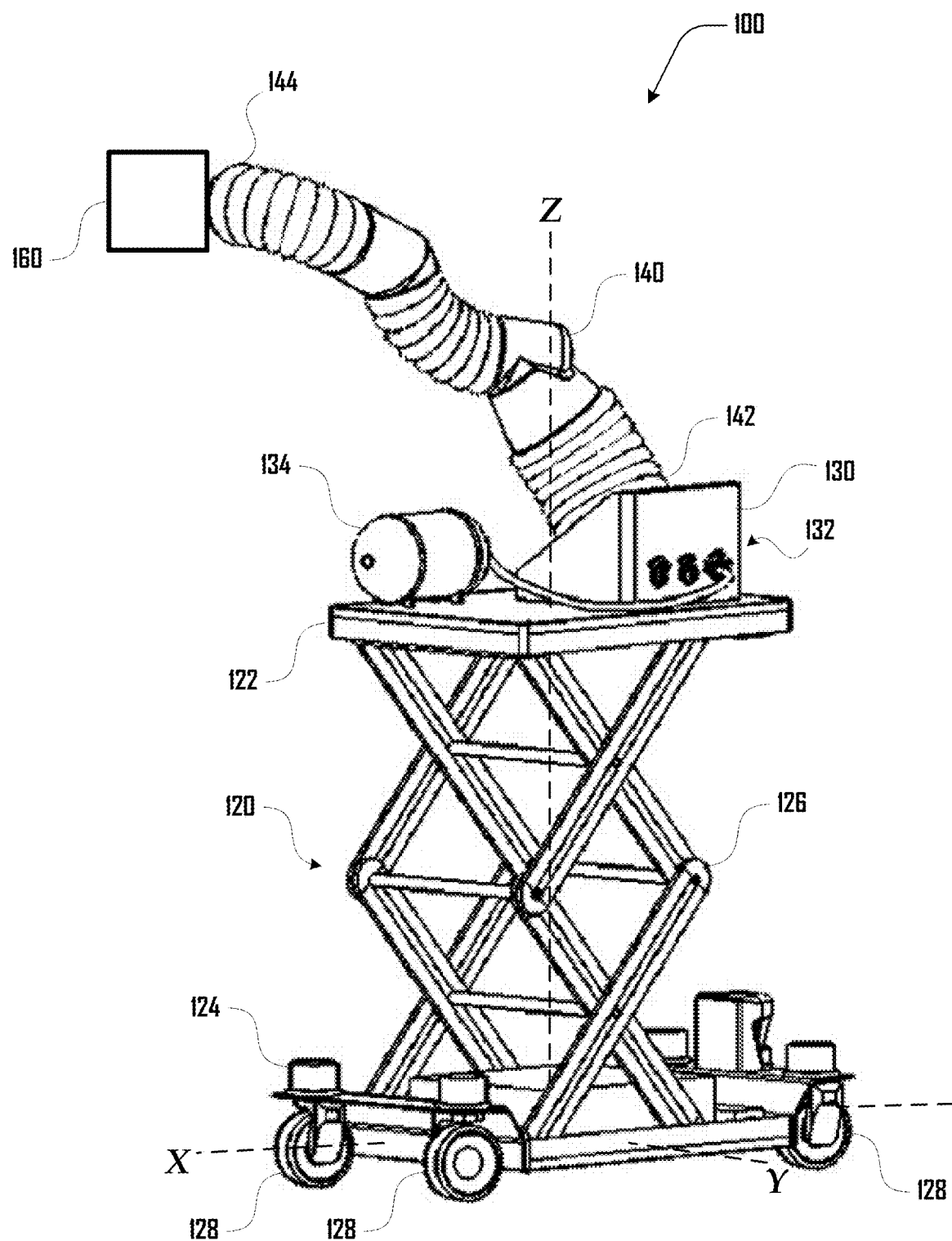
FIG. 2 is an exemplary perspective drawing illustrating another embodiment of an automated wall finishing system.

Turning to FIGS. 1 and 2, examples of an automated surface finishing system 100 are illustrated, which includes a base unit 120, a robotic arm 140 and an end effector 160. The base unit 120 comprises a platform 122 and a cart 124 with a lift 126 disposed between the platform 122 and cart 124. The cart 124 can be configured to be disposed on the ground and move within an XY plane defined by axes X and Y, and the lift 126 can be configured to raise the platform 122 up and down along axis Z, which is perpendicular to axes X and Y.

In the examples of FIGS. 1 and 2, the cart 124 can comprise a plurality of wheels 128, which can be used to move the cart 124 and surface finishing system 100 on the ground in the XY plane. Such movement can be motorized or can be non-motorized. For example, in some embodiments, the surface finishing system 100 can be configured for automated movement of the cart 124, motorized movement based on input from a user and/or non-motorized movement based on physical movement by a user. Additionally, while an example having wheels 128 is shown in some examples herein, it should be clear that the cart 124 can be configured for motorized and/or non-motorized movement via any suitable structures, systems, or the like.

In the examples of FIGS. 1 and 2, the lift 126 is shown comprising a scissor lift that can raise and lower the platform 122 relative to the cart 124 along axis Z. Such movement can be motorized or can be non-motorized. For example, in some embodiments, the surface finishing system 100 can be configured for automated movement of the lift 126, motorized movement of the lift 126 based on input from a user and/or non-motorized movement based on physical operation of the lift 126 by a user. Additionally, while an example of a scissor lift is shown herein, it should be clear that any suitable lift system can comprise the lift 126 without limitation.

The platform 122 can comprise a hub 130, which can couple with the robotic arm 140 at a base end 142 of the robotic arm 140. The hub 130 can comprise an input interface 132 that allows for various systems to couple with the hub 130, which can allow for resources provided by such systems to be provided to the robotic arm 140 and/or the end effector 160 coupled at a distal end 144 of the robotic arm 140 as discussed in more detail herein. For example, a pneumatic source, a power source, a vacuum source, a paint source, a coating or joint compound source, or the like can be coupled to the hub 130. FIG. 1 illustrates an example having an air compressor 134 and a vacuum source 136 coupled to the hub 130. FIG. 2 illustrates an example having an air compressor 134 coupled to the hub 130, which can be used to power pneumatic actuators 146 of the robotic arm 140 and/or provide compressed air to the end effector 160 at the distal end 144 of the robotic arm 140.

In various embodiments, the robotic arm 140 can comprise any suitable robotic arm or positioning stage system, which can include pneumatic actuators, electric actuators, and the like. The robotic arm 140 can have any suitable number of degrees of freedom. Although the examples of FIGS. 1 and 2 illustrate an example having pneumatic actuator units 146 separated by arm couplers 148, this example configuration should not be construed to be limiting on the wide variety of robotic arms 140 or positioning stages that are within the scope and spirit of the present disclosure.

As discussed in more detail herein, an end effector 160 can be coupled at the distal end 144 of the robotic arm 140. In some examples, the automated surface finishing system 100 can comprise modular and/or multi-use end effectors 160, which can be configured for various drywalling, construction, or other tasks. For example, as discussed herein, end effectors 160 can be configured for substrate planning, substrate hanging, applying coating or joint compound to hung substrate, sanding the coating, painting, and the like. Although various examples herein relate to drywalling and construction, further embodiments of the surface finishing system 100 can be configured for any suitable tasks, including construction tasks, manufacturing tasks, gardening tasks, farming tasks, domestic tasks, and the like. Accordingly, the discussions herein related to drywalling and construction should not be construed to be limiting on the wide variety of tasks that the system 100 can be configured for.

Figure 3:
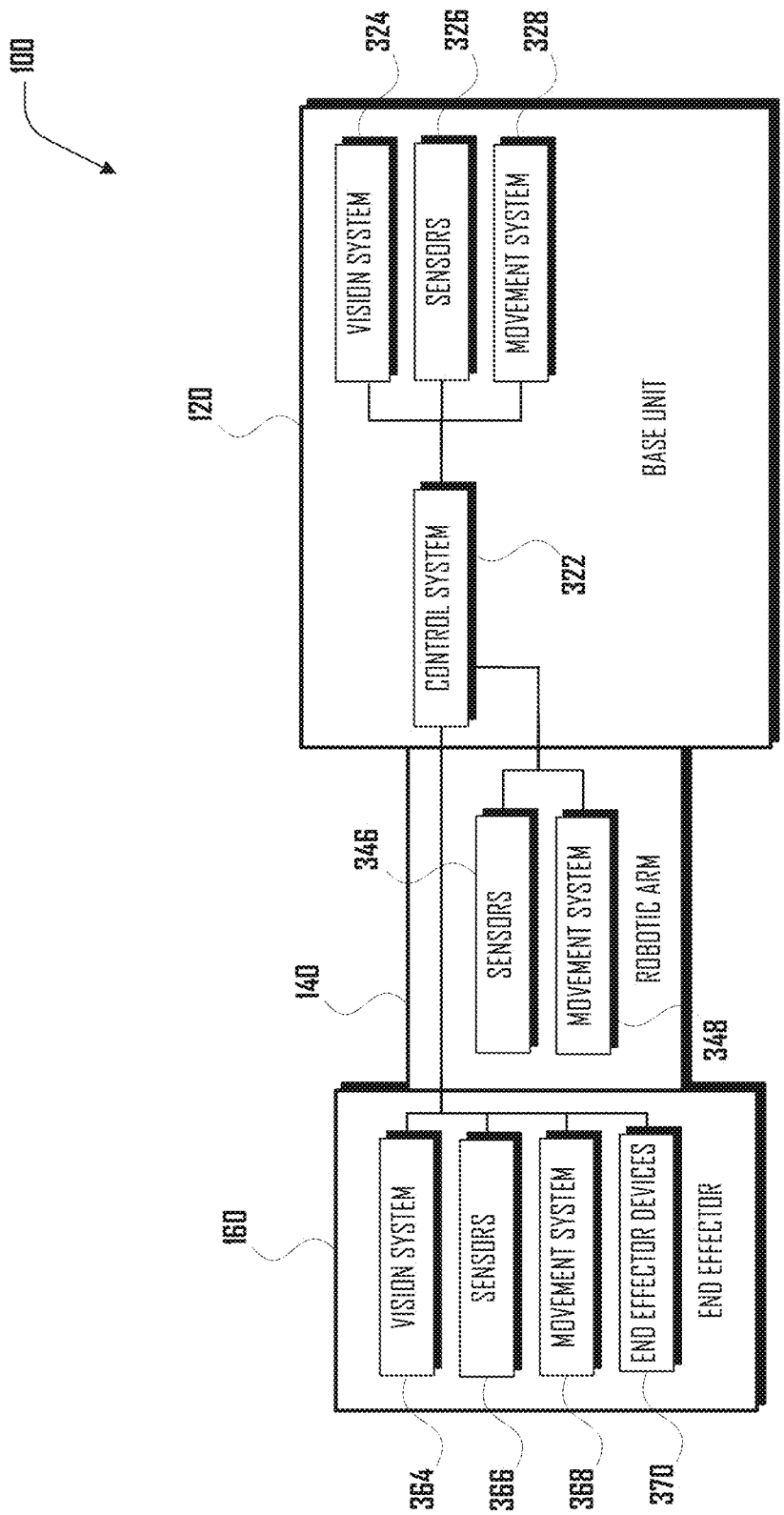
FIG. 3 is an exemplary block diagram illustrating systems of an automated wall finishing system in accordance with one embodiment.

Turning to FIG. 3, a block diagram of a surface finishing system 100 is illustrated, which includes a base unit 120 coupled to a robotic arm 140, which is coupled to an end effector 160. The base unit 120 is shown comprising a control system 322, which is operably coupled to a vision system 324, sensors 326, and a movement system 328. The robotic arm 140 is shown comprising sensors 346 and a movement system 348, which are operably coupled to the control system 322. The example end effector 160 is shown comprising a vision system 364, sensors 366, a movement system 368, and one or more end effector devices 370, which are operably connected to the control system 322.

In various embodiments, the connections between the control system 322 and respective vision systems 324, 364; respective sensors 326, 346, 366; respective movement systems 328, 348, 368; and end effector devices 370 can comprise any suitable type of connection including wired and/or wireless connections. For example, such connections can be configured for digital and/or analog communication of information between respective elements.

The vision systems 324, 364 can comprise one or more suitable vision system including one or more visible spectrum camera, radar, light detection and ranging (LIDAR) system, sonar, infrared camera, thermal camera, stereo cameras, structured light camera, laser scanners, and the like. The vision systems 324, 364 can comprise the same or different elements. Additionally, in some embodiments, one or both of the vision systems 324, 364 can be absent. In some embodiments, the robotic arm 140 can comprise a vision system.

The sensors 326, 346, 366 can comprise any suitable sensors in various embodiments including one or more sensors of humidity, temperature, air flow, laser curtains, proximity sensors, force and torque sensors, pressure sensors, limit switches, rotameter, spring and piston flow meter, ultrasonic flow meter, turbine meter, paddlewheel meter, variable area meter, positive displacement, vortex meter, pitot tube or differential pressure meters, magnetic meters, humidity sensor, conductivity sensor and depth or thickness sensors. The sensors 326, 346, 366 can comprise the same or different elements. Additionally, in some embodiments, one or more of the sensors 326, 346, 366 can be absent.

The movement systems 328, 348, 368 can comprise any suitable movement systems in various embodiments including one or more of an electric motor, pneumatic actuators, piezo electric actuator, and the like. For example, in some embodiments the movement system 328 of the base unit 120 can comprise the lift 126 and motors that drive wheels 128 of the cart 124 (see FIGS. 1 and 2). In another example, the movement system 348 of the robotic arm 140 can comprise pneumatic actuators 146 as illustrated in the examples of FIGS. 1 and 2. In various embodiments, the movement system 368 of the end effector 160 can comprise motors or other systems that are configured to move, change the orientation of, rotate, or otherwise configure the end effector 160. In some embodiments, one or more of the movement systems 328, 348, 368 can be absent.

As discussed herein, the one or more end effector devices 370 can comprise various suitable devices, including a cutting device, hanging device, coating device, sanding device, painting device, vacuum device, and the like. Other suitable devices can be part of an end effector 160 and can be selected based on any desired task that the end effector 160 may be used for.

As discussed in more detail herein, the control system 322 can receive data from the vision systems 324, 364 and sensors 326, 346, 366 and can drive the movement systems 328, 348, 368 and one or more end effector devices 370 to perform various tasks including substrate planning, substrate hanging, applying coating or joint compound to hung substrate, sanding the coating, painting, and the like. Accordingly, the control system 322 can drive the surface finishing system 100 to perform various suitable tasks, with some or all portions of such tasks being automated and performed with or without user interaction. The control system can comprise various suitable computing systems, including one or more processor and one or more memory storing instructions that if executed by the one or more processor, provide for the execution of tasks by the automated surface finishing system 100 as discussed in detail herein. Additionally, while a control system 322 is shown as being part of the base unit 120, in further embodiments, the control system can be part of the robotic arm 140 or end effector 160. Also, further examples can include a plurality of control systems and/or control sub-systems, which can be suitably disposed in one or more of the base unit 120, robotic arm 140, and or end effector 160.

Figure 4:
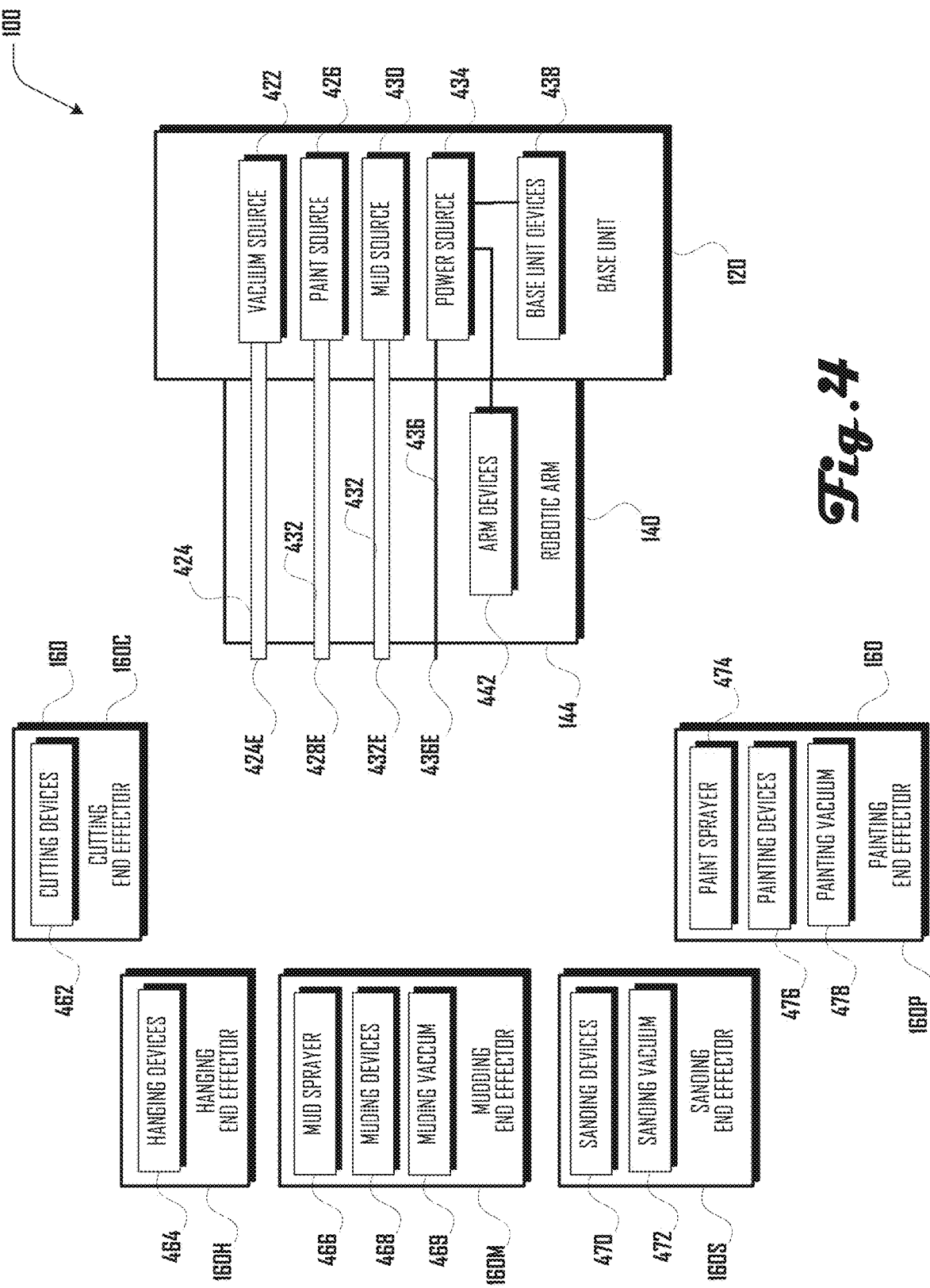
FIG. 4 is an exemplary block diagram illustrating systems of an automated wall finishing system in accordance with one embodiment, including a plurality of end effectors configured to couple to an end of a robotic arm.

Turning to FIG. 4, an exemplary block diagram illustrating systems of an automated surface finishing system 100 that includes a base unit 120 coupled to a robotic arm 140 and including a plurality of end effectors 160 configured to couple to the distal end 144 of the robotic arm 140. In this example, the end effectors 160 include a cutting end effector 160C, a hanging end effector 160H, a coating end effector 160M, a sanding end effector 160S and a painting end effector 160P.

As shown in FIG. 4, the base unit 120 can comprise a vacuum source 422, a paint source 426, a coating source 430, a power source 432, and one or more base unit devices 438. In various embodiments, one or more of the vacuum source 422, paint source 426, coating source 430, and power source 432 can couple with a hub 130 (FIGS. 1 and 2) and provide resources to an end effector 160 coupled at the distal end 144 of the robotic arm 140 and/or to the robotic arm 140. For example, the vacuum source 422 can be coupled with a vacuum tube 424 that extends via the robotic arm 140 to an end 424E, which can couple with an end effector 160 as discussed herein. The paint source 426 can be coupled with a paint tube 432 that extends via the robotic arm 140 to an end 432E, which can couple with an end effector 160 as discussed herein. The coating source 430 can be coupled with a coating tube 432 that extends via the robotic arm 140 to an end 432E, which can couple with an end effector 160 as discussed herein.

The power source 434 can be coupled with a power line 436 that extends via the robotic arm 140 to an end 436E, which can couple with an end effector 160 as discussed herein. Additionally, the power source 434 can provide power to arm devices 442 of the robotic arm 140 (e.g., sensors 346 and movement system 348) and to base unit devices 438 of the base unit 120 (e.g., control system 322, vision system 324, sensors 326 and movement system 328). In various embodiments, the power source can comprise one or more batteries and/or can be configured to plug into wall receptacles at a work site. For example, a power cord can be coupled to the power source 438, which allow the surface finishing system 100 to be powered by local power at a worksite via a wall receptacle, generator, external batteries, or the like. However, in some embodiments, the automated surface finishing system 100 can be completely self-powered and can be configured to operate without external power sources at a worksite. In further embodiments, the robotic arm 140 and/or end effectors 160 can comprise a separate power source that can be separate from the power source 438 of the base unit.

In various embodiments, the automated surface finishing system 100 can be configured to perform a plurality of tasks related to installing and finishing surfaces in construction. In such embodiments, it can be desirable to have a base unit 120 and robotic arm 140 that can couple with and operate a plurality of different end effectors 160 to perform one or more tasks or portions of tasks related to drywalling. For example, the cutting end effector 160C, hanging end effector 160H, coating end effector 160M, sanding end effector 160S and painting end effector 160P can be selectively coupled with the robotic arm 140 at the distal end 144 to perform respective tasks or portions of tasks related to surface finishing.

For example, the cutting end effector 160C can be coupled at the distal end 144 of the robotic arm 140 and coupled with the power line 436 to power cutting devices 462 of the cutting end effector 160C. The cutting end effector 160C can be controlled by the automated surface finishing system 100 to cut substrates or perform other cutting operations. In some examples, the cutting end effector 160C can comprise a cutting vacuum that is coupled to vacuum source 422 via the vacuum line 424 to ingest debris generated by cutting done by the cutting end effector 160C.

The hanging end effector 160H can alternatively be coupled at the distal end 144 of the robotic arm 140 and coupled with the power line 436 to power hanging devices 464 of the hanging end effector 160H. The hanging end effector 160H can be controlled by the automated surface finishing system 100 to hang substrate, assist with substrate hanging, or the like.

The coating end effector 160M can alternatively be coupled at the distal end 144 of the robotic arm 140 and coupled with the power line 436 to power coating devices 466 and/or coating applicators 468 of the coating end effector 160M. The coating end effector 160M can be controlled by the automated surface finishing system 100 to perform "mudding" or "coating work" associated with surface finishing, including application of joint compound (also known as "mud") to joints between pieces of hung substrate, and the like. Additionally, the coating end effector can also be configured to apply joint tape, or the like. Additionally, the coating end effector 160M can comprise a coating vacuum 469 that is coupled to vacuum source 422 via the vacuum line 424 to ingest excess joint compound or coating generated by the coating end effector 160M.

The sanding end effector 160S can alternatively be coupled at the distal end 144 of the robotic arm 140 and coupled with the power line 436 to power sanding devices 464 of the sanding end effector 160S. The sanding end effector 160S can be controlled by the automated surface finishing system 100 to sand coatings, and the like. Additionally, the sanding end effector 160S can comprise a sanding vacuum 472 that is coupled to vacuum source 422 via the vacuum line 424 to ingest debris generated by sanding done by the sanding end effector 160S.

The painting end effector 160P can alternatively be coupled at the distal end 144 of the robotic arm 140 and coupled with the power line 436 to power a paint sprayer 474 and/or painting devices 476 of the painting end effector 160P. The painting end effector 160P can be controlled by the automated surface finishing system 100 to paint drywall or other surfaces. Additionally, the painting end effector 160P can comprise a painting vacuum 472 that is coupled to vacuum source 422 via the vacuum line 424 to ingest excess paint spray generated by painting done by the painting end effector 160P.

Although the example automated surface finishing system 100 of FIG. 4 is illustrated having five modular end effectors 160, other embodiments can include any suitable plurality of modular end effectors 160, with such end effectors 160 having any suitable configuration, and being for any suitable task or purpose. In further examples, the automated surface finishing system 100 can comprise a single end effector 160, which can be permanently or removably coupled to the robotic arm 140. Additionally, in some examples a given end effector 160 can be configured to perform a plurality of tasks. For example, in one embodiment, an end effector 160 can be configured for coating work, sanding and painting. Accordingly, the example of FIG. 4 should not be construed to be limiting on the wide variety of other embodiments that are within the scope and spirit of the present disclosure.

Figure 5:
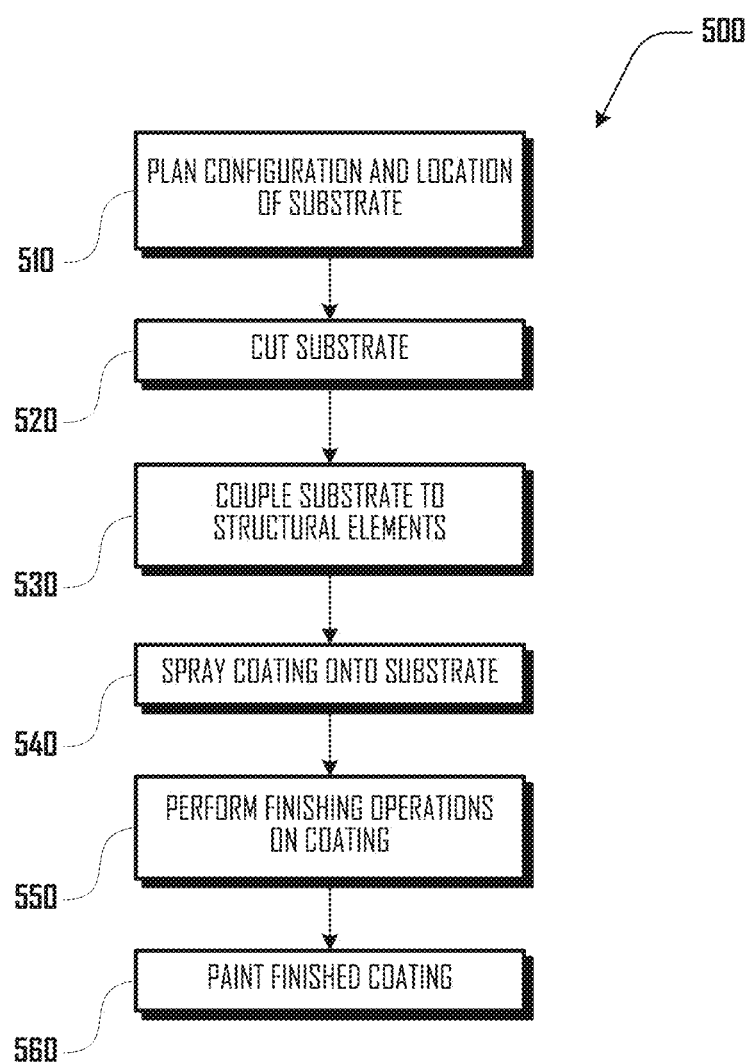
FIG. 5 illustrates a block diagram of method of installing surfaces in accordance with one embodiment.

Turning to FIG. 5, a method 500 of drywalling is illustrated, which can be performed in whole or in part by an automated surface finishing system 100 as discussed herein. The example method 500 or portions thereof can be performed automatically by the automated surface finishing system 100 with or without user interaction.

The method 500 begins at 510, where a configuration and location of substrate pieces is planned. As discussed herein, in various examples a substrate can comprise one or more of mesh, paper, cloth surface, lath, buttonboard, rock lath, rainscreen, a porous surface, drywall board, For example, in some embodiments, the automated surface finishing system 100 can be configured for automated scanning and mapping of a worksite (e.g., framing elements of a house or building) and automated planning of the shapes and sizes of substrate to be disposed at the worksite to generate walls, ceilings, and the like. Such scanning and mapping can include use of vision systems 324, 364 (FIG. 3) and the like. Planning of shapes and sizes of substrate can be based at least in part on the scanning and mapping and can be performed by a computing device 100 of the automated surface finishing system 100 or other suitable device which can be proximate or remote from the automated surface finishing system 100. In some embodiments, such planning can be based at least in part on building plans or maps that were not generated by the automated surface finishing system 100.

The method 500 continues to 520, where substrate pieces are cut. Such cutting can be based at least in part on the scanning, mapping and planning discussed above. Additionally, such cutting can be performed by the automated surface finishing system 100 at a worksite (e.g., via a cutting end effector 160C) or can be performed by a system remote from the worksite and generated substrate pieces can be delivered to the worksite.

At 530, generated pieces of substrate can be hung at the worksite, including hanging on studs, beams, posts, wall plates, lintels, joists, and the like, to define walls, ceilings and the like. Screws, nails or other suitable fasteners can be used to hang the substrate. In some embodiments, the automated surface finishing system 100 can be configured to hang substrate including positioning the substrate and coupling the substrate in a desired location. In some examples, the automated surface finishing system 100 can be configured to assist a user in hanging substrate, including holding the substrate and/or tools in place while the user fixes the substrate pieces in place. In various examples, a hanging end effector 160H can be used for such substrate hanging.

At 540, coating work can be performed on the hung substrate. For example, a coating such as plaster, stucco, parex, gypsum, or the like (known also as "mud") can be applied to seams or joints between adjacent pieces of substrate, over the substrate, and/or can be applied over fasteners such as screws or the like. In various examples, a coating end effector 160M can be used to perform such coating work.

At 550, sanding can be performed on the coatings. For example, where wet joint compound is applied to hung substrate, the joint compound can be allowed to dry and can then be sanded by a sanding end effector 160S of an automated surface finishing system 100. In various examples, sanding can be performed to smooth out joint compound to generate a planar or otherwise consistent profile on the pieces of substrate in preparation for painting. At 560, the sanded substrate pieces can be painted. For example, in various examples, a painting end effector 160P of an automated surface finishing system 100 can be used to paint the coating.

In some embodiments, after spraying the coating onto the substrate, the coating can be worked into the substrate using trowels, edges, and other suitable tools. This process can be done manually or using the automated system 100. The tools may be powered using electricity, compressed air, hydraulics or a combination of these. The tools may be instrumented with sensors to measure humidity, pressure, viscosity, roughness, force, and light reflectivity. After the coating has dried, it may be treated with manual or powered tools to create the desired finish, texture, and material properties. The tools may be used by workers or the automated system 100 can use the tools to affect the surface. The system 100 may use tools such as sanders, polishers, powered trowels, or the like. The tools or automated system(s) 100 may utilize vacuum systems to capture particles or fumes. The sensors on the tools may be used to control the force, pressure, speed with which the tools are used on the surface. The system 100 may utilize sensors to capture the finish or texture of the coating at different stages. Cameras, laser systems, texture analyzers, reflectivity sensor, conductivity measurements, and/or other contact or non-contact systems may be used to determine the surface finish of the coating and be used as feedback for the tools and process.

The coating can be combined with a paint, tint, pigment, or the like before and/or after application on a substrate or other surface. The coating can also be subsequently sprayed with a paint or sealant to create the finished surface after the coating is applied to a substrate or other surface. Tinted plaster, gypsum, or the like, can be sprayed to create a colored surface in a single coating. Other additives can also be mixed into the coating to control curing or drying time, surface finish, material properties, and the like. Material properties can include hardness, reflectivity, sound insulation, thermal insulation, fire rating, texture, finish, and the like. Accelerated curing or drying of the coating can be achieved through light or temperature activation that can be passive or active; via exposure to air as the coating is sprayed; via addition of a chemical accelerant, curing agent, or catalyst during mixing; during spraying or as an additional coating; or the like.

Chopped fibers and other particles can be added to the coating before, during or after application to a substrate to create a composite. The fibers can act to increase the strength of the coating and can create mechanical bonds to the substrate materials. The fibers can be added directly into the mixture that can be pumped to a nozzle or such fibers can be applied at a nozzle. The substrate can be covered in fibers or features that the coating can attach to.

Tools such as a curing light, heater, or blower can be mounted on the same tool as the sprayer to follow the delivery or can be mounted on another suitable portion of the system 100 or separately therefrom. Additionally, the robotic system 100 can be used after spraying to move such a heater, blower, light, or other suitable tool or device over the substrate or surface. The velocity of the base unit 120 can be controlled to set a given work time for each of the tools. The curing or drying time can also be controlled by mixing powdered material with a volatile solvent instead of water.

Although the method 500 of FIG. 5 relates to hanging and finishing surfaces, it should be clear that other hanging and finishing methods can similarly be employed by the automated surface finishing system 100, including methods related to hanging particle board, plywood, sheet rock, laminate, tile, wall boards, metal sheeting, lath and the like. Similarly the methods can be used with different coatings including plaster, polymer coatings, cement, stucco, organic coatings, and the like. Accordingly, the method 500 of FIG. 5 should not be construed to be limiting.

In one aspect, the present disclosure pertains to systems and methods for automated mixing, delivering, applying, curing, and/or drying coatings onto a substrate. In one embodiment, an automated surface finishing system 100 can be used to mix, deliver, apply, and dry coatings on substrates. The automated surface finishing system 100 can be used to apply tape on seams between substrates, apply joint compound or plaster onto the tape and substrate, expedite the drying process, or any combination of these processes. The automated surface finishing system 100 can also be used to apply the joint tape and compound and achieve any level of drywall finish including between level 0 and level 5. The automated surface finishing system 100 can utilize joint compound known as mud or setting type compound also known as hot mud. Joint compound as discussed herein can encompass pre-mixed, topping, taping, multi-use and all-purpose compounds. The automated surface finishing system 100 can also be used with other coatings including plaster, cement, stucco, and paint applied onto drywall, lath, mesh or another suitable substrate. The automated surface finishing system 100 can cover how the coating is prepared, how it is delivered onto the substrate and how it is set, cured or dried.

The automated surface finishing system 100 can include humidity, temperature, air flow sensors, or the like, to establish environmental conditions for a task. Such sensors can comprise sensors 326, 346, 366 of a base unit 120, robotic arm 140 and/or end effector 160 of the automated surface finishing system 100 (see, e.g., FIG. 3). An automated coating system can utilize these environmental sensors to determine optimal joint compound mixture ratios, set path parameters such as feed speed, thickness of coating applied, blade profiles and pressures, and sprayer settings. The environmental information in conjunction with the coating parameters can be used to determine or estimate drying and setting times for the coating allowing the automated surface finishing system 100 to plan when a next step should begin.

The automated surface finishing system 100 can also determine when the coating has set and dried by measuring the moisture content, thermal conductivity of the covered seam, using a thermal imaging camera or thermometer (contact or non-contact), detecting differences in colors using a camera, or the like. Thermal measurements can be used to infer the moisture content by comparing the temperature of the coating to the surrounding materials, and as the water evaporates from the mixture, the temperature of the compound can be lower than that of the surrounding materials.

Models of the coating drying process can also be used to estimate the time to dry or cure given a set of starting conditions and information about the environment. Similarly, the models of the coating in combination with environmental and substrate information can be used to estimate the drying shrinkage of the coating.

Environmental sensors can be used in conjunction with an HVAC system, heater, air conditioner, fans, or the like, to control the room conditions. The sensor readings can trigger any of these systems or a combination to maintain the room at the desired conditions for quality, reduced drying or setting time, or comfort of the operator. In some embodiments, such environmental control systems can be a part of the automated surface finishing system 100 or can be located external to the automated surface finishing system 100 including environmental controls systems of a worksite. Accordingly, in various embodiments, the automated surface finishing system 100 can be configured to control environmental control systems that are a part of or external to the automated surface finishing system 100, including via wired and/or wireless communication.

A coating system can comprise of a variety of tools that enable the coating system to mix, deliver, apply, smooth, dry, cure a coating, or any combination of these. Such tools can be positioned and controlled using a robotic manipulator, robotic arm, positioning stage, gantry or any combination of these. A single end effector 160 or any multitude of end effectors 160 can be used to complete the task through coordinated or individual paths. The robotic arms 140 or tool stages can be moved around the room using a mobile base unit 120 that can be powered or moved manually by an operator. For example, in some embodiments a coating system of an automated surface finishing system 100 can include one or more coating end effector 160M, and elements associate with the base unit 120, including a coating source 430 (see FIG. 4).

The mobile base unit 120, one or more end effectors 160 and/or one or more robotic arms 140 can include sensors (e.g., sensors 326, 346, 366 as discussed in FIG. 3) to ensure safe operation next to the user. Safety sensors can include but are not limited to laser curtains, proximity sensors, force and torque sensors, pressure sensors, limit switches, or the like. Additionally, the automated surface finishing system 100 can include systems to track location of one or more user relative to end effector 160, robotic arm 140 and/or mobile base unit 120, including speed limiters and/or vision systems, such as LIDAR, radar, sonar, or any combination of these (for example, vision systems 324, 364 of FIG. 3).

As discussed herein, the mobile base 120 can include a vertical lift 126 that can be powered or unpowered. The vertical lift 126 can be used to lift or lower the robotic arm 140, end effector 160 and portions of a coating system, which can be disposed on the end effector 160, platform 122, a gantry or the like. The lift can be instrumented with a position sensor that can be used to capture and control the height of the lift 126. For example such a sensor can comprise the sensors 326 as illustrated in FIG. 3.

Elements of coating system of the automated surface finishing system 100 can be controlled using the control system 322 that takes a variety of inputs (e.g., from sensors 326, 346, 366 and/or vision systems 324, 364) to determine tool paths and/or tool parameters for the platform 122 relative to the cart 124, robotic arm 140, and coating devices 468 and or coating applicator 466 of a coating end effector 160M, which are required to achieve desired coating characteristics.

In various embodiments, the automated surface finishing system 100 can create a map of the target surfaces such as pieces of substrate, joints between pieces of substrate, and the like. This map or model can be created by importing building information modeling (BIM) and/or 2D, 3D plans into a planner system. The map can be created directly by the system by utilizing computer vision or mapping sensors to scan the room (e.g., the automated surface finishing system 100). The scanning technologies can include, and suitable devices including stereo cameras, structured light cameras, LIDAR, radar, sonar, laser scanners, thermal imaging or any combination of these components. For example, in some embodiments, such scanning or vision systems can comprise the vision systems 324, 364

Uploaded 3D or 2D plans can be combined with field data to create a more accurate map of the environment in some examples. The data from different sources can be combined using key features and user input. The map can include the location of framing studs, substrate joints, openings, protrusions, as well as pipes, electrical conduit, ventilation ducts, and any other components installed on the walls or ceilings. These locations may have been derived from the uploaded plans, the room scan, user inputs, and the like. To facilitate the creation of the map, a user can help identify features through analysis of images, tagging of the features physically or digitally. The user can physically tag components using various suitable methods, including but not limited to, a laser, tags, markers or a combination of these. The scanning or vision system can pick up these tags or track them as the user moves around the room and locates the features. The mapping system or planner can also take as an input a layout of how the substrate pieces were hung in the room to locate seams. This layout can be an input from the automated surface finishing system 100 or a system that is separate from the automated surface finishing system. The location of framing, type of anchors used and layout of the substrate can provide information on the planarity, flatness of the wall, and location of high or low points, which can be used determine tool paths and tool parameters.

The automated surface finishing system 100 can include a computational planner (e.g., implemented by the control system 322 of the base unit 100) which can utilize a map uploaded to the system 100 or created by the system 100 to determine tool paths and/or tool parameters to achieve a desired coating application. The planner can create toolpaths off a global map of a room and then update these paths given updated local measurements once the end effector 160, robotic arm 140, and/or mobile base 120 are in place. The planner can be informed by vision system data (e.g. obtained by one or both of vision systems 324, 364) on the flatness of the wall, user inputs, location of seams as specified by a layout planner or a scan of the room after the substrate was applied. The planner can determine toolpaths and/or tool parameters to enable the automated surface finishing system 100 to apply coating to smooth out joints, seams, low points, high points, and other features to create a visually flat wall.

For example, tool paths can include information corresponding to, or used to determine, instructions for one or more of movement systems 328, 348, 368 to drive the base unit 120, robotic arm 140 and/or end effector 160 to move to perform desired tasks, including applying coating, applying joint tape, and the like. Tool parameters can include various setting for components of the end effector 160 (e.g., setting for the coating applicator 466 and/or coating devices 468 of a coating end effector 160M), including a nozzle selection, a nozzle size setting, coating flow rate, and the like as discussed in more detail herein.

The toolpaths and/or tool parameters can also be determined based on a desired or required finish for completed coating work or for a completed wall assembly. For example, areas of a wall or ceiling that are exposed to changing, harsh, or bright lights can receive a higher quality finish with tighter controls on tool planarity, tool overlaps, thickness and characteristics of compound applied, texture.

The application of coating to a surface can inform how the surface is to be sanded, smoothed or polished to achieve a desired finish. For example, toolpaths and/or tool parameters generated during coating work can serve as inputs for generating toolpaths and/or tool parameters for sanding, which in some examples can enable sanding to be tuned according to the application of the compound, features, and compound characteristics such as how the compound was dried, compound type, compound hardness, and layers of compound applied.

For example, the automated surface finishing system 100 can determine toolpaths and/or tool parameters for performing mud work with a coating end effector 160M, and these determined toolpaths, tool parameters, and/or data associated thereto can be used to determine toolpaths and/or tool parameters for one or more sanding tasks to be performed by the automated surface finishing system 100 using a sanding end effector 160S.

Similarly, determining toolpaths and/or tool parameters for performing coating work with a coating end effector 160M can be based on various suitable inputs, including toolpaths, tool parameters, and/or the like associated with hanging substrate or applying insulation to a wall assembly on which the substrate is hung. For example, the automated surface finishing system 100 can determine toolpaths and/or tool parameters for performing substrate hanging with a hanging end effector 160H, and these determined toolpaths, tool parameters, and/or data associated thereto can be used to determine toolpaths and/or tool parameters for one or more coating tasks to be performed by the automated surface finishing system 100 using a coating end effector 160M.

During coating work, automated surface finishing system 100 can apply a layer or profile of compound that is greater than a thickness that can be conventionally manually applied by human workers to allow for a sanding system (e.g., a sanding end effector 160S) to sand down the compound to a desired plane. For example, in some examples, manual joint compound application mud can be profiled to taper from high points. The automated surface finishing system 100 can apply a thicker layer than normal enabling a sanding system to sand down high points to be level to the adjacent surfaces.

For example, related applications that are incorporated herein illustrate one example of a mud application profile for a pair of drywall pieces that form a seam, where joint compound is applied over consecutive layers, which can include joint tape, to taper out the high points of joint compound over a wider area. Sanding can then be used to smooth out the final profile. The high points of joint compound can be caused by various features, including the seam, feature, raised stud, defect, or any combination of these. In some embodiments, such a mud application can be undesirable for automated application; however, in further embodiments, such a mud application profile can be employed by an automated system such as the automated surface finishing system 100.

As discussed herein, various types of substrates can be used to generate a wall assembly including a substrate that comprises mesh, paper, plastic, cloth surface, lath, buttonboard, rock lath, rainscreen, drywall board, a porous surface, or the like. For example, FIG. 6a illustrates an example of a two-layer substrate 610 that comprises a porous layer 611 and a less-porous layer 612. The porous layer 611 can have pores where the coating material can enter and adhere, while the less-porous layer 612, which can be attached to a wall or studs, can be non-porous and impermeable to the coating material such that the coating material does not impregnate or permeate through the less-porous layer 612. For example, the less-porous layer 612 can stop the coating material from reaching the opposing side of the substrate. In further embodiments, the less-porous layer 612 can be porous such the coating material is able to soak through, impregnate, or permeate at least a portion of the less-porous layer 612.

Such a configuration of a multi-layer substrate 610 comprising a porous layer 611 and a less-porous layer 612 can be desirable for allowing a fluid coating material to be applied to the substrate 610 as described herein, and when the fluid coating material dries to become rigid or non-fluidic, the porous layer 611 can provide a support matrix for dried coating material to improve the strength of the dried coating material and/or to assist with coupling the dried coating material to the less-porous layer 612 and thereby to the wall or studs that the less-porous layer 612 is coupled to.

Such a multi-layer substrate 610 comprising a porous layer 611 and a less-porous layer 612 can have various suitable configurations. For example, the porous layer 611 and a less-porous layer 612 can be physically separate layers that are coupled via an adhesive, weld, or the like. In other examples, a portion of the porous layer 611 can be embedded in a portion of the porous layer 611 or the porous layer 611 can be an integral part of and can extend from the less-porous layer 612.

Also, one or both of the porous layer 611 and less-porous layer 612 can be rigid or flexible. For example, the less-porous layer 612 can comprise a rigid drywall board or piece of wood and the porous layer 611 can comprise a flexible cloth or batting. In further examples, both the porous layer 611 and less-porous layer 612 can be flexible (e.g., the less-porous layer 612 can comprise an impermeable or semi-permeable paper or plastic and the porous layer 611 can comprise a flexible permeable matrix or mesh of a suitable material. Having both the porous layer 611 and less-porous layer 612 being flexible can be desirable because such a configuration can allow the substrate 610 to be stored in rolls and applied to studs or a wall via the roll, which may or may not include cutting of the substrate 610.

Although various examples include application of the substrate 610 to a wall or studs with the porous layer 611 and less-porous layer 612 being coupled together, in further embodiments, the porous layer 611 and less-porous layer 612 can be applied separately. For example, the less-porous layer 612 can be first applied, and then the porous layer 611 can be applied to the less-porous layer 612.

Various embodiments can include selecting, configuration or changing properties of the substrate 610 to address different surfaces such as walls or ceilings or to control the target finish. The porosity, absorption properties, mesh size, wettability, adhesion properties, anchor spacing, substrate thickness and material composition may be controlled in the substrate to achieve the desired finish or address vertical vs horizontal surfaces. A backing material (e.g., the less-porous layer 612) may be used behind a mesh or porous surface (e.g., the porous layer 611) to set the thickness of the coating. The material thickness of the substrate 610 and/or spacing between substrate 610 and structural surfaces such as studs may also be used to control the thickness of the coating. The substrate 610 can comprise two or more different materials or mesh sizes as a way to control the thickness of the surface. For example, the substrate 610 can comprise any suitable plurality of different layers including two, three, four, five, six, or the like.

In some embodiments, the substrate 610 can be instrumented with one or more asensors that can measure humidity, temperature, conductivity, sound, or the like, which can be used to provide feedback during the spraying process; to serve as in wall-sensors for detection of leaks in the walls, temperature and humidity of the room, or environmental problems; or for other suitable purposes. For example one or both the porous layer 611 and less-porous layer 612 can comprise any suitable type of sensor. In some examples, such sensors can each wirelessly communicate with the system 100. In other examples, such sensors can be operably coupled (e.g., wirelessly or via a wire) to a wall assembly device, home automation system, or other suitable system and the surface finishing system 100 can communicate wirelessly with such a system or device.

Also, while the example of FIG. 6*a* illustrates a substrate 610 having a plurality of layers, further examples can include a substrate having a single layer as shown in FIG. 6*b*, which illustrates a substrate 610 consisting essentially of a less-permeable layer 612. However, in further embodiments, a substrate can consist essentially of the porous layer 611 or less-porous layer 612.

FIGS. 7*a* and 7*b* illustrate an example joint compound application process where the coating 630 is applied in a thick layer using a sprayer that generates a mud spray 700. Such an application process can be performed by the automated drywalling system 100 in various embodiments. The thickness of the coating 630 being applied to the pieces of substrate 610A, 610B defining a seam 620 can allow for a sanding system to be used to sand back high points of coating 630 to a level surface. The high points of coating 630 can be caused by the seam 620, feature, raised stud, defect, or any combination of these.

The substrate 610 and sprayed coating 630 can be used as a stand-alone wall coating system for single-coat applications or as part of a multi-coat wall coating system. A multi-coat wall coating system can comprise two or more layers of the same or different materials applied manually and/or with automation. This can allow for an automated application of a coating 630 to the substrate 610 with desirable structural properties to be followed by an application of a coating 630 with desirable aesthetic finishing properties.

In some embodiments, a substrate 610 can have coating 630 applied as shown in FIGS. 7*a*, 7*b* or via other suitable methods as discussed herein and/or the substrate 630 can be pre-impregnated with a coating material 630 prior to hanging or it may be impregnated by one coating followed by a second material. The substrate 630 can be impregnated with a material similar to pre-preg composites. The coating material 630 in the substrate 610 can be activated or wetted by spraying a liquid material over it the coating material 630 to convert the impregnated material into a rigid coating. The coating 630 may be electrostatically charged and the substrate 610 grounded to accelerate coating particles towards the substrate 630 and improve adhesion and/or reduce overspray of the coating 630. The coating 630 can contain additives to facilitate electrostatic charging.

The 2D or 3D maps created by the automated surface finishing system 100 can be registered to the physical environment utilizing recognizable features such as doors, windows, outlets, corners, or the like. Such registration can also be done using markers, tags, laser outlines that are placed in the room, or the like. A projection and/or visualization system of the automated surface finishing system 100 can find the features or markers and can locate the maps created using these found features or markers. The automated surface finishing system 100 can utilize a user interface to enable the user to help locate the map or projection relative to the environment and resolve any issues or discrepancies. A user can utilize a physical marker to signify key features for the automated surface finishing system 100 allowing the automated surface finishing system 100 to locate the plan relative to the environment. The automated surface finishing system 100 can also use a robotic manipulator or end effector 160 to find target features, markers or surfaces and locate them relative to its own base unit 120 which can be located using a localization system including, but not limited to laser range finders, computer vision, LIDAR, radar, sonar, stereo vision, odometry, IMUs, or any combination of these.

The robotic arm 140 can utilize a compliant or force limiting end effector 160 to enable safe contact with the environment allowing the automated surface finishing system 100 to accurately locate target surfaces, features or components, accommodate errors in positioning without damaging the substrate or the end effector 160. By utilizing the robotic arm 140 and compliant end effector 160 to locate a physical component, the system 100 can establish a point, line, or plane and therefore locate the virtual plan on the environment. Toolpaths can be updated from the virtual plane to the physical plane. Refitting of the toolpaths onto the contacted surfaces can enable the system 100 to deal with errors and discrepancies between the modeled and physical environment. Such tools, features or elements of the system 100 can enable quick on-site calibration using global room wide maps and local measurements. Refitting the toolpaths can allow for errors in positioning of end effector 160, mobile base 120 or robotic arm 140. The system 100, including an end effector 160 can utilize radar, sonar, thermal imaging to establish what is behind the substrate (e.g., drywall), this information can be used to update a virtual map and ensure that no damage is done to any electrical, plumbing or ventilation while working on or about the substrate.

The planner can output tool poses or tool paths for the automated surface finishing system 100 (e.g., for an end effector 160, robotic arm 140, base unit 120) including, but not limited to joint commands, target poses and end effector positions, or any combination of these. The system 100 can also output paths for a gantry system or positioning stage which can be used in conjunction with the robotic arm 140 and/or end effector 160 or without a robot to move and position coating tools (e.g., coating devices 466 and/or coating applicators 468 of a coating end effector 160M). The planner can also output paths for the mobile base 120 to position a gantry, positioning stage, robotic arm 140, end effector 160, or to move a tool to assist a user in the finishing process, or to position visualization and lighting equipment, which may or may not be a part of the automated surface finishing system 100. The mobile base 120 and vertical lift 126 may work in coordination with a user, robotic arm 140, end effector 160 or a combination of these to execute the task. The planner system can control different components of the automated surface finishing system 100 (e.g., the base unit 120, robotic arm 140 and/or end effector 160) allowing for coordinated movements and forces with the target goal of moving the end effector 160 or portions thereof to a desired position under the prescribed forces and moments. The mobile base unit 120 can be used as a rough positioning stage, with the vertical lift 126 setting the height of the robotic arm 140 and end effector 160 which may act as a fine positioning stage.

Figure 8A:
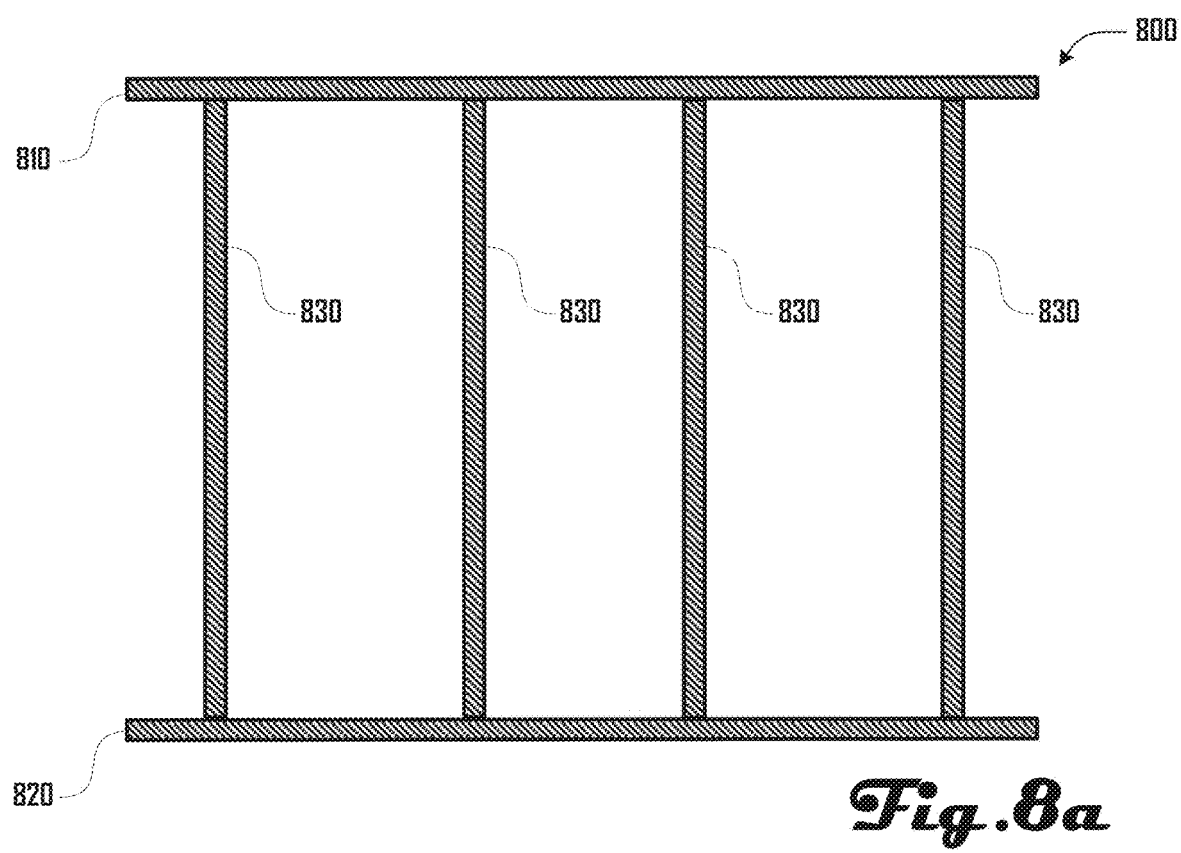
FIGS. 8a, 8b and 9a and 9b illustrate a series of steps in an example method of installing a substrate to generate a wall assembly.
Figure 8B:
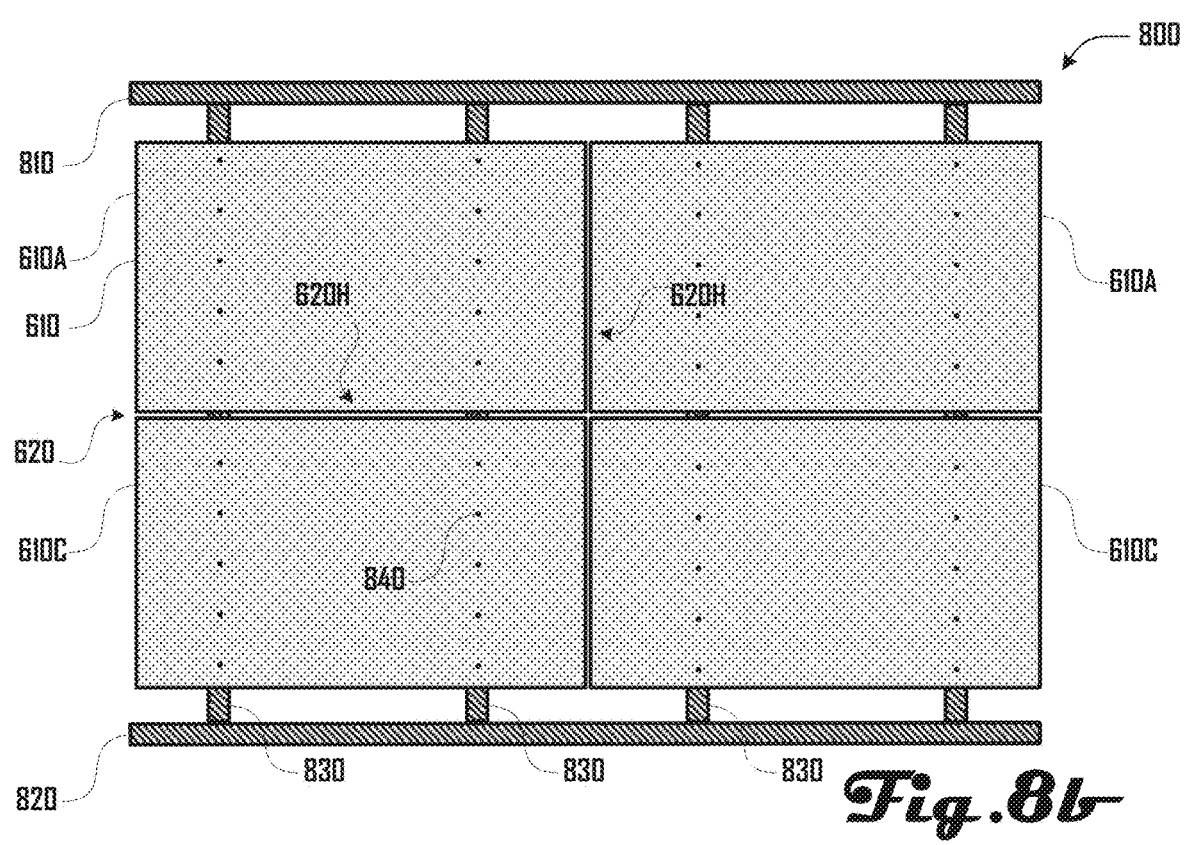
Figure 9A:
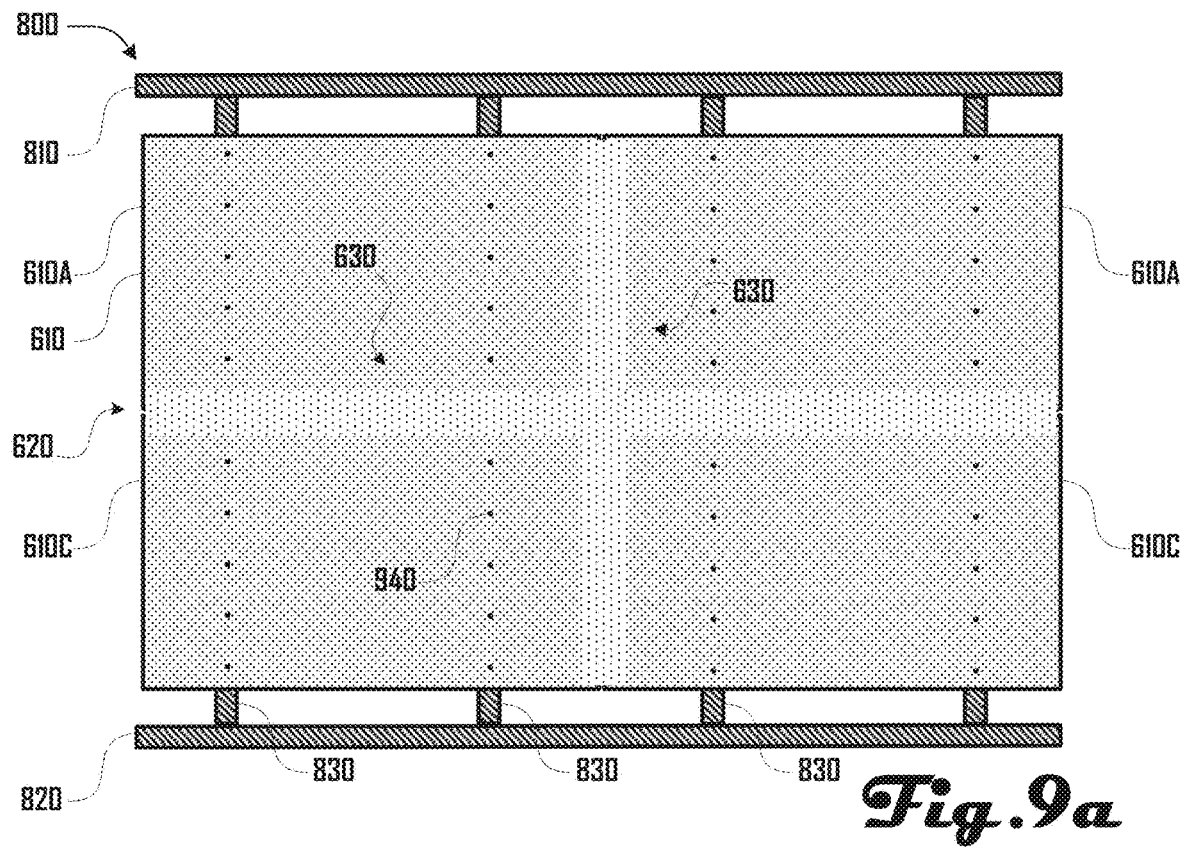
Figure 9B:
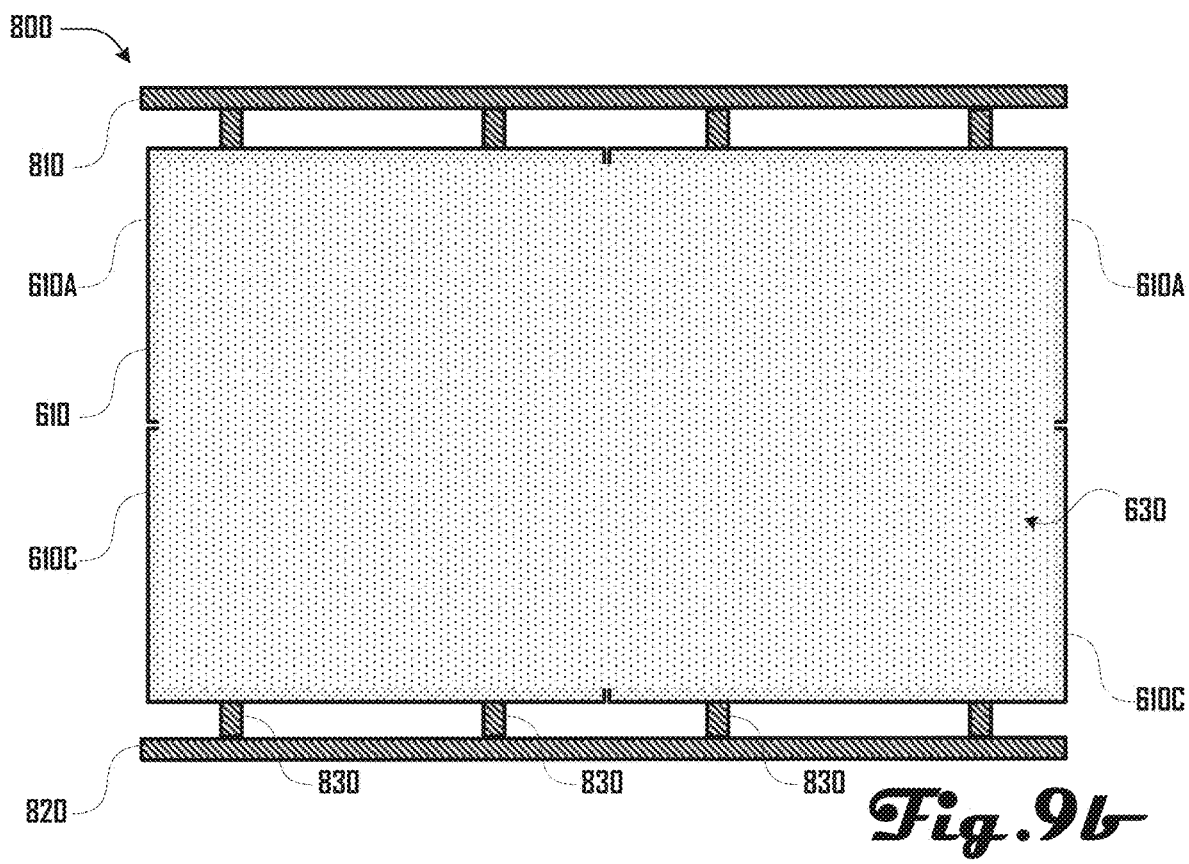

Turning to FIGS. 8a, 8b, 9a and 9b, examples of a wall assembly 800 including a plurality of substrate pieces 610A, 610B, 610C, 610D is illustrated. The wall assembly 800 can comprise a header 810 and footer 820, with a plurality of studs 830 extending therebetween as shown in FIG. 8a. As shown in FIG. 8b, the substrate 610 can be coupled to the studs 830 via a plurality of fasteners (e.g., drywall screws) that extend though the substrate 610 and into the studs 830. The substrate 610 can define one or more seams 620, including in the example of FIG. 8b a vertical seam 620V and a horizontal seam 620H. In some embodiments, coating work can be performed on the seams 620 as shown in FIG. 9a and leaving portions of the substrate 610 without coating 630. Additionally or alternatively, coating can be applied to portions of the substrate 610 in addition to about the seams 620 as shown in FIG. 9b.

FIG. 10 illustrates one example embodiment of the automated surface finishing system 100, having a coating end effector 160M that is configured to generate a coating spray or line. In this example embodiment, the system 100 is shown comprising a robotic arm 140 with a compound spraying or extruding end effector 160. The robotic arm 140 and end effector 160 are shown mounted on a mobile base 120 with a vertical lift 126. The base unit 120 can carry supporting systems for the automated surface finishing system 100 as discussed herein.

An end effector 160, such as the embodiment 160M1 of a coating end effector 160M, shown in FIG. 11 can utilize a tool to automatically dispense and apply joint tape 640 at the seams 620 between substrate pieces 610. In this example embodiment 160M1, coating 630 can be dispensed from a flat box 1110 and joint tape 640 can be dispensed from a roller 1120. The joint tape 640 can come into contact with the compound before a blade 1130, which can be used to apply the joint tape 640 and joint compound 640 onto the seam 620. The blade 1130 can smooth the tape 640 down and can apply the joint compound 640 on the seam 620.

In one embodiment, joint tape 640 can be fed off a roll 1120 onto a joint 620 defined by a first and second substrate piece 610A, 610B after being covered with coating 630. In some embodiments, coating 630 can be delivered ahead of the tape 640 and the 640 tape can be flattened onto the surface of the substrate pieces 610 and seam 620 using a blade or trowel 1130. The end effector 160 or other portion of the system 100 can also be used to automatically apply the tape 640 using tools such as banjo and bazooka systems. Tracking the position of the end effector 160 and portions thereof with devices, sensors, vision systems or other elements of the end effector 160, robotic arm 140 and/or base unit 120 can enable the planner to create an updated map of the room with the location of the tape 640 and/or coating 630 and the conditions under which one or both were applied.

One or more vision system 324, 364 can also use tags or markers to track as an end effector 160 or as a user applies tape 640 on the surfaces and/or seam 620 of one or more substrate pieces 610 and that information can be communicated to and stored by the planner. The end effector 160 and/or robotic arm 140 can be used to control the orientation of tools or devices of the end effector 160 and the force applied on a surface as tape 640 is applied, which can be desirable in some examples to ensure that the tape 640 is embedded within coating 630 as desired. The surface finishing system 100 can apply, solid, porous and/or mesh joint tape 640 with or without adhesive that can be covered with coating 630 using a separate tool or a tool associated with an end effector 160.

Joint tape 640 can be applied by the automated surface finishing system 100 and/or by an operator. Additionally, in some embodiments, joint tape 640 can be colored, dyed or marked so that it is easier for a vision system 324, 364 to identify the joint tape 640. Different color tapes 640, or tapes 640 having different identifying features (e.g., textures, images, barcodes, or the like) can be used in some embodiments to provide information to the automated surface finishing system 100 about the identity or characteristics of a specific joint 620 or other feature of one or more piece of substrate 610. For example, butt joints can be covered with a first color tape 640, tapered joints can be covered with a second color tape 640, and factory joints can be covered with a third color tape 640. An end effector 160 can also use a coating 630 that comprises fibers in addition to, or as an alternative to, tape 640. One or more vision system 324, 364 can be used to identify seams 620 between substrate pieces 610 and data from such vision systems 324, 364 can be used to guide an end effector 160 during taping. The end effector 160 can also be guided using the planner's map of the surface which is located on the environment using relevant features such as markers, corners, openings, or the like.

The coating 630 can be delivered or applied onto joint tape 640, seams 620 and/or surfaces of substrate pieces 610 using a variety end effectors 160 having a variety of elements, devices, or tools. For example, FIG. 12 illustrates one embodiment 160M2 of a coating end effector 160M that includes a spray gun 1210 that is coupled onto the robotic arm 140. A trigger 1220 can be actuated with an actuator 1230 (e.g., a servo, solenoid, pneumatic cylinder, or the like) which can pull on the trigger 1220 to open the nozzle 1240 to generate a coating spray 700.

In another example, FIG. 13 illustrates another embodiment 160M3 of a coating end effector 160M that includes a spray gun 1210 that is coupled onto the robotic arm 140. An internal trigger (not shown) can be actuated with an actuator (e.g., a servo, solenoid, pneumatic cylinder, or the like) which can open the nozzle 1240 to generate a coating spray 700. In the examples of FIGS. 12 and 13, coating can be fed to the spray gun 1240 and nozzle 1240 via a coating tube 432, which can feed coating (e.g., joint compound, or the like) from a coating source 430 disposed at the base unit 120 (See FIG. 4).

In various embodiments a spray gun 1210 can comprise an airless spray system or air assisted spray system. A pump can be used to move the coating 630 from the coating source 430 to the spray gun 1210. The coating 630 can be pumped at high pressures, in some examples, to enable the coating 630 to be sprayed or aerosolized. In some examples, high joint compound particle speeds can produce a smoother finish, which can be desirable in some examples.

The pressure, flow rate, piping system resistance and the like, can be tuned or controlled by the automated surface finishing system 100 to change the speed and amount of coating 630 being delivered to the spray gun 1210 and ejected from the nozzle 1240 as a spray 700. The automated surface finishing system 100 can use any suitable actuator (e.g., a servo, solenoid, air cylinder, linear actuator, or any combination of these) to open and close the nozzle 1240 of the spray gun 1210. As shown in the example of FIG. 12, a manual spray gun 1210 can be instrumented to use an electro-mechanical system 1230 to pull the trigger 1220 allowing the system 100 to control the timing of the coating delivery as well as the opening and closing of the nozzle 1240.

As shown in the example of FIG. 13, an automatic spray gun 1210 can also be used and controlled by the system 100 directly. The robotic arm 140 and end effector 160 and/or base unit 120 can thereby be used to spray the coating 630 as a spray 700 onto substrate pieces 610 and/or seams 620 defined by one or more substrate pieces 610. The coating 630 can be sprayed before and/or after applying joint tape 640. The automated surface finishing system 100 can use a mesh or porous tape 640 in some examples to allow the coating 630 to be sprayed through the joint tape 640 to fill a gap under the joint tape 640 (e.g., a seam 620 or the like).

The spray gun 1210 can use a variety of suitable nozzles 1240 including fan shape, bell shape, or the like. The system 100 can also use a tunable spray gun 1210 that can control the shape of the nozzle 1210. The shape of the coating spray 700 may be controlled in some examples by physically changing the shape of the nozzle 1210. The shape of the coating spray 700 can also be controlled using air streams, or the like which can act on the coating spray 700.

In some embodiments, a cassette with different nozzles 1240 can be installed on the spray gun 1210 allowing the automated surface finishing system 100 to select a desired nozzle 1240 to control the shape of the spray 700. A fan shape can also be tuned by using a set of sliding mechanisms to set the fan width and opening of the nozzle 1240. The diameter of a bell may also be tuned by a sliding cone with expanding orifice size. The robotic arm 140 and/or base unit 120 can also be used to move the nozzle 1240 closer or farther away from a target surface resulting in a narrower or wider fan or bell spray pattern respectively. The system 100 can utilize an array or series of nozzles 1240 to spray the coating over a larger surface. The nozzles 1240 can be individually controlled and tuned or such nozzles 1240 can be controlled as a unit.

A series of tests can be performed to establish the characteristics of a pattern of coating spray 700 delivered by a nozzle 1240. In one embodiment, one or more vision system 324, 364 can be used to characterize a pattern of coating spray 700 and provide feedback for tuning parameters including tool parameters related to a nozzle 1240, spray gun 1210, coating source 430, or the like, as discussed herein. Another embodiment can utilize an array of sensors (e.g., piezo sensors or other force sensors) on a test board which can be used to measure the force applied by the pattern of coating spray 700 as it hits the sensors. The force pattern can be used to estimate a profile of the pattern of coating spray 700 as it is hitting the surface. The feedback from these sensors may be used to tune the profile of one or more spray nozzles 1240, spray gun 1210, coating source 430, or the like.

The automated surface finishing system 100 can include a mixer, pump and the like that can deliver mixed coatings 630 to the various tools including a spray gun 1210. Such a mixer, pump and the like can be part of a coating source 430 disposed at the base unit 120 or disposed external to the system 100. A mixer may utilize sensors to control a mixing ratio of water, slurry or dry compound, and any additives that enhance structure of the compound, color the compound, decrease setting or drying time, or the like. The mixer can control the mix ratio by measuring the mass, volume, density, or viscosity of the components or the mixture that defines coating 630 or portions thereof. The mixing system can utilize pre-mixed coating 630 and can add water and/or additives as desired.

Figure 14:
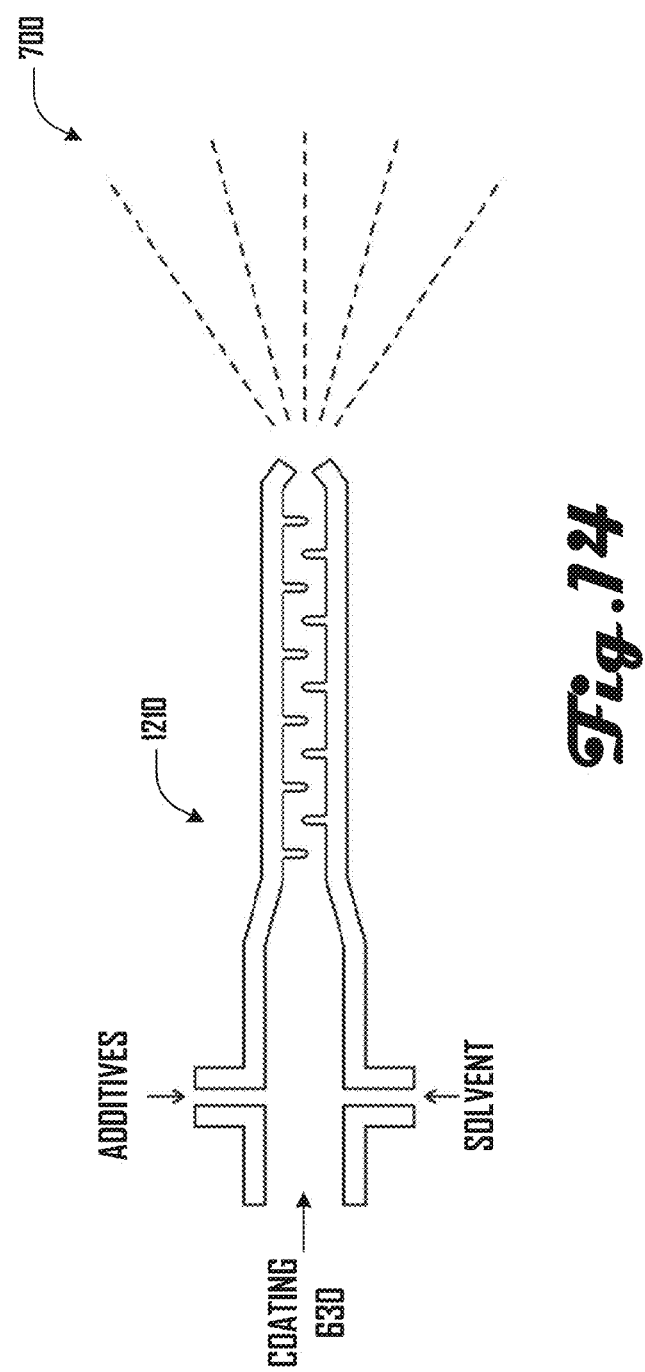
FIG. 14 illustrates an example of an in-line nozzle for mixing components of the coating, water, and any additives at an application site.

The automated surface finishing system 100 can also use a spray gun 1210 that has been designed to mix the components of the compound at the nozzle 1240. For example FIG. 14 illustrates an example of an in-line nozzle 1240 for mixing the coating compound 630, water, and any additives at the application site. The nozzle 1240 can be detachable in some examples to be cleaned or to be disposable.

In various embodiments, a nozzle 1240 can deliver a controllable ratio of water, air, slurry or dry coating compound, as well as additives that modify the coating, including enhancing the structure of the coating, color the coating, or decrease or increase setting or drying time. Nozzles 1240 as discussed herein can be used with any suitable type of coating, compound 430, or other material that can be sprayed, including but not limited to hot mud, plaster, or other curing compounds that set and cannot be washed off with water.

Compound lines 432, nozzle 1240, a pump, or the like, can be instrumented with sensors to measure flow rate, pressure and other desirable parameters. Pressure sensors can be used to monitor the pressure along a compound line 432 enabling the detection of changes in the pressure, flow rate, as well as the detection of clogs. In some examples, an orifice plate may be used to measure the flow rate through the coating system in combination with a set of pressure sensors. Other flow rate sensors can include, but are not limited to a rotameter, spring and piston flow meter, ultrasonic flow meter, turbine meter, paddlewheel meter, variable area meter, positive displacement, vortex meter, pitot tube or differential pressure meters, or magnetic meters for conductive coatings. Detecting a change in flow, pressure in the coating line 432, or reaction force at the end effector 160

(e.g. at a spray gun 1210) can be used to determine that a clog has occurred. The spray gun 1210 can produce a reaction force when spraying so if that reaction force changes the system 100 can identify that the spray 700 has changed, which can be indicative of a clog or other issue.

Figure 15:
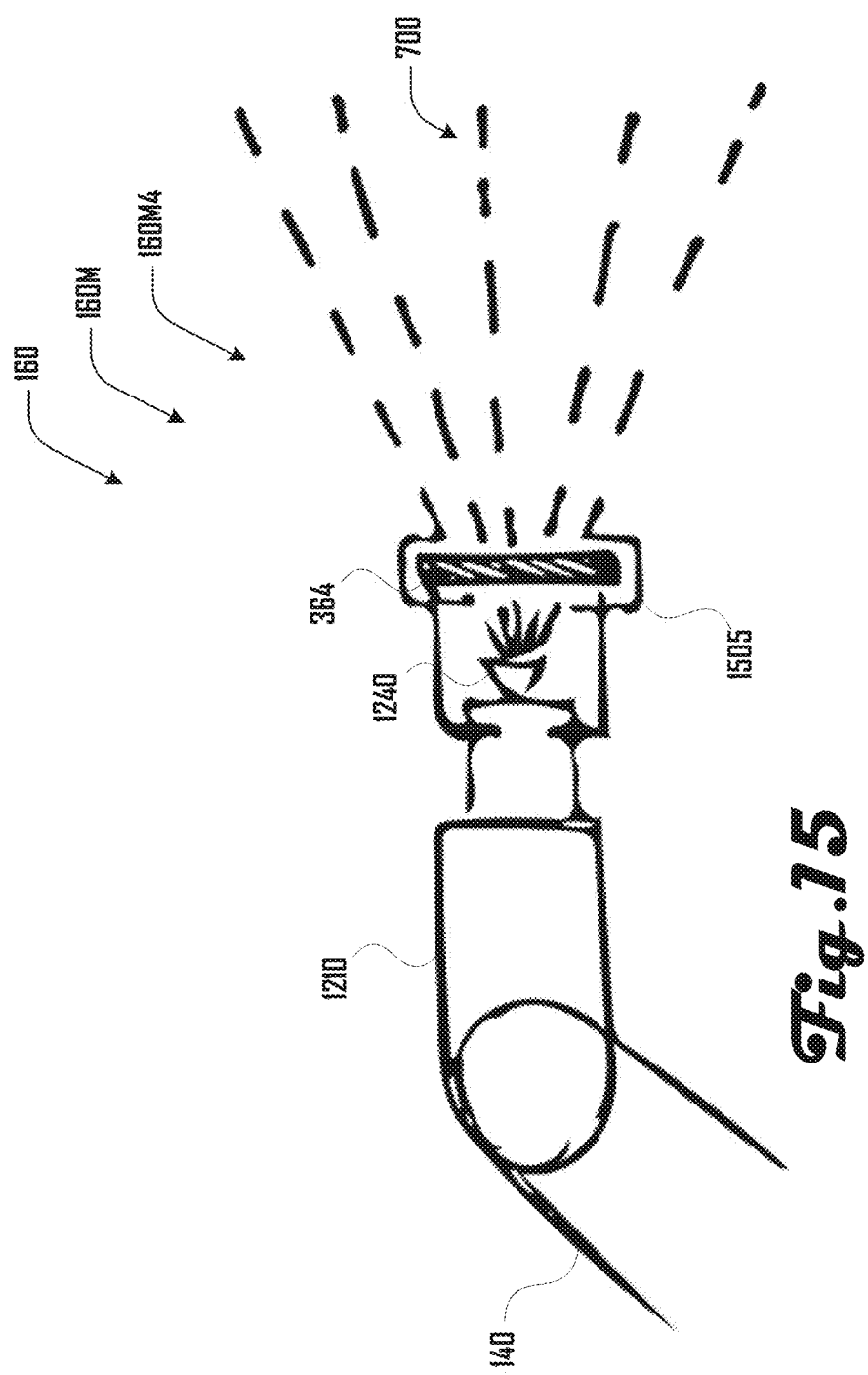

A pattern of the coating spray 700 can also be monitored to detect clogs or wear of the nozzle 1240. For example, FIG. 15 illustrates an example embodiment 160M4 of a coating end effector 160M that includes a spray pattern detection mechanism 1505, in which a vision system 364 can be used to monitor the pattern of coating spray 700 coming out of the nozzle 1240 to detect clogs, nozzle wear, low pressure, or other problems with the spray gun 1210 or related system such as coating lines 432, coating source 430 or the like.

In some examples, the stream of coating spray 700 can be monitored or the pattern of coating spray on a target wall can be monitored. The stream of coating spray 700 and/or pattern of coating spray 700 can be monitored using vision sensors 364, which can include any suitable vision system, including but not limited to thermal sensors, moisture sensors, capacitance sensors, or the like.

In one embodiment, a camera can be placed next to the stream of coating spray 700 so that the profile of the coating spray 700 is captured. Image processing can be used to identify when the shape of the stream of coating spray 700 has changed. In another embodiment a laser curtain may be placed across the stream of coating spray 700, if the flow is interrupted along any part of the fan or bell the laser would complete its path and be detected by a sensor on the other side of the stream of coating spray 700.

A mixer, pump, coating lines 432, and nozzle 1240, and other suitable elements can be fitted with filters which can be used to catch debris or particles that may clog the nozzle 1240 or coating lines 432. The filters can be placed an inlet of the pump, outlet and inlet of the mixer, directly before the coating line 432, directly before the nozzle 1240, or any point along or within the coating system. The automated surface finishing system 100 can monitor the pressure before and after the filters to detect when the filters need to be changed. Flow rate sensors can also be used to detect a clogged filter. The automated surface finishing system 100 can reverse its flow to clear clogs from the coating line 432, nozzle 1240, filters, or other components.

Figure 16:
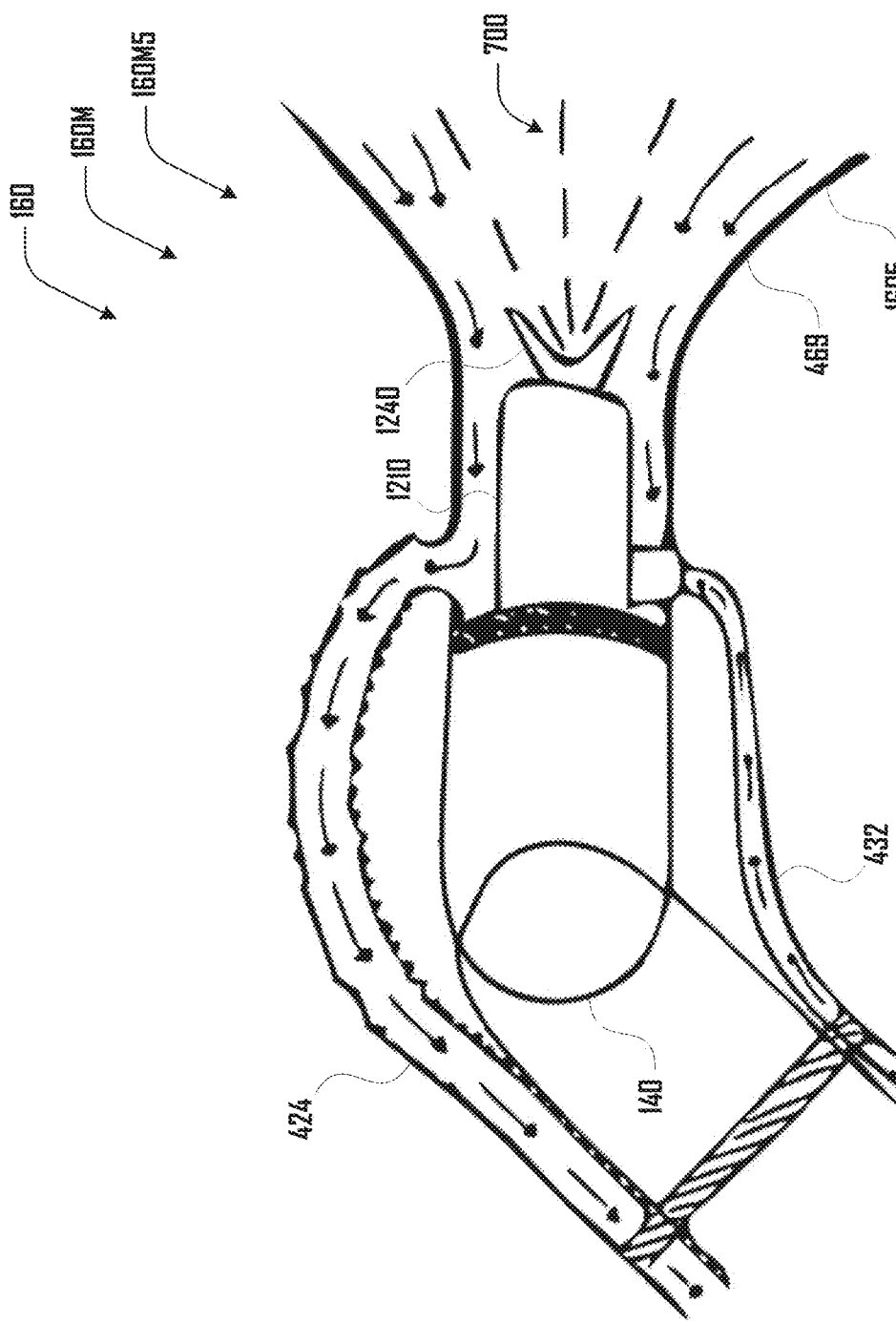
FIG. 16 illustrates an example embodiment of a coating end effector that comprises a vacuum system that includes a vacuum hood disposed around an end and nozzle of a spray gun to capture overspray.

The spray gun 1210 or other coating end effector 160M may also include a vacuum system 469, spray guards, or the like, that can be used to minimize overspray and reduce the amount of excess coating 430 in the air. For example, FIG. 16 illustrates an example embodiment 160M5 of a coating end effector 160M that comprises a vacuum system 469 that includes a vacuum hood 1605 disposed around an end and nozzle 1640 of a spray gun 1610 to capture overspray. The vacuum hood 1605 can surround the spray gun 1210 and can include an adjustable vacuum setting. The vacuum hood 1605 can be coupled to the vacuum line 424, which is connected to the vacuum source 422 to provide a vacuum to the vacuum hood 1605.

Figure 17:
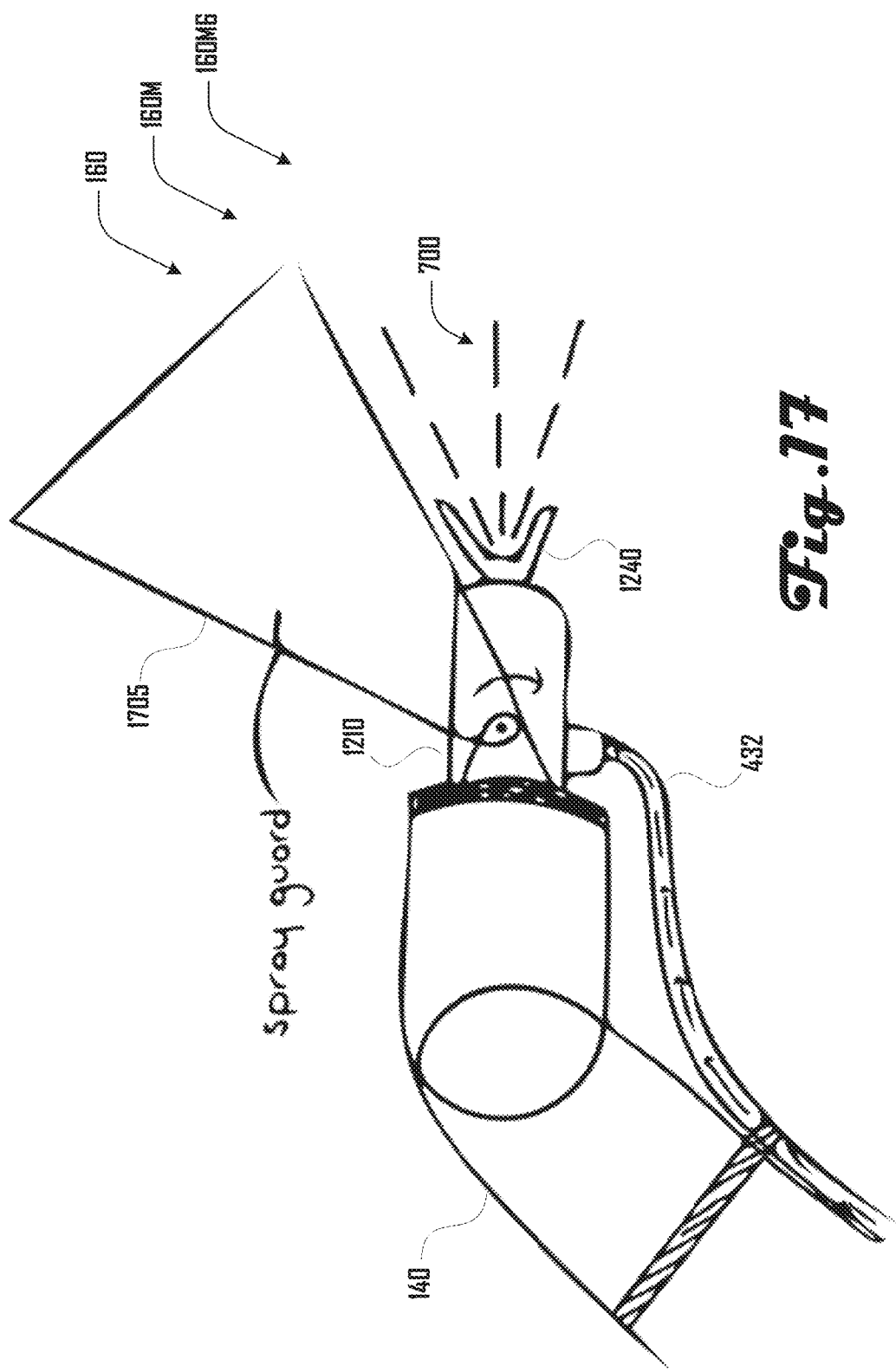
FIG. 17 illustrates an example embodiment of a coating end effector that comprises a spray guard that partially extends about and past the face of the nozzle of the spray gun.

FIG. 17 illustrates an example embodiment 160M6 of a coating end effector 160M that comprises a spray guard 1705 that partially extends about and past the face of the nozzle 1260 of the spray gun 1210. In this example, the spray guard 1705 is shown being generally triangular and fanning out from where the spray guard is coupled to the end effector 160M. In some examples, the spray guard 1750 can be selectively deployed by the system 100 or a user to prevent overspray onto an undesired surface. The spray guard 1705 can be deployed in various suitable ways, including but not limited to, via a servo, pneumatic cylinder, solenoid or other electromechanical actuator, which can rotate or otherwise deploy the spray guard 1705 into place.

In various embodiments, a coating end effector 160M can comprise one or both of a vacuum system 469 and spray guard 1705 of various suitable configurations. The guard 1705 and/or vacuum system 469 can be deployed when the automated surface finishing system 100 is spraying near another surface or a feature. The spray guards 1705 and/or vacuum systems such as a vacuum hood 1605 can be retracted using a linear actuator, solenoid, air cylinder, or other suitable electro-mechanical actuator. In some embodiments, a spray guard 1705 can also be mounted on a rotary stage such that the spray guard 1705 can be rotated into place next to the sprayer 1210 by actuating the motor or servo. Accordingly, in some examples, the position of the spray guard about a circumference of the spray gun 1210 can be selected by the system 100 and/or a user.

In some embodiments, coating 630 can be applied and/or smoothed by using a blade that is dragged over applied coating 630. Such a blade can be part of an end effector 160 having a spray gun 1210 or can be a separate end effector 160. In some embodiments, a coating end effector 160M can apply coating 630 and tape 640 at the same time for a layer, or can apply coating 630 over the tape 640 that has been previously applied. The shape, profile, and size of a coating blade can be controlled to deliver a desired profile of coating 630. Similarly, the pressure or force on the coating blade can also be controlled to change the thickness and profile of the applied coating 630, which can be based on data from the system 100 obtained from one or more vision system 324, 364, sensors 326, 346, 366, or the like.

Figure 18:
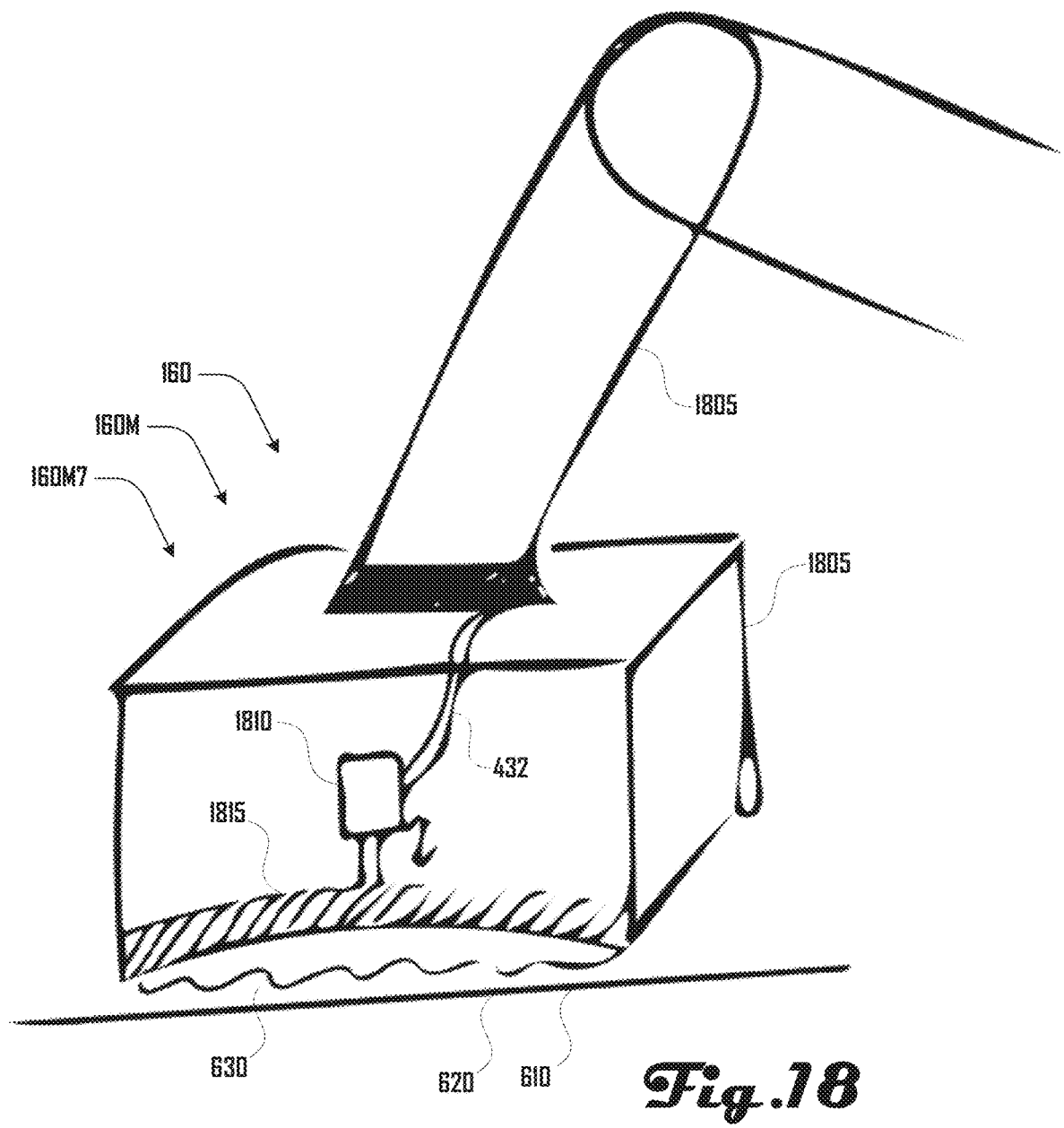
FIG. 18 illustrates an example of a coating end effector that comprises a coating flat box to apply the coating compound.

The automated surface finishing system 100 can also include a coating end effector 160M that comprises a coating flat box 1805 to apply the coating 630 as illustrated in the example embodiment 160M7 of FIG. 18. In various embodiments, the automated surface finishing system 100 can move the box 1805 along the seam 620. An actuator 1810 can control the shape and/or position of a blade 1815 to tune the profile of coating 630 applied on the seam 620. Various tool parameters, including box opening size, blade size, blade shape, and the like, can be controlled to simulate different sized boxes that are used to create a profile that feathers or blends a defect created by the seam 620 over a large portion of the substrate 610 to simulate flatness.

The end effector box 1805 can be automatically fed using a coating pump and coating line 432. The coating end effector 160M may also include sensors 366 (e.g., proximity, force, contact sensors) to ensure that the box 1805 is in contact with the substrate 610 during the application of coating 630. Additionally, a vision system 364, 324 of the end effector 160 or base unit 120 can also be used to ensure that the flat box 1805 is in contact with the surface of the substrate 610 during application of coating 630.

In some embodiments, a coating end effector 160 can deliver coating 630 through a sprayer 1210 and/or nozzle 1240 and then utilize a physical blade, trowel, air blade, roller or any other type of forming mechanism to smooth and profile the coating 630. The coating end effector 160M can utilize surrounding surfaces as datums. For example, a roller, wheel, blade, or the like, can be pushed in contact with the datum surface for reference. These contact points can extend away from a coating application zone to enable the use of datums away from the defect or joint 620. The coating end effector 160M can control the position of the contact points such that the correct or optimal datum surface is used. The force and pressure on the contact points may also be controlled. Force may be directly measured or estimated by monitoring the deflection of the mounting structure.

The coating tools can be mounted in series with a structure that limits, sets, or controls the amount of force applied on a target surface. The structure can limit, set or control the normal force applied on the surface by the blades, rollers, trowels, and the like, and/or it can limit, set or control forces applied by the tools along the target surface as well as torques applied. Such blades or rollers can be mounted on an air bag, air shock, air cylinder, air bellows, with a fixed or variable pressure setting. The pressure and the normal area of the pressure vessel can set the amount of forces applied by the tool on the target surface. The blade or roller can also be mounted on a spring, tunable spring, shock, or the like, in order to set, limit or control the forces applied on the target surface. The forces may also be set, limited, or controlled using a pressure controlled hydraulic system including, but not limited to a cylinder, bellows, or reservoir. In one embodiment, a short-stroke low-mass end effector linear actuator mechanism can be used for fast tracking of surface contours and constant normal force. In embodiments with more than one blade or roller, the tools can be mounted on a single force limiting structure, or each head or multiple tools can be mounted on separate structures. Mounting the tools or group of tools on separate structures can allows for the applied forces and moments to be set, limited, or controlled separately.

Coating tools can include sensors 366 and/or a vision system 364 to ensure the desired orientation of the blades or rollers relative to the wall. For example, one application includes ensuring planarity of the tool to the wall; however, the mechanism may also set the blade or roller to a specific target angle relative to the surface. The planarity may be established by utilizing the vision system 364 to detect the plane of the surface and then match the tool position using the degrees of freedom of the system 100. The planarity may also be established by utilizing one or more sensor 366 at the end effector 160 (e.g., a set of proximity, range, or contact sensors to establish the position of a tool head relative to a wall). Blade or roller orientation can be controlled directly by setting the joint angles of the robotic arm 140, by a powered gimbal or joint at the end effector 160, and/or by a passive gimbal that allows the tool to tip and tilt relative to the end of the robotic arm 140. A passive gimbal can enable the contact tool to follow the plane of a target surface despite errors in the position of the system 100.

In another embodiment, the position of the contact may be controlled through the active gimbal using feedback from one or more of sensors 366, 346, 326 and/or vision systems 364, 324 that can establish the relative orientation between blades or rollers and surface. Powered or passive gimbals or end effector degrees of freedom can be encoded (e.g., via sensors 366) such that the orientation of the tool and/or end effector 160 is known to the system 100.

A coating end effector 160M can also utilize outriggers such as rollers to use adjacent surfaces or raised edges as datums to guide the application of coating 630 and achieve accurate corners. These rollers may be instrumented with sensors 366 and/or a vision system 364 to measure or determine force, contact, proximity, or the like. Additionally, or alternatively, such rollers can passively make contact while the surface finishing system 100 utilizes its sensors 366, 346, 326 (e.g., force and torque sensing) and/or vision systems 364, 324 to maintain a pressure or force against the datum surface. The information obtained or determined about tool orientation relative to the portions of the end effector 160, robotic arm 140 and/or base unit 120 can be used to alter the toolpath, tool parameters and/or other system configurations to ensure the coating automation system can carry out the process without running into limitations of the hardware.

In both passive and active embodiments, the angular position of a gimbal or other portion of an end effector 160 can be recorded (e.g., via sensors 366 or vision system 364) to locate and establish the plane of the target surface. The angular position of the gimbal can be recorded using elements including, but not limited to encoders on the rotary axis, laser range finders, capacitance sensors, IMUs, an external vision system, sonar sensors, potentiometers, motor loads, or any combination of these.

The gimbal system may be tuned to minimize dynamic effects by using springs, dampers or a combination of these. In some embodiments with more than one blade or roller, all tools may be mounted on a single gimbal structure or each tool or groups of tools may be mounted on separate gimbals. Mounting the blades or rollers on separate gimbals can allows for tool surface planes to be set, limited, or controlled separately. Coating application tools can be mounted on a gimbal in series with a compliant system described above that limits, sets, or controls the force applied on the surface.

Figure 19:
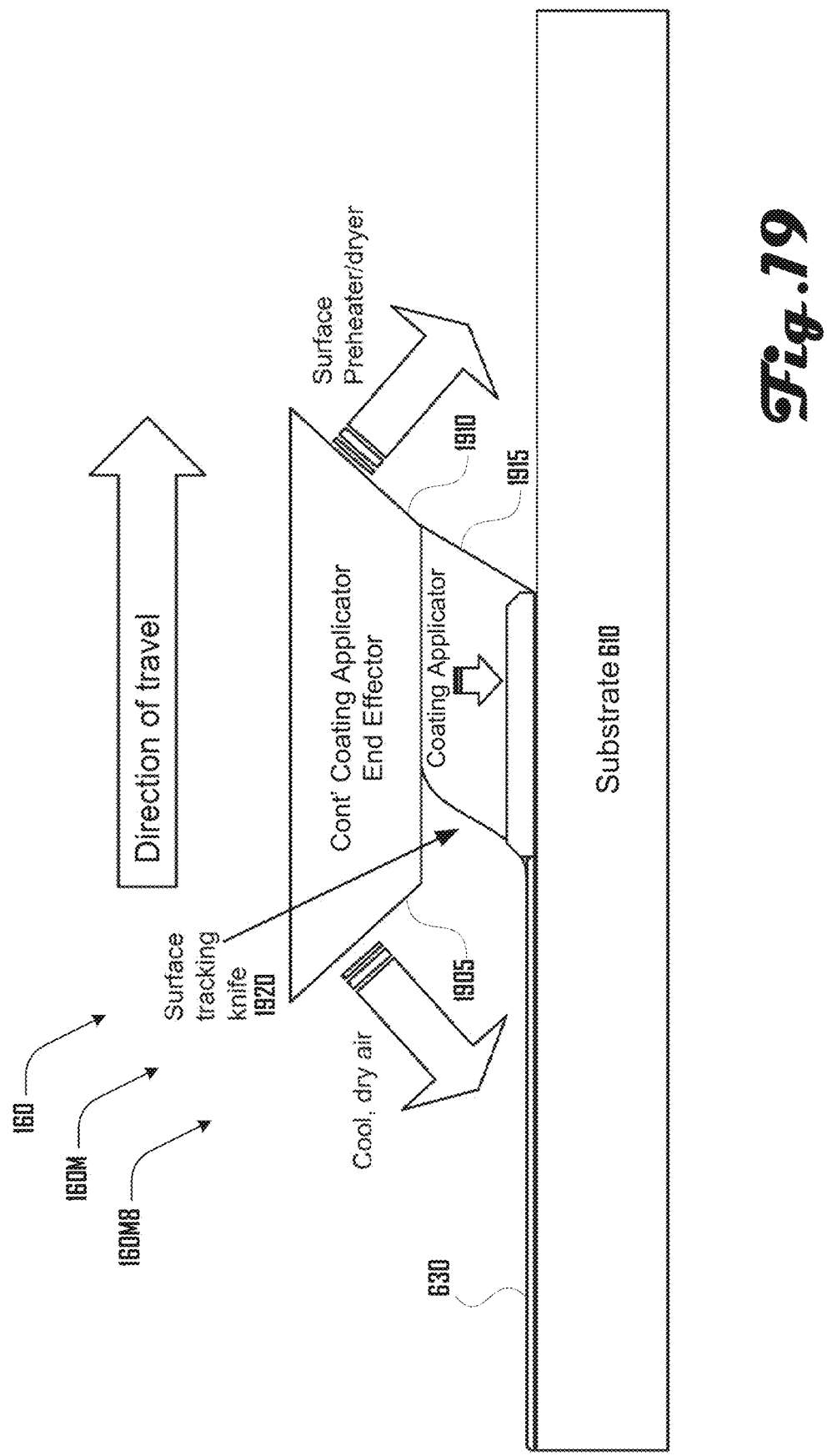
FIG. 19 illustrates an example embodiment of a coating end effector that comprises a first blower and a second blower.

In some embodiments, a coating end effector 160M can include elements including, but not limited to a heater, curing light, blower or a combination of these. For example, FIG. 19 illustrates an example embodiment 160M8 of a coating end effector 160M that comprises a first blower 1905 and a second blower 1910. The first blower can be configured to apply cool and/or dry air to coating 630 that has been applied to the substrate 610 by the coating end effector 160M. The second blower 1910 can be configured to apply heat and/or dry air to a surface of substrate 610 on which coating 630 will be applied. As shown in FIG. 19, the coating end effector 160M can include a coating applicator 1915 that can include a tracking knife 1920 that can be used to profile the coating 630. In various embodiments, preheating and drying the surface of substrate 610 on which coating 630 is being applied can improve the coating application process. Cooling and/or drying the applied coating 630 via the first blower 1905 can be desirable to speed the drying/curing process of the coating 630 and can improve the finish of the coating 630.

In various embodiments, elements including but not limited to a heater, fan, UV light, microwave emitter, or a combination of these elements can also be a separate part of the automated surface finishing system 100. These components can be mounted on an end effector 160, a robotic arm 140, mobile base 120, positioning stage 122, gantry, or the like, or can be static in the room and separate from the automated surface finishing system 100. A purpose of these components can be to speed up the curing, drying, or setting time of the coating 630, but can also be used to prepare the surface for the application of tape 640 or coating 630. An embodiment of the end effector 160 utilizes a heater that leads the coating application for preheating the substrate surface 610 on which coating 630 will be applied by the coating end effector 160M. The coating application point can be followed by a blower which can act over the applied coating 630. The coating end effector 160M can also utilize two heaters leading and following the coating application or utilize two fans or a combination of these. The tool parameters or settings on the fan, heaters, or lights may be determined by the planning system (e.g., by the control system 322) using information from one or more of sensors 366, 346, 326 and/or vision systems 364, 324. For example, environmental sensors (e.g., temperature, humidity, and the like) and a prescribed coating composition and applied thickness can be used to determine tool parameters for environmental control tools or systems such heaters, coolers, blowers, or the like. In another example, the coating end effector can comprise a thermal imaging camera to assess the temperature of the coating 630 and calculate the moisture content of the coating 630. The automated surface finishing system 100 can also have a humidity sensor, conductivity sensor and depth or thickness sensors such as laser range finders, sonar, radar, LIDAR, and the like. Toolpaths, tool parameters settings, coating composition, fan, heater, light settings, and the like can be adjusted in real-time based at least in part on the measurements, sensing or data obtained from such sensors or visions systems.

The automated surface finishing system 100 can utilize additives such as plaster of paris to accelerate the setting time of a coating of coating 630. An accelerant can be mixed into the coating 630 during preparation, added in at the nozzle 1240, applied to a coating 630 after deposition, or any combination of these. The automated surface finishing system 100 can utilize environmental information to decide the amount of accelerant to add and at what point in the process it should be introduced. In other words data from one or more vision system 324, 364 and/or sensors 326, 346, 366 to automatically modify the parameters of the composition, preparation, and application of the coating 630. In some examples, accelerant may be sprayed on to a coating 630 after the coating 630 has been applied onto the target surface.

The automated surface finishing system 100 can utilize sensors (e.g., humidity or conductivity sensors) that are mounted on a substrate 610 before coating application, which can provide for tracking of the moisture content of the substrate 610 and/or coating 630 applied to the substrate 610. Such sensors can be mounted directly onto the target surface, may be embedded in a joint 620, or can be mounted on a coupon that is covered at the beginning of the process with the same parameters. Such sensors can be connected to a wireless communication system to send signals/data to the automated surface finishing system 100. Moisture content and other information collected by such sensors can be used to control or adjust the settings on fans, blowers, heaters, curing lights, an HVAC system, or the like. The drying speed can also be used to adjust the composition of the coating 630. Monitoring the moisture content can allow the system 100 to accurately estimate the time when the next step can begin (e.g., sanding, painting or the like).

The automated surface finishing system 100 can also determine when the coating has set and dried by measuring the thermal conductivity of the covered seam 620, using a vision system (such as a thermal imaging camera); using a sensor such as a thermometer (contact or non-contact), or by detecting differences in colors using a vision system (e.g., due to color changes that occur between wet and dry coating 630. Various measurements can be used to infer the moisture content of coating 630 by comparing a determined temperature of the coating 630 to the surrounding materials such as the substrate 610. For example, as water or other solvent evaporates from a mixture of coating 630, the temperature of the coating 630 can be lower than that of the surrounding materials. Models of the coating drying process can also be used to estimate the time to dry or cure given a set of starting conditions and information about the environment. The environmental sensors and/or vision systems can be used in conjunction with an HVAC system or heater, air conditioner, fans, or the like, to control the room conditions at a worksite.

The sensor readings can automatically trigger any of these systems or a combination to maintain the room at the desired conditions for quality, reduced drying time, or comfort of the operator.

In various embodiments, the automated surface finishing system 100 can use one or more vision system 324, 364 and/or sensors 326, 346, 366 to establish a condition of a wall of the substrate before and after compound application to determine appropriate toolpaths and/or tool parameters. The system 100 can use computer vision, structured lights, stereo cameras, images, lights and shadows, LIDAR, radar, sonar, point clouds or any combination of these to establish the conditions of a target surface. These conditions can include establishing the surface plane relative to a coating application tool or another surface, detecting high or low points, curvature, and defects. One or more of the vision system 324, 364 can be used to create a topographical map of the surface to identify high and low spots. The map can be created after substrate 610 has been hung. The map can also be an input from a substrate layout system that specifies the location and types of joints 620 and features in the room. The map can be updated by the one or more vision system 324, 364 as the system 100 is moved or moves around the room. The system 100 can also utilize rollers, proximity sensors, contact sensors, profilometers, and the like, to measure the profile of the surface. The robotic arm 140, end effector 160 and/or base unit 120 can be used to make contact with rollers or other mechanism on an encoded linear stage and then move these over the surface creating a topographical map. This can be done over joints or seams to determine the profile. The system 100 can then compute how the coating 630 should be applied and tapered to create a visually flat wall assembly.

To achieve the coating thickness on the substrate 610, the system 100 can optimize the delivery of the coating 630 to build up more coating 630 on low spots and less on high spots. The system 100 can also use information of the joint location to profile the coating delivery to account for the height variations typical of joints 620. The end effector 160 can then be used to apply a specific profile of coating 630 to the wall. This can be done by controlling the profile of the sprayer 1210, the shape and size of a troweling blade, the distance between the end effector 160 and substrate 610, the flow rate of coating 630, the tool speed, the number of passes over a given spot, or the consistency of the coating 630. The robotic arm 140 and/or end effector 160 can utilize force control to apply the pressure required to deliver a desired amount of coating 630 or to achieve a desired surface texture or roughness.

A thickness measurement can also be used to determine the amount of coating 630 that is to be delivered to a given spot. The system 100 can also tune the profile of the delivered coating 630 to account for overlap of the subsequent application. The coating thickness at the edges can be reduced or feathered such that the overlap region achieves the final desired thickness. This approach can also be used to increase overlap error tolerance at transition points between robot workspaces. The automated system 100 can utilize the information about the room, compound mixture and desired compound profile to determine the application profile desired to account for shrinkage of the coating 630. The system 100 can also use shrinkage models with environmental information obtained from sensors or vision systems to anticipate the shrinkage of the coating 630 as it dries. The delivered profile can account for shrinkage by increasing thickness of coating 630 applied such that the final post-shrinkage profile is the desired profile to achieve a visually flat wall. Compound mixture definition can include real-time automatic adjustments of gypsum, plaster of paris, and water content for optimal results given environmental conditions (determined based on data from sensors and/or visions systems), and layer finish requirements.

The system 100 can be instrumented with vision systems 324, 364 and/or sensors 326, 346, 366 that can be used to improve operation and ensure quality. During compound application the system 100 can use sensors 366 (e.g., force and torque sensors) mounted directly on the end effector 160, or sensors 346 on the robotic arm 140, and/or force and torque estimates determined by sensors 346 of robotic joints of the robotic arm 140 to apply a desired force during troweling or taping. The vision systems 324, 364 and/or sensors 326, 346, 366 can monitor force normal to a blade or rollers or on multiple axes including torque measurements and six-axis sensing. The force sensing can be used to control the force or pressure applied by one or more tool of an end effector 160. A minimum force or contact readings can also be used to ensure contact is made before the coating 630 is allowed to flow, and force below a certain threshold or loss of contact can trigger the stop of joint compound flow. The automated surface finishing system 100 can use the force information to operate in force control, where the motions and speeds of the system 100 are driven to ensure a given force is applied in the desired directions. Similarly, force sensing can be used to detect contact with an object, obstacle, or intersecting wall or ceiling. By monitoring forces and torque on various portions of the robotic arm 140, base unit 120 and/or end effectors 160, the system 100 can detect that it has made contact with the adjacent wall or ceiling and alter the toolpath accordingly. The measurements can also be used to detect accidental contact and trigger a safety operation such as stopping the system 100 or retracting away from contact point. The system 100, including the end effector 160 can also use sensors (e.g., contact or proximity sensors) and/or visions sensors to detect that the end effector 160 is touching the surface, obstacle, object, or worker, as well as detect the distance to an adjacent surface or contact with that surface. The force, contact, displacement, or proximity sensors can be mounted on outriggers from the end effector 160 to sense obstacles, objects, or adjacent surfaces ahead of the end effector 160. The system 100 can detect, follow, and use adjacent walls as datums to guide coating application and achieve accurate corners. For example, in some embodiments, the end effector 160 can comprise a guiding element configured to engage a target surface, adjacent walls, or the like, to allow the end effector 160 to be guided in coating the target surface. For example, such a guiding element can include an arm extending from the end effector 160, with the arm having a roller at the end of the arm configured to engage the target surface or portion of a wall assembly as a coating guide.

The base unit 120, robotic arm 140 and/or end effector 160 can utilize multiple control strategies to complete various tasks. Position control can be used to command the system 100 to follow a trajectory given speed, acceleration, and jerk constraints. The system 100 can be controlled at the joint level by giving commands to the joints to achieve the desired robot state and tool position, or the control can be done at a higher level allowing a user or program to control end effector position and orientation. The system 100 can be controlled in task space where the system 100 controls a tool relative to the task. This approach can focus on achieving a desired tool position, orientation, speed, or the like, relative to the target surface rather than on each joint reaching its target goal. The system 100 can utilize force control to control the force applied to the target surface, an obstacle, adjacent surfaces, objects and so on. The applied force can be controlled in a single or multiple axes. Hybrid control modes can also be used. For example the system 100 can be commanded to achieve a given position as long as a given force is not exceeded.

The one or both of the vision system 324, 364 can be used to capture where and how the coating 630 has been applied. By monitoring the spray pattern applied on the wall the system 100 can detect clogs, nozzle or blade wear, or other problems. In one example, a thermal camera can be used to detect the applied coating 630, which can be at a different temperature than the target material. The compound's temperature can be controlled to facilitate detection. Monitoring the compound temperature can also give information on the moisture content of the coating 630. The coating 630 can have a prescribed coloring or additives to create contrast between the target surface and the coating 630 facilitating the detection of areas that have been covered by the coating 630. The color can change as the coating 630 dries as well as after it has been sanded. The system 100 can also apply coatings 630 in layers with different colors in different layers of coating 630 to facilitate detecting how much coating 630 has been removed during application or sanding of coating 630. Sensing such as capacitance, radar, resistance, humidity, conductivity, sonar measurements, or any combination of these can also be used to establish the thickness of the coating 630. Lights can be mounted on the system 100 or externally to illuminate the surface enabling the detection of coated surfaces, high and low points, tool marks, coating roughness, orange peel, and defects using one or both of vision systems 324, 364.

The system 100 can monitor the coverage achieved by the end effector 160 and update tool paths and tool parameters to ensure the desired coating profile is being applied. For example, the system 100 can dynamically tune a sprayer fan and/or bell until the spray pattern matches the desired shape, thickness, size. The system 100 can also move the sprayer 1210 closer or farther away from the target surface to change the spray pattern. The system 100 can also tune the material flow rate, pressure, spray tool speed, or the like, to achieve a desired thickness. The toolpaths and/or tool parameters can also be updated to ensure that the correct overlap is being achieved.

The system 100 can also utilize a feedback mechanism for communicating contact, forces, gimbal displacement information, tool orientation, motor loads, humidity and temperature readings, measurements of the applied coating 630, to system 100 (e.g., to the control system 322) for the purpose of real time updating of the tool paths and tool parameters for improving finish of coating 630. The system 100 can use tool position and orientation, captured surface conditions and models to update the robotic toolpaths to ensure that a desired position and/or contact is maintained during application of coating 630.

The system 100 can also determine areas that need another application of coating 630, rework using automated surface finishing system 100, or rework to be done manually by the user. The user can also use a user interface of the system 100 to indicate areas that the user has identified as needing rework or need to be coated again. The system 100 can use this input along with other information about the previous work to create a new toolpath. Both user and system feedback can be fed into a machine learning algorithm to create a better model for coating future surfaces given a set of initial conditions.

The automated surface finishing system 100 can utilize a user interface to enable the worker to control, program, debug, plan, and setup the system 100. The user interface can be used to give the user information of all the steps that must be taken to setup the system 100. Each step can be checked off when complete and the user can request more information on each step. The workspace of the system 100 can be shown overlaid on a camera feed or projected onto the target surface to help the user position the end effector 160, robotic arm 140 and/or mobile base unit 120. The workspace can be projected using lights or lasers. The system 100 can also automatically perform certain steps and the user interface can report the progress of each step, as well as give guidance to the steps the user can follow to perform a task. The user interface can be used to setup the system 100 and run any calibration routines required. The interface can also be used to plan a job including detecting wall, user definition of path parameters or path itself, auto generation of the tool path, user input of tool parameters, and automatically optimized tool parameters given a set of user inputs.

The user interface can be a graphical user interface and include a 2D or 3D representation of the worksite and workspace. The representation can include camera feeds as well as computer models and reconstructions created using sensor data. The interface can overlay paths, quality visuals, progress, robot model, or the like, over camera or workspace models. As the task is completed the path can be highlighted in different colors or with different style lines to indicate completion, quality achieved, problem areas among others.

Any problems, issues, or bugs can be reported in the user interface. Lights on the end effector 160, mobile base 120 and/or robotic arm 140 as well as sounds can also be used to indicate problems, movement of the end effector 160, base unit 120 and/or robotic arm 140; that work is in progress; that the system 100 is on or off; that toolpath is running or paused, that the system 100 needs attention or refill of materials; and any other indicators of the system state. The user interface can also display information on the progress, task and tool parameters, and quality metrics of the task being performed. Environmental conditions can also be displayed and recorded by the interface. The system 100 can indicate to the user what steps to take to correct or improve conditions including air quality, temperature and humidity. If the system 100 detects unsuitable or unsafe conditions it can display a message warning the user and providing guidance on next steps. The system 100 can use an optimization to find what parameters could be used to improve the process including reducing work time, increasing quality, and minimizing material usage among others. The user interface can also create reports on the tasks executed, quality metrics, environmental conditions, completion, and performance logs. Information can include robot workspace, tool paths, progress, sequence of approach, application rates and thicknesses, spray pressures and flow rates, forces applied by the tool, coverage record, path speed, tracking error, time to complete the task, tool time, setup time, vacuum waste material collected, cleaning time. The user interface can also display on filter conditions, and the system 100 can trigger an alarm or instruction when the filter needs to be replaced or cleaned.

The user can interface with the system 100 using a computer, tablet, touch screen, mobile device, pendant, joystick, controller, or buttons directly on the system 100. The worker can also position and train the robotic arm 140 and/or end effector 160 by directly moving joints of the robotic arm 140 or end effector 160. The user interface, controller, or buttons can be used to record positions as well as change the control mode and task.

An augmented reality system can be used to show the worker a toolpath plan generated by the system 100, instructions, original BIM or plan, or a combination of these. The augmented reality can be displayed using a headset, smart goggles, projections, or the like. The worker can be shown areas that require manual coating application. The user can also overlay the location of studs, framing, pipes, ducts, electrical system behind the board to facilitate compound application. Coating tools, both manual and automated can be tracked in the map using tags, IMUs, or other sensors and a warning can be given to the operator if an attempt is made to apply coating 630 in an erroneous position or under the wrong tool settings. The system 100 or tools can also utilize radar, sonar, thermal imaging to establish what is behind the substrate.

The automated surface finishing system 100 can also produce a visualization, paths, or instructions or a combination of these to guide the user in completing manual work. The visualization can include 2D or 3D maps marking the areas of work with labels. The visualization system can also include a projection of the plan onto the target surface this can be done with a laser system, projector or through augmented reality headset or goggles worn by the user.

Figure 20:
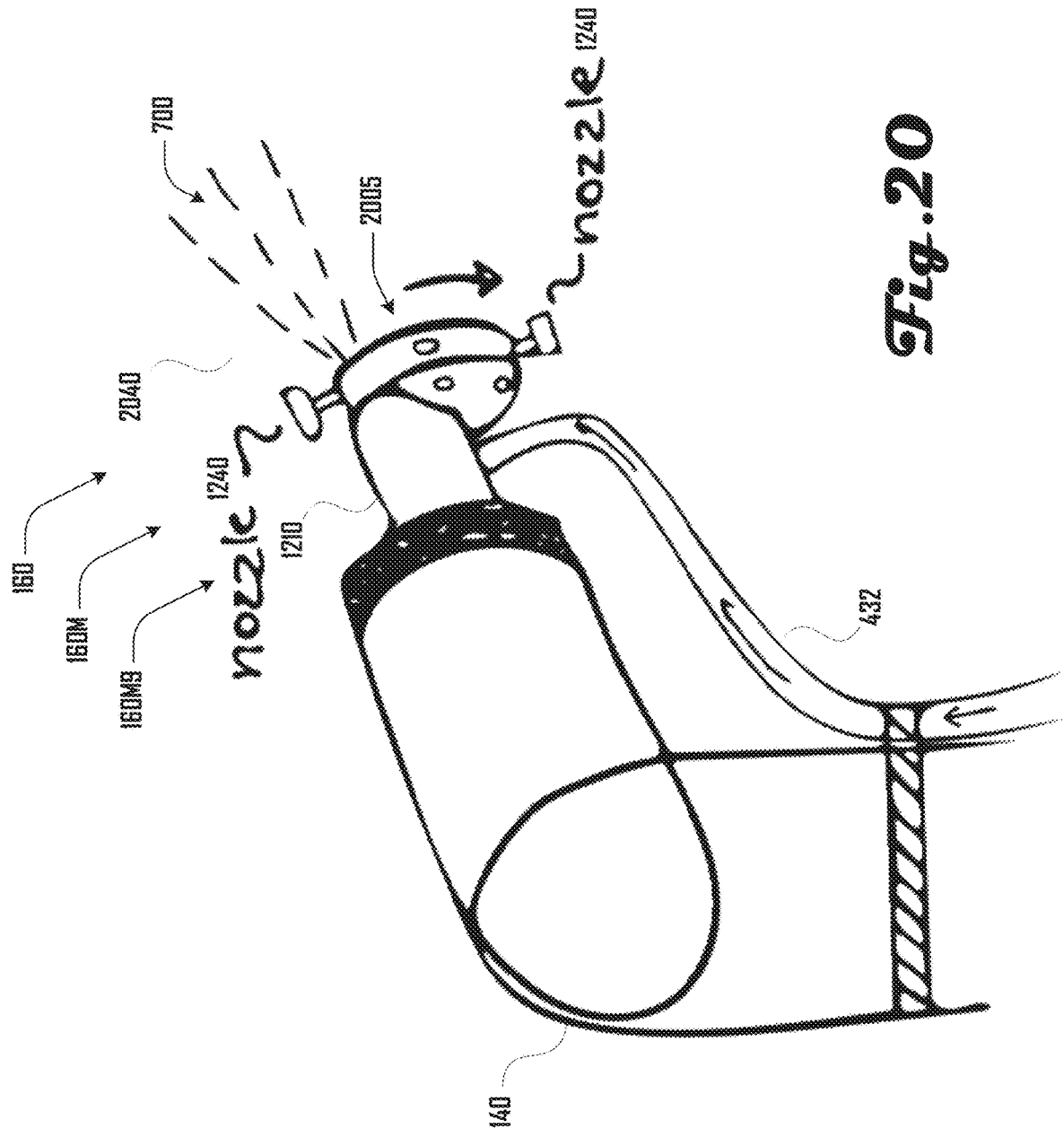
FIG. 20 illustrates an example embodiment of a coating end effector, which comprises a nozzle cassette system where a cassette of nozzles is attached to the end of the spray gun.

The coating time, pressure, material flow rate, coating characteristics, and clogs can be tracked to inform when a nozzle 1210 or blade 1130 should be cleaned or changed. For example, FIG. 20 illustrates an example embodiment 160M9 of a coating end effector 160M, which comprises a nozzle cassette system 2005 where a cassette of nozzles 1240 is attached to the end of the spray gun 1210. The cassette system 2005 can be rotated (e.g., via an electromechanical system) to deliver a nozzle 1240 to the spray gun 1210 for use.

Figure 21:
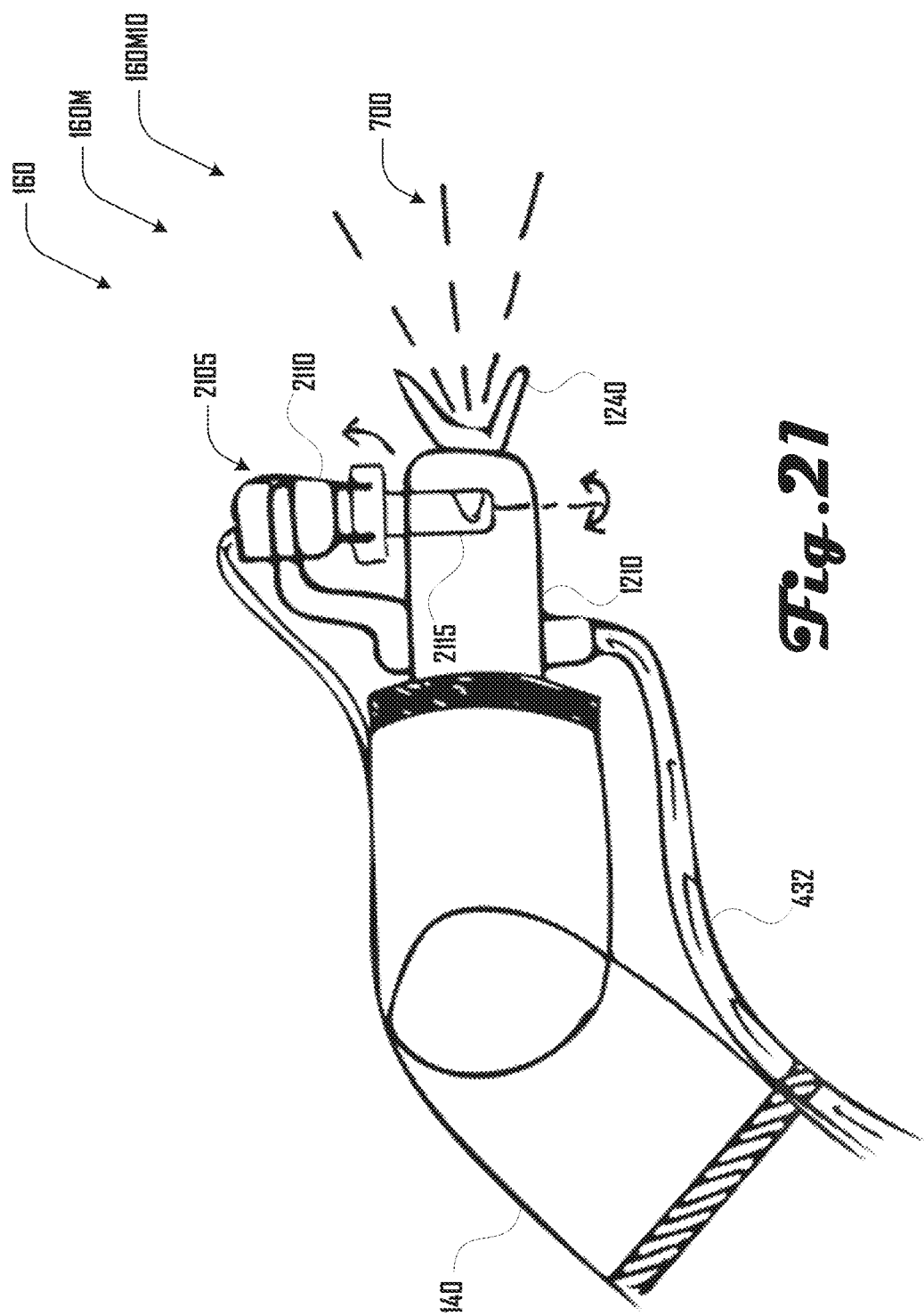
FIG. 21 illustrates another example embodiment of a coating end effector that comprises a nozzle rotating system that can be part of a spray gun.

FIG. 21 illustrates another example embodiment 160M10 of a coating end effector 160M that comprises of a nozzle rotating system 2105 that can be part of a spray gun 1210. In this example, the system 100 can utilize an actuator assembly 2110 (e.g., a servo or other electromechanical actuator) to rotate (e.g., 180 degrees) a portion 2115 of the nozzle 1210 allowing for coating 630 to go through the nozzle portion 2115 in reverse helping clear out clogs.

In various embodiments, nozzle or blade wear models can also take as an input the type and characteristics of coating 630 applied and the conditions under which such coating 630 was applied. One or more vision system 364, 324 of the system 100 can be used to detect finish, tool pattern and establish if the nozzle 1240 or blade 1130 needs to be changed, rotated, cleaned or otherwise modified. A user interface can display the wear on the nozzle 1240 or blade 1130 and alert the user when these need to be changed. A coating end effector 160M can also include a mechanism to automatically replace or clean the nozzle 1240 or portions thereof. One embodiment (e.g., FIG. 20) can use a cassette with replacement nozzles 1240 that can be rotated into place. The sprayer 1210 can also have a mechanism 2105 to rotate the nozzle or portion thereof (e.g. a tip or feeding tube) to clear a clog (e.g., FIG. 21). The nozzle clearing or replacement can be run automatically by the system 100 without any human intervention or as a collaboration between the system 100 and the user.

The system 100 can generate reports and interface with other software platforms including BIM packages. Reports can be created that can be used for inspection and certification. A report can be customized to provide the information required to pass a standard, test, or certification. The reporting system can also provide a live update of the current task progress and live camera feed. This information can be used to help track asset performance and work progression. The data can be reported to a BIM system or other software to facilitate planning of other trades, next steps, or schedule inspections or other tasks. The reports can include full maps of the coating 630 applied and tool and path parameters utilized to complete the task. Further images or video can be recorded to facilitate quality checks or for tracking of issues. The system 100 can record parameters used to complete the task which can be fed to a machine learning software to enable the system 100 to learn from past work. The reports can also be used to optimize workflow and scheduling. The system's optimization function can be updated to meet the desired needs including minimizing task time, completion of the task in a part of the worksite to allow other trades to come in, minimizing cost, optimal use of assets and workforce, among others. The system's reports can also include information on environmental conditions and how the process was changed given the conditions.

The system 100 can create a report that shows the process parameters that were used to cover the surface as well as the order of operations. The report can include BIM, 3D and 2D maps or plans, images, video. The maps provided by the system 100 can be used to facilitate repairs and maintenance by providing the customer with the location of components behind the wall as well as the location of seams to facilitate the removal of panels or boards.

The updated room models that reflect the as built conditions and measurements can be exported for use in sanding the walls or for certification of quality at delivery. A complete map of the thickness of the compound applied with or without shrinking can be fed into the system 100 or a separate automated sanding system which can plan tool paths and parameters desired to achieve the desired finish by sanding. The system 100 can work in conjunction with a larger system that plans the full process from mapping a room, to cutting and hanging the substrate to finishing and painting of the surfaces. The system 100 can be used for coating surfaces with any suitable material, including but not limited to one or more coating 630, which can include joint compound, plaster, gypsum, concrete, stucco, cement, paint, polymer coating, lacquers, varnishes, or any combination of these. The coating 630 can also comprise polymers such as latex, acrylics, or the like, and/or adhesion additives including glue and other bonding agents. The coating 630 can comprise a synthetic material such as Parex, an acrylic synthetic stucco, or the like. The system 100 can apply the coating(s) on any suitable substrate, including but not limited to drywall, boards, lath, mesh, or other substrates. The system 100 can also be used to apply other coatings such as wallpaper, polymer films, or the like.

Figure 22:
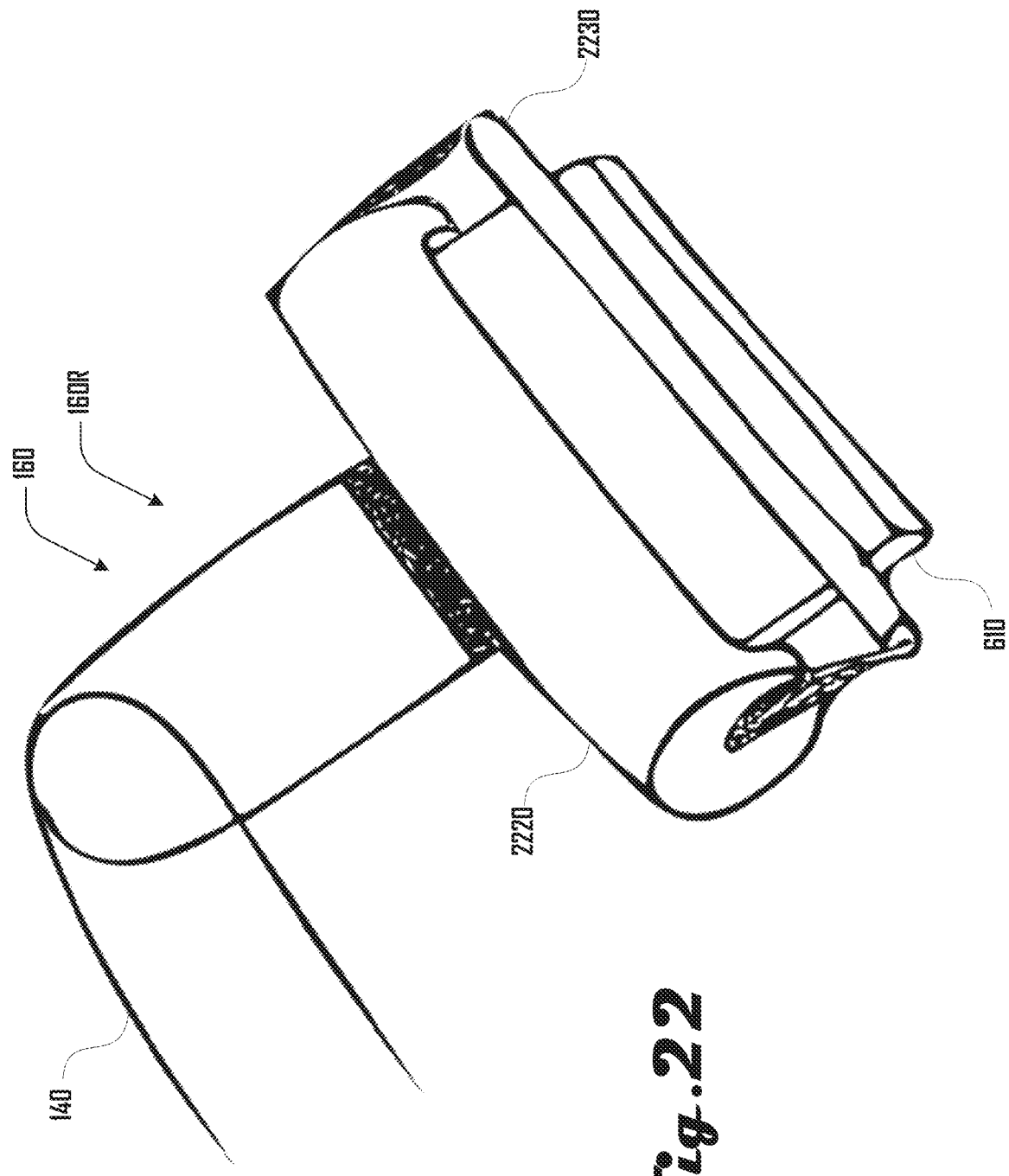
FIG. 22 illustrates an example embodiment of a substrate applicator end effector, wherein a roll of substrate is mounted within a roll body of the end effector and fed under a roller.

The system may also utilize an end effector mounted on the robotic arm to layout and attach the substrate to the structural components. FIG. 22 illustrates an example embodiment of a substrate applicator end effector 160R, wherein a roll of substrate 610 is mounted within a roll body 2220 of the end effector 160 and fed under a roller 2230. The substrate end effector 160R can be moved over a target surface and the roller 2230 to push the substrate 610 into place in-between or over the studs 830 of a wall assembly 800 or other suitable location. For example, substrate 610 can be applied vertically or horizontally between studs 830 or horizontally or vertically over studs (e.g., as shown in FIGS. 8b, 9a and 9b). In various examples, the substrate end effector 160R can use studs 830 or other suitable framing element or other feature as a datum for guiding the insulation end effector 160I.

In some embodiments, the width of substrate 610 can be set to match a spacing width between studs 830, height of the wall, or the like. For example, a substrate end effector 160R can comprise a blade, laser or other cutter that can be used to cut substrate 610 to size before, during or after application of the substrate 610. Additionally, adhesive can couple substrate 610 within a wall assembly 800 or other suitable location. For example a roll of substrate 610 can be pre-impregnated with adhesive before or during application; a substrate end effector 160R can apply adhesive ahead of the substrate 610 to help secure the substrate 610 to a stud 830, or the like.

In some examples, an adhesive can be applied with an end effector 160 by spraying. Some examples can include a separate end effector 160 having an adhesive spray gun, or an adhesive spray gun can be part of a substrate end effector 160R, that is configured to apply adhesive in front of the substrate 610 onto a surface that the substrate 610 is being applied to and/or by applying the adhesive onto the substrate 610 before the roller 2230.

Figure 23:
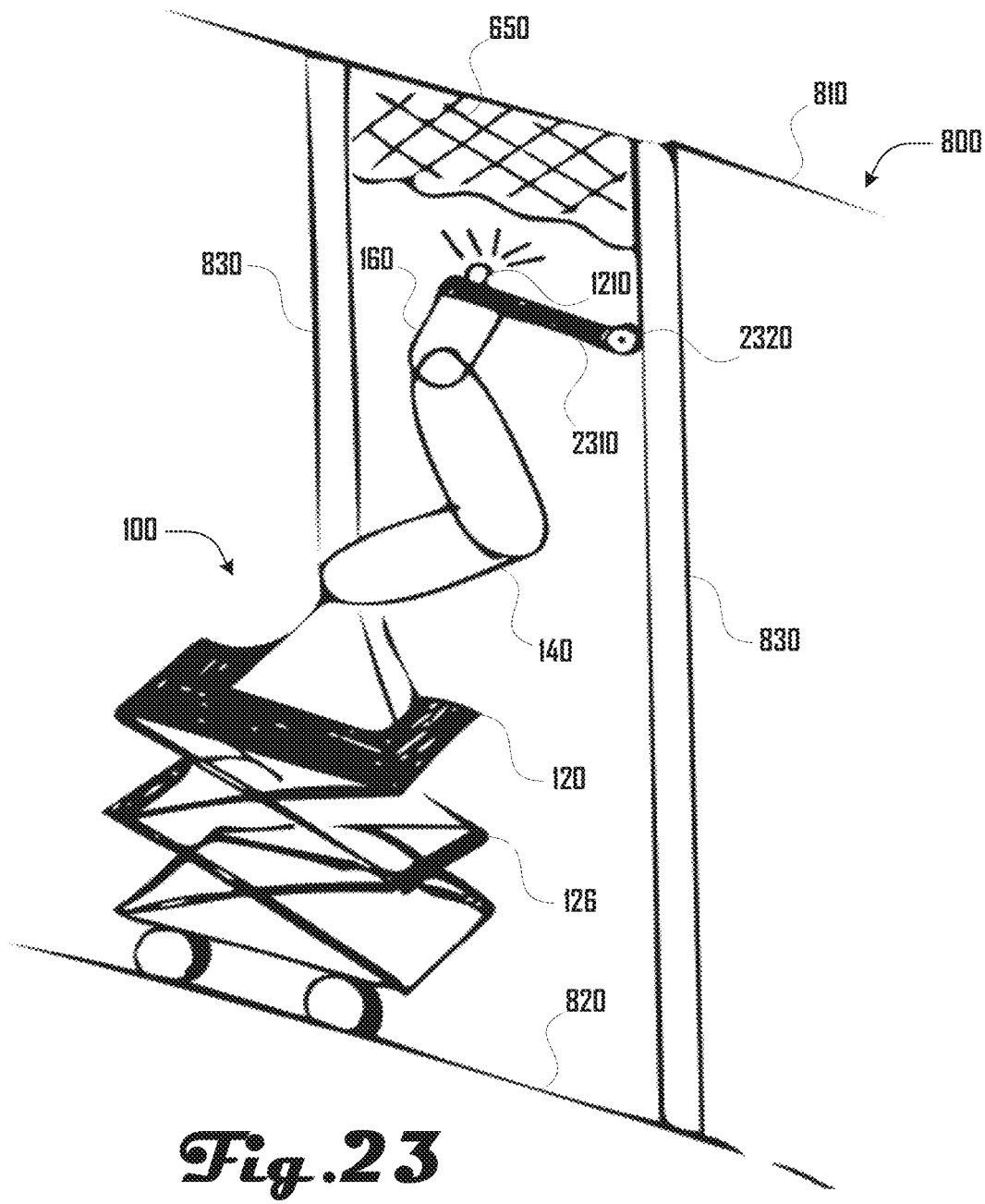
FIG. 23 illustrates an example embodiment of an automated wall finishing system where a substrate end effector utilizes studs of a wall assembly as a guide for delivering substrate between or on the studs, header and/or footer of a wall assembly.

FIG. 23 illustrates an example embodiment of an automated wall finishing system 100 where a substrate end effector 160 utilizes studs 830 of a wall assembly 800 as a guide for delivering substrate 650 between or on the studs 830, header 810 and footer 820 of the wall assembly 800. As shown in FIG. 23, the end effector 160 can comprise an arm 2310 having a roller 2320 that can be pressed against an internal face of a stud 830 for guiding the sprayer 1210. In various examples, the substrate end effector 160 can utilize the surrounding surfaces as datums and a roller, wheel, blade, or the like, and can be pushed in contact with such a datum surface or feature for reference.

Such contact points can extend away from a substrate application zone to enable the use of datums away from the where the sprayer 1210 is applying the coating 630. For example, FIG. 23 illustrates the end effector 160 having an arm 2310, which can allow the sprayer 1210 to be spaced centrally between the studs 830, while the roller 2310 contacts one of the studs 830 for use as a datum.

In various embodiments, the end effector 160 can control the position of the contact points such that the correct or optimal datum surface is used. For example, the arm 2310 can be extendible and retractable to provide for a desired offset from the stud 830 or other contact surface. Additionally, the force and pressure on contact points can also be controlled. For example, force can be directly or indirectly measured or estimated by monitoring the deflection of the mounting structure, and the like. In one embodiment, the spray end effector 160 can utilize a roller 2310 to guide the sprayer 1210 along a stud 830 or other portion of a wall assembly as shown in FIG. 23. In some examples, the system 100 can operate in hybrid force and position control following the stud 830 and spraying the coating 630 in a target area relative to the stud 830.

In various embodiments, the system 100 can include a cutting tool for trimming the substrate 610 and/or coating 630 after the substrate 610 and/or coating 630 has been applied. For example, the system 100 can create a map or model of a room given a set of substrate application parameters and/or by directly mapping the room after the substrate 610 and/or coating 630 has been applied. A model or map of the room with substrate 610 and/or coating 630 can be used to determine areas that need to be trimmed or cut to enable the closing of the walls and installation of doors, windows and the like. In some examples, a substrate cutting tool can follow a front edge of studs 830, or other suitable framing element, and cut substrate material 610 and/or coating 630 that protrudes beyond the plane of the stud 830. In one embodiment, a substrate/coating cutting system can comprise a blade that is pushed along the edge of a stud 830, which can remove substrate 610 and/or coating 630 that extends beyond the face of the stud 830. The substrate/coating cutting tool can be powered or unpowered in various embodiments. The robotic arm 140 and/or end effector 160 can be used to drive a substrate cutting tool through the substrate 610 and/or coating 630. Additionally, substrate 610 and/or coating 630 can be cut to create room for electrical boxes, wires, framing, conduit, pipes, or any other mechanical, electrical or plumbing component.

The one or more vision systems 364, 324, sensors 624, 644, 664, and/or model of the room or structure may be used to determine the amount of substrate 610 and/or coating material 630 to adequately cover the target surfaces (e.g., over or between studs 830, over substrate 610 coupled to a wall assembly 800, or the like). In various embodiments, such estimates can be used to pre-order materials (e.g., substrate 610, coating 630, and the like) and estimate duration of the job. The environmental conditions of the site can be monitored to determine curing and drying times and estimate the duration of the task or time remaining in a task. The site temperature, humidity, light, airflow, and the like can be controlled to affect drying, setting, and/or curing times of substrate 610 and/or coating 630. De-humidifiers, heaters, fans, blowers, coolers, humidifiers, lights, or a combination of these can be mounted on the system 100 or the room to control the environmental conditions.

The coating material 630 (e.g., depending on the first coat, second coat and third coat, where present) can have different performance properties that allow for different finish textures to be achieved. The coating material 630 can be sprayed using an airless or air driven system. The coating material 630 can also have different performance properties based on code compliance pertaining to sound isolation, fire retardancy, weight distribution, and hardness of materials that can allow building-specific design intents to be accomplished. The delivery mechanism for coating 630 can include texture sprayers, paint sprayers, concrete sprayers, purpose built sprayers, and the like. The mixed coating 630 can be pumped directly to a nozzle 1240 or can be mixed into the liquid at or beyond the nozzle 1240. The nozzle 1240 may utilize cartridges or a feeding tube to deliver powder, slurry, or additives (e.g., as shown in FIG. 14). The cartridge or mixing nozzle may be disposable. The coating mixture 630 can be controlled to achieve a desired material property including viscosity, water content, mixture composition, and the like. The material composition can also be controlled depending on the monitored environmental conditions. The desired substrate material, geometry, orientation (vertical, horizontal, angled), schedule, and target finish can be used to determine the optimal coating mixture.

A nozzle 1240 or pump may be instrumented with a sensor to control a coating material delivery rate. Such a sensor can monitor pressure, flow rate, mass rate, trigger position, and the like. A nozzle orifice opening can be controlled to set the coating material delivery rate, the coating particle speed, the coating mixture composition, coating texture, and the like. The nozzle orifice can be controlled to produce the desired coating material delivery including coating spray shape, size, and the like. The size of the orifice can be controlled using a motor, servo, valve, or the like. The size of the orifice can be changed by changing the distance between two cones in some examples.

The system 100 can use a variety of nozzle shapes and sizes to deliver the coating, including fan and bell shapes. The tool may include a nozzle carousel (e.g., as shown in FIG. 20) that the operator or system 100 can use to change the tip on the sprayer. The coating material 630 can be deposited evenly over the substrate 610, which can ensure the surface of the substrate 610 is covered with a consistent thickness which can certify fire, insulation or sound ratings.

In some embodiments, a vacuum system can be used to control overspray (e.g., as shown in FIG. 16). For example, a vacuum inlet can be mounted next to the nozzle and can utilize a hood that follows or surround the nozzle to capture the overspray. The vacuum system may also be mounted on the mobile base. In further embodiments, an air stream can be used to control coating overspray, to direct the coating spray or to control the size and/or shape of the coating spray.

For example, FIG. 24 illustrates an example embodiment 160M11 of a coating end effector 160M having a spray gun 1610 that comprises a coating nozzle 1640 surrounded by one or more air nozzles 2440. As shown in the example of FIG. 24, the one or more air nozzles 2440 can generate an air flow curtain 2430 about the coating spray 700, which can control overspray of the coating spray 700, direct the coating spray 700, control the size and/or shape of the coating spray 700, or the like. For example, the one or more air nozzles 2440 can selectively focus or modify the coating spray 700 as necessary to generate a desired effect.

An air flow curtain 2430 can be generated in various suitable ways by one or more air nozzles 2440. For example, in some embodiments, a plurality of separate air nozzles 2440 can be disposed surrounding the coating nozzle 1640. In another embodiment, a ring nozzle can define an air nozzle 2440 that surrounds the coating nozzle 1640. The one or more air nozzles 2440 can be fed via various suitable sources including from a compressed air source located at the base unit 120 or other suitable location about or apart from the system 100. Also, in further embodiments, any suitable fluid can be used to generate the flow curtain 2430.

The system 100 can include a cleaning or clearing system and process to clear a coating nozzle 1640 of clogs. Such a cleaning or clearing system can be used to clear or flush the entire system from pump to nozzle of material in some examples. The system 100 can automatically detect (e.g., through pressure sensors or time) when the spray system should be cleared and in response can automatically run a cleaning routine for the spray system. The cleaning routine can also be triggered by the operator at the end of the cleaning process or when problems arise. The portions of the system 100 associated with storing and generating a spray of coating 630 can be designed to be sealed to the environment so that no curing or drying of the coating 630 happens within the system 100 (e.g., the compound source 430, compound lines 432, a pump, or the like).

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An automated finishing system for applying a coating to a flexible substrate of a wall assembly, the automated finishing system comprising:

a mobile base unit that includes:
  a mud source configured to store coating material;
  a platform,
  a cart configured to move on the ground, and
  a lift disposed between the platform and cart, the lift configured to raise the platform up and down;
an elongated robotic arm that extends between a base end and a distal end, the robotic arm coupled to the base unit on the platform at the base end of the robotic arm;
a coating end effector coupled at the distal end of the robotic arm, the coating end effector including:
  a spray gun configured to generate a spray of coating material from a mixing nozzle of the spray gun, the spray gun coupled with a mud tube extending from the mud source via the robotic arm, the spray gun configured to receive coating material from the mud source via the mud tube to generate the spray of coating material, the mixing nozzle configured to mix the received coating material from the mud source with at least an accelerant and one or both of a tinting or pigmenting material at the mixing nozzle, the accelerant accelerating the setting time of applied coating material compared to setting time of applied coating material without the accelerant;
  one or more air nozzles configured to produce an air flow curtain about a coating spray generated by a coating nozzle, the air flow curtain configured to control overspray of the coating spray, direct the coating spray, or control the size and/or shape of the coating spray;
  a system configured to mount one or more environmental sensors onto a target surface, one or more environmental sensors capable of providing environmental condition data including temperature and humidity data; and
  a drying source configured to apply heat and/or dry air to coating material that has been applied by the coating end effector to the target surface;
one or more vision systems;
one or more sensors;
a computing device executing a computational planner that:
  obtains target surface data from the one or more vision systems and the one or more sensors, the target surface data including information regarding a configuration of a wall assembly including a plurality of flexible substrate pieces hung on the wall assembly;
  obtains environmental condition data from one or more sensors disposed in the flexible substrate pieces, the environmental condition data comprising information about environmental conditions associated with plurality of flexible substrate pieces;
  automatically generates, instructions for driving the coating end effector, robotic arm, and base unit to perform at least one coating task that includes:
    applying a coating spray generated by the spray gun of the coating end effector to the plurality of flexible substrate pieces, the instructions based at least in part on the target surface data, a predetermined level of drywall finish, and environmental condition data;
    producing the air flow curtain about the coating spray;
    mounting environmental sensors capable of providing environmental data; and
    applying heat and/or dry air to dry the coating material; and
  automatically drives, the coating end effector, robotic arm, and base unit to perform the at least one coating task based on the generated instructions.

2. The automated finishing system of claim 1, wherein the flexible substrate pieces are defined by a two-layer flexible substrate that includes:
  a planar porous layer; and
  a planar less-porous layer coupled to the porous layer, the porous layer facing outward from the wall assembly and having pores such that coating material applied to the flexible substrate pieces can enter the porous layer, and the less-porous layer being attached to studs of the wall assembly and impermeable to the coating material such that the coating material applied to the flexible substrate pieces does not permeate and enter the less-porous layer.

3. The automated finishing system of claim 1, wherein the coating end effector further comprises a vacuum hood disposed around an end and the nozzle of the spray gun to capture overspray generated by the spray of coating material generated by the nozzle of the spray gun.

4. The automated finishing system of claim 1, wherein the generating instructions for driving the coating end effector, robotic arm, and base unit to apply coating to the plurality of flexible substrate pieces, is further based on data obtained while the automated finishing system was hanging the flexible substrate pieces on the wall assembly.

5. An automated coating application system comprising:
  a mobile base unit including a storage container configured to store coating material;
  a robotic arm that extends between a base end and a distal end, the robotic arm coupled to the base unit at the base end of the robotic arm;
  a coating end effector coupled at the distal end of the robotic arm, the coating end effector configured to:
    apply coating material to a target surface via a mixing nozzle of a spray gun coupled with the storage container, the mixing nozzle configured to mix the coating material received from the storage container with at least an accelerant and one or both of a tinting or pigmenting material at the mixing nozzle, the accelerant accelerating the setting time of applied coating material compared to setting time of applied coating material without the accelerant;
    provide one or more air nozzles, the one or more air nozzles producing an air flow curtain about a coating spray generated by a coating nozzle, the air flow curtain configured to control overspray of the coating spray, direct the coating spray, or control the size and/or shape of the coating spray;
    mount one or more environmental sensors capable of providing environmental condition data onto the target surface; whereby the environmental sensors provide temperature and humidity data; and
    provide a drying source, wherein the drying source is configured to apply heat and/or dry air to coating material that has been applied by the coating end effector to the target surface;
  one or more vision systems; and
  a computing device executing a computational planner that:
    obtains target surface data from the one or more vision systems, the target surface data including information regarding a configuration of a wall assembly including one or more substrate pieces hung on the wall assembly;

automatically generates, instructions for driving the coating end effector, robotic arm, and base unit to perform at least one coating task that includes applying coating material, producing the air flow curtain about the coating spray, mounting environmental sensors capable of providing environmental data, and applying heat and/or dry air to dry the coating material, via the coating end effector, to the one or more substrate pieces, the instructions based at least in part on the target surface data and a predetermined level of drywall finish; and automatically drives, the end effector, robotic arm, and base unit to perform the at least one coating task based on the generated instructions.

6. The automated coating system of claim 5, wherein the one or more substrate pieces are defined by a two-layer substrate that includes:

a planar porous layer; and a planar less-porous layer coupled to the porous layer, the porous layer facing outward from the wall assembly and having pores such that coating material applied to the substrate pieces can enter the porous layer.

7. The automated coating system of claim 5, wherein the computational planner further automatically generates, instructions for driving a substrate end effector, the robotic arm, and the base unit to couple the one or more substrate piece to the wall assembly, and wherein the substrate end effector comprises a roll of substrate material mounted within a roll body of the substrate end effector assembly, the roll of substrate material applied to the wall assembly to generate the one or more substrate pieces coupled to the wall assembly.

8. The automated coating system of claim 5, wherein the coating end effector comprises a coating nozzle surrounded by one or more air nozzles, the one or more air nozzles generating an air flow curtain about a coating spray generated by the coating nozzle, the air flow curtain configured to control overspray of the coating spray, direct the coating spray, or control the size and/or shape of the coating spray.

9. The automated coating system of claim 5, wherein the coating end effector further includes a guiding element configured to engage the target surface or adjacent portion of the wall assembly to guide the coating end effector in coating the target surface.

10. The automated coating system of claim 5, wherein the generating instructions for driving the coating end effector, robotic arm, and base unit to apply coating to the one or more substrate pieces, is further based on data obtained while the automated coating system was hanging the one or more substrate pieces on the wall assembly.

11. The automated coating system of claim 5, wherein the computational planner further automatically determines an amount of coating to apply to the one or more substrate pieces based at least in part on the target surface data and determines a coating profile for coating to be applied to the one or more substrate pieces, and wherein the computational planner further generates, the instructions for driving the coating end effector, robotic arm, and base unit to apply coating to the one or more substrate pieces based at least in part on the determined amount of coating to apply and the determined coating profile.

12. The automated coating system of claim 5, wherein the automated coating system further comprises a mixing system for the mixing of coating material and providing the mixed coating material to the coating end effector, and wherein the computational planner changes mixing parameters of the coating material generated by the mixing system based on environmental condition data obtained from one or more sensors of the automated coating system.

13. The automated coating system of claim 5 wherein the system uses a tool to apply or work the coating onto the substrate through contact.

14. A coating system comprising:

a robotic arm that extends between a base end and a distal end;

a coating end effector coupled at the distal end of the robotic arm, the coating end effector comprising:

a sprayer configured to apply coating material to a target surface via a mixing nozzle coupled with a mobile storage container storing coating material, the mixing nozzle configured to mix coating material received from the storage container with at least one of an accelerant, a tinting and pigmenting material at the mixing nozzle, the accelerant accelerating the setting time of applied coating material compared to setting time of applied coating material without the accelerant;

one or more air nozzles configured to produce an air flow curtain about a coating spray generated by a coating nozzle, the air flow curtain configured to control overspray of the coating spray, direct the coating spray, or control the size and/or shape of the coating spray;

a system configured to apply one or more environmental sensors capable of providing environmental condition data to the target surface; the environmental sensors configured to provide at least one of temperature and humidity data; and a drying source configured to apply heat and/or dry air to coating material that has been applied by the coating end effector to the target surface;

a computing device executing a computational planner that:

generates instructions for driving the coating end effector and robotic arm to perform at least one coating task that includes applying coating material, via the coating end effector, to one or more substrate pieces that define the target surface, producing the air flow curtain about the coating spray, applying environmental sensors to the target surface, and applying heat and/or dry air to dry the coating material, the instructions based at least in part on obtained target surface data and a predetermined level of drywall finish; and drives the end effector and robotic arm to perform the at least one coating task based on the generated instructions.

15. The coating system of claim 14, wherein the one or more substrate pieces that define the target surface comprise a pre-impregnated substrate with a pre-impregnated coating material applied to the substrate before being hung on a wall assembly, the pre-impregnated coating material in the substrate converted into a rigid coating by the coating system spraying a liquid material on the substrate.

16. The coating system of claim 14, wherein the coating material is electrostatically charged and one or more substrate pieces that define the target surface are grounded to accelerate coating particles of the coating material toward the one or more substrate pieces that define the target surface.

17. The coating system of claim 14, wherein one or more substrate pieces that define the target surface comprise one or more sensors that measure at least one environmental condition associated with the one or more substrate pieces, the one or more sensors providing environmental condition data to the coating system during application of coating material to the one or more substrate pieces, and wherein the computational planner further:

generates modified instructions for driving the coating end effector and robotic arm to perform the at least one coating task that includes applying coating material, via the coating end effector, to one or more substrate pieces, the generating of the modified instructions based at least in part on the environmental condition data; and drives the end effector and robotic arm to perform the at least one coating task via the modified instructions.

\* \* \* \* \*

UNITED STATES PATENT AND TRADEMARK OFFICE
CERTIFICATE OF CORRECTION

PATENT NO. : 10,577,810 B2
APPLICATION NO. : 16/141791
DATED : March 3, 2020
INVENTOR(S) : Maria J. Telleria et al.

It is certified that error appears in the above-identified patent and that said Letters Patent is hereby corrected as shown below:

In the Claims

Column 34, Line 65, cancel the text beginning with "1. An automated finishing" to and ending "the generated instructions." in Column 36, Line 3 and insert the following claim:
--1. An automated finishing system for applying a coating to a flexible substrate of a wall assembly, the automated finishing system comprising:
    a mobile base unit that includes:
        a mud source configured to store coating material;
        a platform,
    a cart configured to be disposed on and move on the ground, and
    a lift disposed between the platform and the cart, the lift configured to raise the platform up and down;
    an elongated robotic arm that extends between a base end and a distal end, the robotic arm coupled to the mobile base unit on the platform at the base end of the robotic arm;
    a coating end effector coupled at the distal end of the robotic arm, the coating end effector including:
        a spray gun configured to generate a spray of the coating material from a mixing nozzle of the spray gun, the spray gun coupled with a mud tube extending from the mud source via the robotic arm, the spray gun configured to receive the coating material from the mud source via the mud tube to generate the spray of the coating material, the mixing nozzle configured to mix the received coating material from the mud source with at least an accelerant and one or both of a tinting or pigmenting material at the mixing nozzle, the accelerant accelerating the setting time of applied coating material compared to setting time of applied coating material without the accelerant;
        one or more air nozzles configured to produce an airflow curtain about a coating spray generated by a coating nozzle, the air flow curtain configured to control overspray of the coating spray, direct the coating spray, or control the size and/or shape of the coating spray;
        a system configured to mount one or more environmental sensors onto a target surface, the one or more environmental sensors capable of providing environmental condition data including temperature and humidity data; and
        a drying source configured to apply heat and/or dry air to the coating material that has Signed and Sealed this
Sixth Day of December, 2022

Katherine Kelly Vidal
*Director of the United States Patent and Trademark Office* been applied by the coating end effector to the target surface;
   one or more vision systems;
   the one or more environmental sensors; and
   a computing device executing a computational planner that:
      obtains target surface data from the one or more vision systems and the one or more environmental sensors, the target surface data including information regarding a configuration of a wall assembly including a plurality of flexible substrate pieces hung on the wall assembly;
      obtains the environmental condition data from the one or more environmental sensors disposed in the plurality of flexible substrate pieces, the environmental condition data comprising information about environmental conditions associated with the plurality of flexible substrate pieces;
      automatically generates instructions for driving the coating end effector, the robotic arm, and the mobile base unit lo perform at least one coating task that includes:
         applying the coating spray generated by the spray gun of the coating end effector to the plurality of flexible substrate pieces, the instructions based at least in part on the target surface data and the environmental condition data;
         producing the air flow curtain about the coating spray;
         mounting the one or more environmental sensors capable of providing the environmental condition data; and
         applying heat and/or dry air to dry the coating material; and
      automatically drives the coating end effector, the robotic arm, and the mobile base unit to perform the at least one coating task based on the generated instructions.--

Column 36, Line 4, cancel the text beginning with "2. The automated finishing" to and ending "the less-porous layer." in Column 36, Line 17 and insert the following claim:
--2. The automated finishing system of claim 1, wherein the plurality of flexible substrate pieces are defined by a two-layer flexible substrate that includes:
   a planar porous layer; and
   a planar less-porous layer coupled to the planar porous layer, the planar porous layer facing outward from the wall assembly and having pores such that coating material applied to the plurality of flexible substrate pieces can enter the planar porous layer, and the planar less-porous layer being attached to studs of the wall assembly and impermeable to the coating material such that the coating material applied to the plurality of flexible substrate pieces does not permeate and enter the planar less-porous layer.--

Column 36, Line 18, cancel the text beginning with "3. The automated finishing" to and ending "the spray gun." in Column 36, Line 22 and insert the following claim:
--3. The automated finishing system of claim 1, wherein the coating end effector further comprises a vacuum hood disposed around an end and the mixing nozzle of the spray gun to capture overspray generated by the spray of coating material generated by the mixing nozzle of the spray gun.--

Column 36, Line 23, cancel the text beginning with "4. The automated finishing" to and ending "the wall assembly." in Column 36, Line 28 and insert the following claim:
--4. The automated finishing system of claim 1, wherein the generating instructions for driving the coating end effector, the robotic arm, and the mobile base unit to apply the coating spray to the plurality of flexible substrate pieces, is further based on data obtained while the automated finishing system was hanging the plurality of flexible substrate pieces on the wall assembly.--

CERTIFICATE OF CORRECTION (continued)
U.S. Pat. No. 10,577,810 B2

Column 36, Line 29, cancel the text beginning with "5. An automated coating" to and ending "the generated instructions." in Column 37, Line 15 and insert the following claim:
--5. An automated coating application system comprising:
    a mobile base unit including a storage container configured to store coating material;
    a robotic arm that extends between a base end and a distal end, the robotic arm coupled to the mobile base unit at the base end of the robotic arm;
    a coating end effector coupled at the distal end of the robotic arm, the coating end effector configured to:
        apply the coating material to a target surface via a mixing nozzle of a spray gun coupled with the storage container, the mixing nozzle configured to mix the coating material received from the storage container with at least an accelerant and one or both of a tinting or pigmenting material at the mixing nozzle, the accelerant accelerating the setting time of applied coating material compared to setting time of applied coating material without the accelerant;
        provide one or more air nozzles, the one or more air nozzles producing an air flow curtain about a coating spray generated by a coating nozzle, the air flow curtain configured to control overspray of the coating spray, direct the coating spray, or control the size and/or shape of the coating spray;
        mount one or more environmental sensors capable of providing environmental condition data onto the target surface; whereby the environmental sensors provide temperature and humidity data; and
        provide a drying source, wherein the drying source is configured to apply heat and/or dry air to the coating material that has been applied by the coating end effector to the target surface;
    one or more vision systems; and
    a computing device executing a computational planner that:
        obtains target surface data from the one or more vision systems, the target surface data including information regarding a configuration of a wall assembly including one or more substrate pieces hung on the wall assembly;
        automatically generates instructions for driving the coating end effector, the robotic arm, and the mobile base unit to perform at least one coating task that includes applying the coating material, producing the air flow curtain about the coating spray, mounting the one or more environmental sensors capable of providing the environmental condition data, and applying heat and/or dry air to dry the coating material, via the coating end effector, to the one or more substrate pieces, the instructions based at least in part on the target surface data and a predetermined level of drywall finish; and
        automatically drives the coating end effector, the robotic arm, and the mobile base unit to perform the at least one coating task based on the generated instructions.--

Column 37, Line 16, cancel the text beginning with "6. The automated coating" to and ending "the porous layer." in Column 37, Line 23 and insert the following claim:
--6. The automated coating application system of claim 5, wherein the one or more substrate pieces are defined by a two-layer substrate that includes:
    a planar porous layer; and
    a planar less-porous layer coupled to the planar porous layer, the planar porous layer facing outward from the wall assembly and having pores such that coating material applied to the one or more substrate pieces can enter the planar porous layer.--

Column 37, Line 24, cancel the text beginning with "7. The automated coating" to and ending "the wall assembly." in Column 37, Line 34 and insert the following claim:
--7. The automated coating application system of claim 5, wherein the computational planner further automatically generates instructions for driving a substrate end effector, the robotic arm, and the mobile base unit to couple the one or more substrate pieces to the wall assembly, and
      wherein the substrate end effector comprises a roll of substrate material mounted within a roll body of the substrate end effector, the roll of substrate material applied to the wall assembly to generate the one or more substrate pieces coupled to the wall assembly.--

Column 37, Line 35, cancel the text beginning with "8. The automated coating" to and ending "the coating spray." in Column 37, Line 41 and insert the following claim:
--8. The automated coating application system of claim 5, wherein the coating end effector comprises the coating nozzle surrounded by the one or more air nozzles, the one or more air nozzles generating the airflow curtain about the coating spray generated by the coating nozzle, the air flow curtain configured to control overspray of the coating spray, direct the coating spray, or control the size and/or shape of the coating spray.--

Column 37, Line 42, cancel the text beginning with "9. The automated coating" to and ending "the target surface." in Column 37, Line 46 and insert the following claim:
--9. The automated coating application system of claim 5, wherein the coating end effector further includes a guiding element configured to engage the target surface or adjacent portion of the wall assembly to guide the coating end effector in coating the target surface.--

Column 37, Line 47, cancel the text beginning with "10. The automated coating" to and ending "the wall assembly." in Column 37, Line 52 and insert the following claim:
--10. The automated coating application system of claim 5, wherein the generating instructions for driving the coating end effector, the robotic arm, and the mobile base unit to apply the coating material to the one or more substrate pieces, is further based on data obtained while the automated coating application system was hanging the one or more substrate pieces on the wall assembly.--

Column 37, Line 53, cancel the text beginning with "11. The automated coating" to and ending "determined coating profile." in Column 37, Line 63 and insert the following claim:
--11. The automated coating application system of claim 5, wherein the computational planner further automatically determines an amount of the coating material to apply to the one or more substrate pieces based at least in part on the target surface data and determines a coating profile for the coating material to be applied to the one or more substrate pieces, and wherein the computational planner further generates the instructions for driving the coating end effector, the robotic arm, and the mobile base unit to apply the coating material to the one or more substrate pieces based at least in part on the determined amount of the coating material to apply and the determined coating profile.--

Column 37, Line 64, cancel the text beginning with "12. The automated coating" to and ending "automated coating system." in Column 38, Line 5 and insert the following claim:
--12. The automated coating application system of claim 5, wherein the automated coating application system further comprises a mixing system for mixing of the coating material and providing mixed coating material to the coating end effector, and wherein the computational planner changes mixing parameters of the coating material generated by the mixing system based on the environmental condition data obtained from the one or more environmental sensors of the automated coating application system.--

Column 38, Line 6, cancel the text beginning with "13. The automated coating" to and ending "substrate through contact." in Column 38, Line 8 and insert the following claim:
--13. The automated coating application system of claim 5, wherein the automated coating system uses a tool to apply or work the coating material onto the one or more substrate pieces through contact.--

Column 38, Line 9, cancel the text beginning with "14. A coating system" to and ending "the generated instructions." in Column 38, Line 54 and insert the following claim:
--14. A coating system comprising:
    a robotic arm that extends between a base end and a distal end;
    a coating end effector coupled at the distal end of the robotic arm, the coating end effector comprising:
        a sprayer configured to apply coating material to a target surface via a mixing nozzle coupled with a mobile storage container storing the coating material, the mixing nozzle configured to mix the coating material received from the mobile storage container with at least one of an accelerant, a tinting and pigmenting material at the mixing nozzle, the accelerant accelerating the setting time of applied coating material compared to setting time of applied coating material without the accelerant;
        one or more air nozzles configured to produce an airflow curtain about a coating spray generated by a coating nozzle, the air flow curtain configured to control overspray of the coating spray, direct the coating spray, or control the size and/or shape of the coating spray;
        a system configured to apply one or more environmental sensors capable of providing environmental condition data to the target surface; the one or more environmental sensors configured to provide at least one of temperature and humidity data; and
        a drying source configured to apply heat and/or dry air to the coating material that has been applied by the coating end effector to the target surface; and
    a computing device executing a computational planner that:
        generates instructions for driving the coating end effector and the robotic arm to perform at least one coating task that includes applying the coating material, via the coating end effector, to one or more substrate pieces that, define the target surface, producing the air flow curtain about the coating spray, applying the one or more environmental sensors to the target surface, and applying heat and/or dry air to dry the coating material, the instructions based at least in part on obtained target surface data; and
        drives the coating end effector and the robotic arm to perform the at least one coating task based on the generated instructions.--

Column 38, Line 55, cancel the text beginning with "15. The coating system" to and ending "on the substrate." in Column 38, Line 61 and insert the following claim:
--15. The coating system of claim 14, wherein the one or more substrate pieces that define the target surface comprise a pre-impregnated substrate with a pre-impregnated coating material applied to the one or more substrate pieces before being hung on a wall assembly, the pre-impregnated coating material in the one or more substrate pieces converted into a rigid coating by the coating system spraying a liquid material on the one or more substrate pieces.--

CERTIFICATE OF CORRECTION (continued)
U.S. Pat. No. 10,577,810 B2

Column 38, Line 62, cancel the text beginning with "16. The coating system" to and ending "the target surface." in Column 38, Line 67 and insert the following claim:
--16. The coating system of claim 14, wherein the coating material is electrostatically charged and the one or more substrate pieces that define the target surface are grounded to accelerate coating particles of the coating material toward the one or more substrate pieces that define the target surface.--

Column 39, Line 1, cancel the text beginning with "17. The coating system" to and ending "the modified instructions." in Column 39, Line 18 and insert the following claim:
--17. The coating system of claim 14, wherein the one or more substrate pieces that define the target surface comprise one or more sensors that measure at least one environmental condition associated with the one or more substrate pieces, the one or more sensors providing environmental condition data to the coating system during application of coating material to the one or more substrate pieces, and
    wherein the computational planner further:
        generates modified instructions for driving the coating end effector and the robotic arm to perform the at least one coating task that includes applying the coating material, via the coating end effector, to the one or more substrate pieces, the generating of the modified instructions based at least in part on the environmental condition data; and
        drives the coating end effector and the robotic arm to perform the at least one coating task via the modified instructions.--